United States Patent
Chandrashekhar et al.

(10) Patent No.: US 11,153,170 B1
(45) Date of Patent: Oct. 19, 2021

(54) MIGRATION OF DATA COMPUTE NODE ACROSS SITES

(71) Applicant: VMware, Inc., Palo Alto, CA (US)

(72) Inventors: Ganesan Chandrashekhar, Campbell, CA (US); Pankaj Thakkar, Cupertino, CA (US); Abhishek Goliya, Pune (IN); Nilesh Ramchandra Nipane, Mountain View, CA (US); Janani Natarajan, Campbell, CA (US)

(73) Assignee: VMWARE, INC., Palo Alto, CA (US)

( * ) Notice: Subject to any disclaimer, the term of this patent is extended or adjusted under 35 U.S.C. 154(b) by 0 days.

(21) Appl. No.: 16/906,966

(22) Filed: Jun. 19, 2020

(30) Foreign Application Priority Data

Apr. 6, 2020 (IN) .............................. 202041015134

(51) Int. Cl.
*H04L 12/24* (2006.01)
*H04L 29/06* (2006.01)

(52) U.S. Cl.
CPC ...... *H04L 41/0893* (2013.01); *H04L 41/0803* (2013.01); *H04L 41/12* (2013.01); *H04L 63/0263* (2013.01); *H04L 63/104* (2013.01)

(58) Field of Classification Search
CPC . H04L 41/0803; H04L 41/0893; H04L 41/12; H04L 63/0263; H04L 63/104; G06F 2009/4557
See application file for complete search history.

(56) References Cited

U.S. PATENT DOCUMENTS

| | | | |
|---|---|---|---|
| 6,219,699 | B1 | 4/2001 | McCloghrie et al. |
| 7,502,884 | B1 | 3/2009 | Shah et al. |
| 7,802,000 | B1 | 9/2010 | Huang et al. |
| 8,479,275 | B1 | 7/2013 | Naseh |
| 8,611,351 | B2 | 12/2013 | Gooch et al. |

(Continued)

FOREIGN PATENT DOCUMENTS

| | | |
|---|---|---|
| CN | 102124456 A | 7/2011 |
| CN | 103650433 A | 3/2014 |

(Continued)

OTHER PUBLICATIONS

Author Unknown, "Apache Cassandra™ 1.2 Documentation," Jan. 13, 2013, 201 pages, DataStax.

(Continued)

*Primary Examiner* — Jerry B Dennison
(74) *Attorney, Agent, or Firm* — Adeli LLP

(57) ABSTRACT

Some embodiments provide a method for configuring a DCN migrated from a first host computer at a first site of multiple sites spanned by a logical network to a second host computer at a second site. At the second host, the method receives, from the first host, data for configuring the DCN and implementing the logical network on the second site. The data includes (i) data particular to the first site and (ii) a global identifier for a logical port to which the DCN attaches. The method provides the global identifier to a local logical network manager, which uses the global identifier to retrieve data regarding the logical port from a global network manager that manages the logical network across the sites. Based on data retrieved from the global network manager, the method modifies the data particular to the first site into data particular to the second site.

25 Claims, 44 Drawing Sheets

(56) References Cited

U.S. PATENT DOCUMENTS

| | | |
|---|---|---|
| 8,625,616 B2 | 1/2014 | Vobbilisetty et al. |
| 8,660,129 B1 | 2/2014 | Brendel et al. |
| 8,707,417 B1 | 4/2014 | Liang et al. |
| 8,799,900 B1 | 8/2014 | Kodorkin et al. |
| 9,195,491 B2 | 11/2015 | Zhang et al. |
| 9,215,210 B2 | 12/2015 | Raman et al. |
| 9,311,122 B2* | 4/2016 | Guay ................. G06F 9/45558 |
| 9,330,161 B2 | 5/2016 | D'Amato et al. |
| 9,432,215 B2 | 8/2016 | Stabile et al. |
| 9,602,312 B2 | 3/2017 | Koponen et al. |
| 9,672,054 B1* | 6/2017 | Gupta ................. G06F 9/45533 |
| 9,672,060 B2* | 6/2017 | Behere ............... G06F 9/45558 |
| 9,772,866 B1 | 9/2017 | Aron et al. |
| 9,825,851 B2 | 11/2017 | Agarwal et al. |
| 9,923,811 B2 | 3/2018 | Agarwal et al. |
| 9,977,688 B2* | 5/2018 | Nipane ............... G06F 9/45558 |
| 10,091,028 B2 | 10/2018 | Koponen et al. |
| 10,243,834 B1 | 3/2019 | Shekhar et al. |
| 10,243,848 B2 | 3/2019 | Agarwal et al. |
| 10,257,049 B2* | 4/2019 | Fried .................... H04L 41/22 |
| 10,339,123 B2 | 7/2019 | Venkatesh et al. |
| 10,673,752 B2 | 6/2020 | Agarwal et al. |
| 10,880,158 B2* | 12/2020 | Lambeth ............ H04L 41/0803 |
| 10,880,170 B2 | 12/2020 | Wang et al. |
| 2002/0029270 A1 | 3/2002 | Szczepanek |
| 2002/0093952 A1 | 7/2002 | Gonda |
| 2002/0131414 A1 | 9/2002 | Hadzic |
| 2003/0167333 A1 | 9/2003 | Kumar |
| 2003/0185151 A1 | 10/2003 | Kurosawa et al. |
| 2003/0185152 A1 | 10/2003 | Nederveen et al. |
| 2003/0188114 A1 | 10/2003 | Lubbers et al. |
| 2003/0188218 A1 | 10/2003 | Lubbers et al. |
| 2004/0052257 A1 | 3/2004 | Abdo et al. |
| 2005/0081212 A1 | 4/2005 | Goud et al. |
| 2005/0182853 A1 | 8/2005 | Lewites et al. |
| 2005/0288040 A1 | 12/2005 | Charpentier et al. |
| 2006/0092976 A1 | 5/2006 | Lakshman et al. |
| 2006/0179243 A1 | 8/2006 | Fields et al. |
| 2006/0179245 A1 | 8/2006 | Fields et al. |
| 2006/0221720 A1 | 10/2006 | Reuter |
| 2006/0251120 A1 | 11/2006 | Arimilli et al. |
| 2007/0061492 A1 | 3/2007 | Riel |
| 2007/0217419 A1 | 9/2007 | Vasseur |
| 2007/0239987 A1 | 10/2007 | Hoole et al. |
| 2008/0013474 A1 | 1/2008 | Nagarajan et al. |
| 2008/0049646 A1 | 2/2008 | Lu |
| 2008/0104302 A1 | 5/2008 | Carpio |
| 2008/0133729 A1 | 6/2008 | Fridman et al. |
| 2008/0163207 A1 | 7/2008 | Reumann et al. |
| 2008/0268847 A1 | 10/2008 | Mukherjee et al. |
| 2008/0298274 A1 | 12/2008 | Takashige et al. |
| 2008/0301379 A1 | 12/2008 | Pong |
| 2009/0070337 A1 | 3/2009 | Romem et al. |
| 2009/0150521 A1 | 6/2009 | Tripathi |
| 2009/0150527 A1 | 6/2009 | Tripathi et al. |
| 2009/0193297 A1 | 7/2009 | Williams et al. |
| 2009/0241192 A1 | 9/2009 | Thomas |
| 2009/0279536 A1 | 11/2009 | Unbehagen et al. |
| 2009/0279545 A1 | 11/2009 | Moonen |
| 2009/0292858 A1* | 11/2009 | Lambeth ................. H04L 49/70 711/6 |
| 2009/0296726 A1 | 12/2009 | Snively et al. |
| 2009/0303880 A1 | 12/2009 | Maltz et al. |
| 2010/0115080 A1 | 5/2010 | Kageyama |
| 2010/0165876 A1 | 7/2010 | Shukla et al. |
| 2010/0165877 A1 | 7/2010 | Shukla et al. |
| 2010/0250784 A1 | 9/2010 | Henry et al. |
| 2010/0257263 A1 | 10/2010 | Casado et al. |
| 2010/0275199 A1 | 10/2010 | Smith et al. |
| 2010/0284402 A1 | 11/2010 | Narayanan |
| 2010/0287548 A1 | 11/2010 | Zhou et al. |
| 2010/0322255 A1 | 12/2010 | Hao et al. |
| 2011/0032898 A1 | 2/2011 | Kazmi et al. |
| 2011/0047218 A1 | 2/2011 | Nojima et al. |
| 2011/0051714 A1 | 3/2011 | Somes |
| 2011/0085569 A1 | 4/2011 | Gnanasekaran et al. |
| 2011/0119748 A1 | 5/2011 | Edwards et al. |
| 2011/0188509 A1 | 8/2011 | Kern et al. |
| 2011/0231602 A1 | 9/2011 | Woods et al. |
| 2011/0299413 A1 | 12/2011 | Chatwani et al. |
| 2012/0084406 A1 | 4/2012 | Kumbalimutt |
| 2012/0120964 A1 | 5/2012 | Koponen et al. |
| 2012/0147898 A1 | 6/2012 | Koponen et al. |
| 2012/0275328 A1 | 11/2012 | Iwata et al. |
| 2013/0019277 A1 | 1/2013 | Chang et al. |
| 2013/0024579 A1 | 1/2013 | Zhang et al. |
| 2013/0028142 A1 | 1/2013 | Beheshti-Zavareh et al. |
| 2013/0042242 A1 | 2/2013 | Kagan |
| 2013/0044636 A1 | 2/2013 | Koponen et al. |
| 2013/0044641 A1 | 2/2013 | Koponen et al. |
| 2013/0044761 A1 | 2/2013 | Koponen et al. |
| 2013/0058250 A1 | 3/2013 | Casado et al. |
| 2013/0058335 A1 | 3/2013 | Koponen et al. |
| 2013/0058350 A1 | 3/2013 | Fulton |
| 2013/0058354 A1 | 3/2013 | Casado et al. |
| 2013/0058358 A1 | 3/2013 | Fulton et al. |
| 2013/0060819 A1 | 3/2013 | Lambeth et al. |
| 2013/0074065 A1 | 3/2013 | McNeeney et al. |
| 2013/0103817 A1 | 4/2013 | Koponen et al. |
| 2013/0132533 A1 | 5/2013 | Padmanabhan et al. |
| 2013/0144992 A1 | 6/2013 | Barabash et al. |
| 2013/0159637 A1 | 6/2013 | Forgette et al. |
| 2013/0212212 A1 | 8/2013 | Addepalli et al. |
| 2013/0215769 A1 | 8/2013 | Beheshti-Zavareh et al. |
| 2013/0227550 A1 | 8/2013 | Weinstein et al. |
| 2013/0254328 A1 | 9/2013 | Inoue et al. |
| 2013/0268799 A1 | 10/2013 | Mestery et al. |
| 2013/0287026 A1 | 10/2013 | Davie |
| 2013/0301425 A1 | 11/2013 | Udutha et al. |
| 2013/0301501 A1 | 11/2013 | Olvera-Hernandez et al. |
| 2013/0308641 A1 | 11/2013 | Ackley |
| 2013/0347131 A1 | 12/2013 | Mooring et al. |
| 2014/0064104 A1 | 3/2014 | Nataraja et al. |
| 2014/0136908 A1 | 5/2014 | Maggiari et al. |
| 2014/0146817 A1 | 5/2014 | Zhang |
| 2014/0211661 A1 | 7/2014 | Gorkemli et al. |
| 2014/0241356 A1 | 8/2014 | Zhang et al. |
| 2014/0250220 A1 | 9/2014 | Kapadia et al. |
| 2014/0301391 A1 | 10/2014 | Krishnan et al. |
| 2014/0310796 A1 | 10/2014 | Lee et al. |
| 2014/0325037 A1 | 10/2014 | Elisha |
| 2014/0337500 A1 | 11/2014 | Lee |
| 2015/0016276 A1 | 1/2015 | Decusatis et al. |
| 2015/0082417 A1 | 3/2015 | Bhagwat et al. |
| 2015/0100704 A1 | 4/2015 | Davie et al. |
| 2015/0103842 A1 | 4/2015 | Chandrashekhar et al. |
| 2015/0103843 A1 | 4/2015 | Chandrashekhar et al. |
| 2015/0106804 A1 | 4/2015 | Chandrashekhar et al. |
| 2015/0106913 A1 | 4/2015 | Wang et al. |
| 2015/0229641 A1 | 8/2015 | Sun et al. |
| 2016/0057014 A1* | 2/2016 | Thakkar ............ G06F 9/45558 709/223 |
| 2016/0134528 A1 | 5/2016 | Lin et al. |
| 2016/0380815 A1 | 12/2016 | Agarwal et al. |
| 2016/0380891 A1 | 12/2016 | Agarwal et al. |
| 2016/0380925 A1 | 12/2016 | Agarwal et al. |
| 2017/0048110 A1 | 2/2017 | Wu et al. |
| 2017/0048130 A1 | 2/2017 | Goliya et al. |
| 2017/0104720 A1 | 4/2017 | Bansal et al. |
| 2017/0163532 A1 | 6/2017 | Tubaltsev et al. |
| 2017/0249195 A1 | 8/2017 | Sadana et al. |
| 2017/0324645 A1* | 11/2017 | Johnsen ................. H04L 47/20 |
| 2017/0331711 A1 | 11/2017 | Duda |
| 2018/0062881 A1 | 3/2018 | Chandrashekhar et al. |
| 2018/0157537 A1* | 6/2018 | Chen ................... G06F 9/45558 |
| 2019/0207847 A1 | 7/2019 | Agarwal et al. |
| 2019/0303326 A1* | 10/2019 | Desai ................... G06F 9/466 |
| 2019/0363975 A1 | 11/2019 | Djernaes |
| 2019/0379731 A1* | 12/2019 | Johnsen ............... G06F 9/5027 |

(56) References Cited

U.S. PATENT DOCUMENTS

2020/0106744 A1 4/2020 Miriyala et al.
2020/0296035 A1 9/2020 Agarwal et al.

FOREIGN PATENT DOCUMENTS

| CN | 103890751 A | 6/2014 |
|---|---|---|
| EP | 1154601 A1 | 11/2001 |
| EP | 1635506 A1 | 3/2006 |
| EP | 1868318 A1 | 12/2007 |
| EP | 3016331 A1 | 5/2016 |
| EP | 3314831 A1 | 5/2018 |
| WO | 2007115425 A1 | 10/2007 |
| WO | 2010028364 A1 | 3/2010 |
| WO | 2012113444 A1 | 8/2012 |
| WO | 2013002766 A1 | 1/2013 |
| WO | 2013152716 A1 | 10/2013 |
| WO | 2015054671 A2 | 4/2015 |
| WO | 2017003881 A1 | 1/2017 |

OTHER PUBLICATIONS

Author Unknown, "OpenFlow Switch Specification, Version 1.1.0 Implemented (Wire Protocol 0x02)," Feb. 28, 2011, 56 pages, Open Networking Foundation.
Berde, Pankaj, et al., "ONOS Open Network Operating System An Open-Source Distributed SDN OS," Dec. 19, 2013, 34 pages.
Hanna, Jeremy, "Flow ZooKeeper Handles Failure Scenarios," http://.apache.org/hadoop/Zookeeper/FailureScenarios. Dec. 9, 2010, 1 page.
Heller, Brandon, et al., "The Controller Placement Problem," Hot Topics in Software Defined Networks, Aug. 13, 2012, 6 pages, Helsinki, Finland.
Ioannidis, Sotiris, et al., "Implementing a Distributed Firewall," CCS '00, Month Unknown 2000, 10 pages, ACM, Athens, Greece.
Krishnaswamy, Umesh, et al., "ONOS Open Network Operating System—An Experimental Open-Source Distributed SDN OS," Apr. 16, 2013, 24 pages.
Lebresne, Sylvain, "[RELEASE] Apache Cassandra 1.2 released," Jan. 2, 2013, 1 page.
Mahalingham, Mallik, et al., "VXLAN: A Framework for Overlaying Virtualized Layer 2 Networks over Layer 3 Networks," draft-mahalingham-dutt-dcops-vxlan-00.txt Internet Draft, Aug. 26, 2011, 20 pages, Internet Engineering Task Force.
Mahalingham, Mallik, et al., "VXLAN: A Framework for Overlaying Virtualized Layer 2 Networks over Layer 3 Networks," draft-mahalingham-dutt-dcops-vxlan-02.txt Internet Draft, Aug. 22, 2012, 20 pages, Internet Engineering Task Force.
Non-Published Commonly Owned U.S. Appl. No. 16/888,851, filed Jun. 1, 2020, 72 pages, Nicira, Inc.
Non-Published Commonly Owned U.S. Appl. No. 16/906,889, filed Jun. 19, 2020, 125 pages, VMware, Inc.
Non-Published Commonly Owned U.S. Appl. No. 16/906,891, filed Jun. 19, 2020, 125 pages, VMware, Inc.
Non-Published Commonly Owned U.S. Appl. No. 16/906,893, filed Jun. 19, 2020, 126 pages, VMware, Inc.
Non-Published Commonly Owned U.S. Appl. No. 16/906,901, filed Jun. 19, 2020, 125 pages, VMware, Inc.
Non-Published Commonly Owned U.S. Appl. No. 16/906,902, filed Jun. 19, 2020, 126 pages, VMware, Inc.
Non-Published Commonly Owned U.S. Appl. No. 16/906,905, filed Jun. 19, 2020, 126 pages, VMware, Inc.
Non-Published Commonly Owned U.S. Appl. No. 16/906,908, filed Jun. 19, 2020, 125 pages, VMware, Inc.
Non-Published Commonly Owned U.S. Appl. No. 16/906,913, filed Jun. 19, 2020, 124 pages, VMware, Inc.
Non-Published Commonly Owned U.S. Appl. No. 16/906,921, filed Jun. 19, 2020, 43 pages, VMware, Inc.
Non-Published Commonly Owned U.S. Appl. No. 16/906,925, filed Jun. 19, 2020, 111 pages, VMware, Inc.
Non-Published Commonly Owned U.S. Appl. No. 16/906,929, filed Jun. 19, 2020, 113 pages, VMware, Inc.
Non-Published Commonly Owned U.S. Appl. No. 16/906,934, filed Jun. 19, 2020, 112 pages, VMware, Inc.
Non-Published Commonly Owned U.S. Appl. No. 16/906,935, filed Jun. 19, 2020, 114 pages, VMware, Inc.
Non-Published Commonly Owned U.S. Appl. No. 16/906,942, filed Jun. 19, 2020, 127 pages, VMware, Inc.
Non-Published Commonly Owned U.S. Appl. No. 16/906,944, filed Jun. 19, 2020, 128 pages, VMware, Inc.
Non-Published Commonly Owned U.S. Appl. No. 16/906,950, filed Jun. 19, 2020, 128 pages, VMware, Inc.
Non-Published Commonly Owned U.S. Appl. No. 16/906,955, filed Jun. 19, 2020, 127 pages, VMware, Inc.
Non-Published Commonly Owned U.S. Appl. No. 16/906,960, filed Jun. 19, 2020, 128 pages, VMware, Inc.
Non-Published Commonly Owned U.S. Appl. No. 16/906,964, filed Jun. 19, 2020, 126 pages, VMware, Inc.
PCT International Search Report and Written Opinion of commonly owned International Patent Application PCT/US2021/015968, dated Apr. 23, 2021, 14 pages, International Searching Authority (EP).

* cited by examiner

Figure 28A

| | | | | | | | |
|---|---|---|---|---|---|---|---|
| vm | NSX-T GMLondon Global Manager ∨ | | | | | ♀ ⌂ ⊞ ? ∨ admin ∨ | |
| Home | Networking Security Inventory System | | | | | | |

« Network Overview

Connectivity
✦ Tier-0 Gateways
✦ Tier-1 Gateways
▦ Segments

Network Services
⇅ NAT

IP Management
▦ DNS
▦ DHCP

Settings
▢ Networking Settings

2905

▦ Segments 2910

ADD SEGMENT ∨     EXPAND ALL     Filter by Name, Path and more

| | Segment Name | Connectivity | Traffic Type | Subnets 2915 | Ports | Admin State | Status⓪ | Alarms |
|---|---|---|---|---|---|---|---|---|
| ∨ ▦ ⋮ | LS-103 | Tier0Gateway1 | Overlay | 192.168.1.1/24 | 0 | Up | ● Success 2930 | 0 |

∨ Locations         Transport Zone         VIEW STATISTICS

Location

London         Primary
       NewYork       Primary        VIEW RELATED GROUPS
       Paris           Primary 2925

VLAN            Not Set       Uplink Teaming Policy     Not Set
    Domain Name    Not Set
    Address Bindings   Not Set       Replication Mode       Head End Replication
    Description       Not Set       Tags                   0

> SEGMENT PROFILES
    > DHCP STATIC BINDINGS

| > ▦ ⋮ | LS-1 | None | VLAN | Not Set | 0 | Up | Check Status | 0 |
| > ▦ ⋮ | LS-104 | Tier0Gateway1 | Overlay | 192.168.2.1/24 | 0 | Up | ● Success | 0 |

↻ REFRESH                                                                          1 - 1 of 1 Tier-0 Gateways

MIGRATION OF DATA COMPUTE NODE ACROSS SITES

BACKGROUND

As more networks move to the cloud, it is more common for corporations or other entities to have networks spanning multiple sites. While logical networks that operate within a single site are well established, there are various challenges in having logical networks span multiple physical sites (e.g., datacenters). The sites should be self-contained, while also allowing for data to be sent from one site to another easily. Various solutions are required to solve these issues.

BRIEF SUMMARY

Some embodiments of the invention provide a network management system for managing a logical network spanning multiple federated sites (e.g., multiple datacenters). The network management system of some embodiments includes a global manager that manages the entire logical network spanning all of the sites, as well as local managers at each site that directly manage the logical network at their respective sites. The logical network includes logical network elements that span one or more sites and logical network policies that apply to the elements at those sites. In some embodiments, the global manager receives a global desired configuration for the logical network (e.g., from an administrator of the network), identifies a relevant portion of the global desired configuration for each site in the federation, and provides the identified portion to the site's corresponding local manager. In addition, the global manager collects information about the realized state of the logical network across the sites from the local managers and provides this information (e.g., to an administrator of the logical network) for troubleshooting and management purposes.

In some embodiments, the global manager executes on a computing device at one of the sites spanned by the logical network, and each local manager also executes on a computing device at its respective site. In some embodiments, the global manager executes on the same computing device at one of the physical sites as the local manager managing that site. The global manager and the local managers are in some embodiments separate modules of a single application. Some embodiments deploy each manager at a physical site as a cluster of machines, with each machine executing on a different computing device at the same site.

Some embodiments employ a primary global manager and a secondary global manager, in an active-standby arrangement. The primary global manager is asynchronously synchronized with the secondary global manager as a standby for failover scenarios. The secondary global manager executes on a different computing device, located in some embodiments for resiliency at a different site than the primary global manager, and maintains an independent database. The secondary global manager is also deployed in some embodiments as a set of machines and may also execute on the same computing device as a local manager.

The primary global manager's database is a distributed shared log implemented across a set of storage devices at the physical site where the primary global manager resides in some embodiments. Data regarding the global desired configuration is received and stored in the database using a series of database transactions which are initiated through a series of application programming interface (API) calls to the global manager. The database, in some embodiments, generates an update stream from the database transactions, that is used to provide the data regarding the desired configuration to the secondary global manager for replication of the database. The update stream also includes metadata associated with each transaction, such as timestamp information that can be used for data ordering, as well as database status to prevent race conditions for access. In some embodiments, the database is shared by the primary global manager with other applications (e.g., a local manager) on the same computing device. In some such embodiments, data for replication to the secondary global manager is tagged so that only data associated with the primary global manager is replicated and other data associated with other applications on the computing device is not replicated.

Each global manager's database also includes in some embodiments a set of queues, each of which is reserved for a local manager at each of the physical sites, as well as one queue reserved for the secondary global manager. The database at the secondary global manager also includes these queues. When the primary global manager receives the global desired configuration for the logical network, the global manager stores portions of the global configuration in each queue, based on the relevance of the portions to the configuration of the logical network at the queue's corresponding physical site. In some embodiments, a broker service of the global manager identifies the relevant portions for each physical site (e.g., based on the span of the logical network elements), as described in further detail below.

In some embodiments, a set of asynchronous channels connect the primary global manager to the local managers and the secondary global manager at different sites. Some embodiments execute a set of site managers at each global manager to manage the channels, with each site manager corresponding to one of the physical sites. The channels retrieve data from the queues in the database and provide the retrieved data to the destination database at the corresponding physical site. These channels maintain the connections between physical sites and in some embodiments guarantee various connection parameters (e.g., the minimum bandwidth, the maximum roundtrip time, etc.) that are required for replication of data to the secondary global manager and dissemination of data to the local managers. The channels also identify the active machine for each manager, when the managers are implemented by a cluster of machines.

In some embodiments, the global desired configuration of the logical network is expressed as a hierarchical tree (also referred to as a global policy tree) with nodes and connections between the nodes. In some embodiments, the nodes represent logical network elements that span one or more sites and logical network policies that apply to those elements, and the connections represent relationships between the nodes (e.g., parent-child relationships, logical network connections, etc.). The logical network elements include logical forwarding elements that forward data in the logical network, e.g. logical routers, logical switches, etc. These logical network elements also include logical constructs in some embodiments, such as logical ports associated with the logical forwarding elements, domains that are logical groupings of one or more sites (e.g., geographic regions), and groups of logical network endpoints that share one or more attributes (e.g., operating system, region, etc.). Each logical network element is implemented in some embodiments by physical forwarding elements (PFEs) executing on computing devices at the sites that are spanned by that logical network element. The logical network policies include forwarding policies, service policies, and security policies, and are applied in some embodiments to govern the behavior of the logical forwarding elements.

The global manager performs a span calculation in some embodiments for each logical network element, to determine which logical network elements are implemented at each site. In some embodiments, the span calculation is based on the relationships between the nodes in the global policy tree. For example, when the relationship between two nodes is a parent-child relationship, the child node may inherit its span from the parent node. In other cases, however, a child node does not inherit the entire span of its parent node. As another example, when the relationship between two nodes is a dependence of one node on another node, expressed as a reference from one node to the other, the span of the dependent node will depend on the referenced node. Some logical network elements also have a pre-defined span in some embodiments, e.g., defined by an administrator of the network.

The relevant portion of the global desired configuration that is provided to each local manager in some embodiments is a site-specific policy subtree of the global policy tree, corresponding to the logical network elements implemented at that site. The subtree for each site only includes nodes for logical network elements that span the site. In some embodiments, the subtree is generated by first identifying the span of each node in the global policy tree. The global policy tree is then parsed, using the identified span for each node, to generate the policy subtree for each site.

The local manager at each site uses the relevant portion of the global desired configuration, received from the global manager, to manage the logical network at the site. For example, in some embodiments, the local manager uses the relevant portion to generate and provide configuration data to the control plane of the logical network (e.g., a cluster of controllers at each site). In some embodiments, these controllers identify computing devices at the site which execute physical forwarding elements, and distribute the configuration data to the identified computing devices. Some embodiments have local controllers (also referred to as chassis controllers) that execute on one or more of the computing devices, and which receive the configuration data from the controller cluster. The local controllers use the configuration data to configure the physical forwarding elements to implement the logical network elements. Each site's controller cluster also creates mappings between logical addresses (e.g., MAC addresses of logical network endpoints executing on the computing devices) and physical addresses (e.g., IP addresses of tunnel endpoints at the computing devices), and distributes these mappings to each computing device to which they are relevant, as well as to other controller clusters at other sites that require the data.

In some embodiments, the computing devices at each site also execute machines along with the physical forwarding elements and the local controllers. These machines include logical network endpoints, which are sources and destinations of data message traffic (e.g. computers, virtual machines, containers, etc.), and service machines, which perform services on the data traffic (e.g. firewalls, load balancers, etc.). A machine is located at a single site at a given time, but may be migrated between sites in some embodiments. These machines connect in some embodiments to the physical forwarding elements in order to exchange data messages in the network. In some embodiments, logical network endpoints at each site are logically organized into groups which can span multiple sites. The service machines in some embodiments apply some of the logical network policies to the data messages exchanged between groups of endpoints based on policies that are defined in terms of these groups.

Policies are defined in some embodiments at the global manager, e.g., by an administrator of the logical network. In some embodiments, policies are one or more service rules which are enforced at the sites on data message flows based on a set of flow attributes. The global manager in some embodiments distributes the service rules to local managers at the sites at which the policy is to be enforced (i.e., the policy's span). The local manager uses the service rules to generate configuration data for distribution by controllers, to configure the data plane (i.e., the forwarding elements and the service machines) to enforce the received service rules on data message flows that are associated with groups of logical network endpoints.

The policies are defined in some embodiments by reference to groups of logical network endpoints that span one or more sites. The groups are defined in some embodiments at the global manager, e.g. by an administrator of the logical network. The service rules refer to these groups in some embodiments by using a group identifier that is assigned at the global manager when the groups are defined. The definitions of these groups are distributed to the sites spanned by the policy, so that the controllers at these sites are able to configure the data plane to enforce the policy.

As discussed above, the service rules for a given policy are enforced on data messages that are associated with a group of logical network endpoints spanning one or more sites. Service rules have multiple fields in some embodiments, including source fields, destination fields, and action fields. Some embodiments refer to these groups in these fields by using group identifiers that are assigned to the groups (e.g., by the global manager when the groups are defined). For example, when the group identifier for the group is referenced in a source field of the service rule, the service rule is enforced on data messages that originate from machines in that group. When the group identifier for the group is referenced in a destination field of the service rule, the service rule is enforced on data messages that are directed to machines in that group.

The service rule is enforced on data messages whose attributes match those specified in the rule. For example, the rule may specify a flow 5-tuple (source IP address and port number, destination IP address and port number, and transmission protocol). Alternatively, the rule may specify other attributes of the flow. The PFEs at each site identify matching flows by performing match classification operations on each data message, to determine if the flow attributes match those specified in the service rule. When a data message matches the service rule, it is provided to a service machine in some embodiments, which performs the action that is specified by the rule on the matching data message. These actions include dropping the data message, allowing the data message, or performing other service operations on the data message. For example, a service operation may modify the header of the data message, to redirect the message to a different destination. These service operations include load-balancing, firewall, Dynamic Host Configuration Protocol (DHCP), Network Address Translation (NAT), and other services.

Some embodiments define domains that are groups of one or more sites. The domains are defined in some embodiments at the global manager, e.g. by an administrator of the logical network. Some domains are specific to a single physical site, and are referred to as locations. Other domains are logical groups of one or more sites, and are referred to as regions. Some embodiments restrict each site to membership in a single location and a single region. In other words, a location may not have more than one site, and a site may not be in more than two regions. The member sites of each domain define the domain's span. In some embodiments, domains are defined at the global manager and represented as nodes in the policy tree. As noted above, policies are also defined as nodes in the policy tree, and in some embodiments, policies are defined as child nodes of domain nodes. In such cases, the policy (and therefore, any service rule of the policy) inherits the span of its parent domain, i.e. the policy is enforced at the sites which are members of its parent domain.

Furthermore, groups are also represented in some embodiments as child nodes of a domain. In such cases, the group inherits the span of its parent domain, i.e. the group is defined at the sites which are members of its parent domain. Logical network endpoints located at a site may join a group if the group is defined at that site (i.e., if the group spans that site).

In some embodiments, a policy's service rules distributed to a first set of sites for applying to a first group of machines defined at those sites refer to a second group of machines defined at a second, different set of sites. In other words, the span of the referenced group does not include the span of the policy. Since such service rules reference a group of machines that is undefined for one or more of the sites in the first set of sites, not all of the machines in the first group are able to enforce the policy. Therefore, some embodiments identify which sites in the first set of sites do not have the definition of the referenced group, and distribute the definition of the referenced group to those identified sites.

For example, the policy might be defined in a first domain, which has the first set of sites as members, while the group referenced by the policy is defined in a second, different domain, which has the second set of sites as members. The policy therefore inherits span from the first domain, and the referenced group inherits span from the second domain. In such embodiments, the definition of the referenced group is distributed to the identified sites by extending the span of the group to include the span of the policy. This is done at the global manager (e.g., by an administrator of the logical network) in some embodiments, by creating a reference group in the first domain which references the group in the second domain. Upon receiving this modification, the global manager repeats the span calculation and determines that the group now spans the first set of sites. The global manager then provides the portion of the desired configuration (which now includes the referenced group) to the local managers at the first set of sites, which are now able to configure their respective controllers to configure the physical forwarding elements and service machines at the first set of sites to enforce the rule.

Some embodiments provide, upon request, the realized state of one or more of the logical network elements of the logical network. In some embodiments, the global manager receives the request for the realized state of the logical elements from an administrator of the logical network. For each logical network element in the request, the global manager identifies the sites spanned by the element and sends requests to those identified sites' local managers. These requests are sent in parallel in some embodiments. After receiving the realized state from each of the sites spanned by each of the logical network elements, the global manager combines the received realized state from each site and presents the realized state in response to the initial request. For example, the realized state may be presented in a report for an administrator of the logical network in some embodiments.

The realized state of a logical network element indicates in some embodiments whether the desired configuration (also referred to as the desired state) of the logical network element has been realized at each of the sites that the element spans. Some embodiments describe the realized state partly in terms of a deviation from the desired state. In some embodiments, the realized state for a logical network element (e.g., a logical router, logical switch, etc.) describes how the logical network element is implemented at each of the physical sites that it spans. For example, the realized state includes data from PFEs executing on computing devices at each of the spanned sites to implement the logical network element. Identifying the spanned sites is achieved in some embodiments by performing a span calculation as described above, or determined from the definition of the logical network element (e.g., by an administrator of the logical network). For each logical network element, the realized state received from each local manager is a subset of the total realized state of that logical network element, just as the desired state for the logical network element that is provided to the local manager is a subset of the global desired state of that logical network element defined at the global manager.

In some embodiments, the global manager also receives notifications from the local managers. Unlike requests for realized state which are provided on-demand (e.g., pulled from the local managers), these notifications are automatically pushed from the local managers. The notifications pertain in some embodiments to site-specific implementation problems or situations. Notifications are provided in some embodiments to the GM as the events they describe occur (e.g., in real-time or near-real-time rather than on-demand). These notifications are also displayed in some embodiments as a report (e.g., for review by an administrator of the logical network).

One type of notification in some embodiments is an alarm from a local manager that the implementation of a logical network element has failed at the specific site. For example, the failure could be due to an IP address conflict with another network element defined locally at the local manager, of which the global manager was unaware.

Another type of notification in some embodiments is a message from the local manager that an administrator of the network has overridden the desired state of a logical network element at that particular site. This occurs in some embodiments by an administrator (e.g., a different administrator, possibly located in a different region or even country) using the local manager to modify the logical network rather than using the global manager. Some embodiments restrict overriding the desired state to networking-related configurations only, and prevent such overrides for security-related configurations (e.g., security policies).

A third type of notification in some embodiments is a message from the local manager that the deletion of a logical network element has failed at the site. In other words, the logical network element was deleted at the global manager (e.g. for being unneeded or unused), but at the local manager of one site, the logical network element is still in use. An example may be a first logical router defined locally at one site's local manager, and which connects to a second logical router defined at the global manager. The global manager is unaware of the first logical router, which does not exist at other sites, and a global administrator may attempt to delete the second logical router. The local manager at the site where the second logical router is in use as a link for the first logical router then sends a notification to inform the global manager that the second logical router has not yet been deleted from that site.

An additional example of a type of notification in some embodiments is a message from the local manager that a logical network endpoint (e.g., a virtual machine) has been migrated from one site to another site. Such endpoints are typically attached to a logical port of a logical network element (e.g., a logical switch) that spans both sites. When the endpoint is migrated to a different site, it retains its association with that same logical port in some embodiments, and seamlessly inherits the same security policies that are associated with that port, even at the new site.

In some embodiments, a machine may be migrated from one physical site to another physical site, while preserving the state of network policies that apply to the machine. For example, for a logical segment (logical switch) that spans at least two physical sites, a machine attached to a logical port of the segment at one of the spanned sites is migrated in some embodiments to a new logical port of the same segment at another one of the spanned sites. Migrating a machine in some embodiments comprises creating a new machine at a new host computer (at the new site), transferring configuration data to the new machine from the original machine, and removing the original machine from its host computer. In some embodiments, the configuration data comprises physical state data and logical network policies.

The state of the machine (e.g., runtime data) is transferred in some embodiments from a computing device executing the original machine at the source site (i.e., the source host) to a computing device executing the new machine at the destination site (i.e., the destination host). In some embodiments, the state includes a local port identifier assigned by a local manager at the source physical site, and a global port identifier assigned by the global manager. The global port identifier is associated with logical network policies defined through a user client (e.g., by an administrator of the network) in some embodiments as part of the desired configuration of the logical network. Upon receiving the transferred state data, the destination host overwrites at least a portion of the state of the new machine with the received state of the old machine.

In some embodiments, the destination host extracts the global port identifier from the received state data and provides it to the destination site's local manager. The local manager uses the global port identifier in some embodiments to retrieve logical network policies associated with the global port identifier from the global manager, and applies these policies to the new machine. In some embodiments, the local manager generates configuration data from the policies and provides the configuration data to the control plane of the logical network at the destination site (e.g., a set of controllers) which then distribute the configuration data to the destination host.

The preceding Summary is intended to serve as a brief introduction to some embodiments of the invention. It is not meant to be an introduction or overview of all of the inventive subject matter disclosed in this document. The Detailed Description that follows and the Drawings that are referred to in the Detailed Description will further describe the embodiments described in the Summary as well as other embodiments. Accordingly, to understand all the embodiments described by this document, a full review of the Summary, Detailed Description and the Drawings is needed. Moreover, the claimed subject matters are not to be limited by the illustrative details in the Summary, Detailed Description and the Drawings, but rather are to be defined by the appended claims, because the claimed subject matters can be embodied in other specific forms without departing from the spirit of the subject matters.

BRIEF DESCRIPTION OF THE DRAWINGS

The novel features of the invention are set forth in the appended claims. However, for purposes of explanation, several embodiments of the invention are set forth in the following figures.

FIGS. 28A-C conceptually illustrate an example of a user interface of some embodiments for presenting the realized state of a logical router to an administrator of the logical network.

FIGS. 29A-B conceptually illustrate an example of a user interface of some embodiments for presenting the realized state of a logical switch to an administrator of the logical network.

DETAILED DESCRIPTION

In the following detailed description of the invention, numerous details, examples, and embodiments of the invention are set forth and described. However, it will be clear and apparent to one skilled in the art that the invention is not limited to the embodiments set forth and that the invention may be practiced without some of the specific details and examples discussed.

Some embodiments of the invention provide a network management system for managing a federated logical network spanning multiple physical sites (e.g., datacenters). The desired configuration of the logical network is defined by one or more network administrators using a set of network managers. The logical network includes logical network elements that span one or more sites and logical network policies that apply to the elements at those sites. Any such elements or policies that span multiple physical sites are defined through the global manager.

In some embodiments, the global manager receives (e.g., via a user client) a global desired configuration for the logical network, identifies a relevant portion of the global desired configuration for each physical site, and provides the identified portion to the site's corresponding local manager. In addition, the global manager collects information about the realized state of the logical network across the sites from the local managers and provides this information (e.g., to an administrator of the logical network) for troubleshooting and management purposes.

The logical network elements of some embodiments include logical forwarding elements (LFEs), such as logical switches (to which logical network endpoints attach) and logical routers. Each LFE (e.g., logical switch or logical router) is implemented across one or more physical sites, depending on how the LFE is defined by the network administrator. In some embodiments, the LFEs are implemented within the physical sites by physical forwarding elements (PFEs) executing on host computers that also host logical network endpoints of the logical network (e.g., with the PFEs executing in virtualization software of the host computers) and/or on edge devices within the physical sites. The LFEs transmit data traffic between logical network endpoints (e.g., data compute nodes (DCNs)) (i) within a datacenter, (ii) between logical network endpoints in different datacenters, and (iii) between logical network endpoints in a datacenter and endpoints external to the logical network (e.g., external to the datacenters). The edge devices, in some embodiments, are computing devices that may be bare metal machines executing a datapath and/or computers on which logical network endpoints execute to a datapath. These datapaths, in some embodiments, perform various gateway operations (e.g., gateways for stretching logical switches across physical sites, gateways for executing centralized features of logical routers such as performing stateful services and/or connecting to external networks).

Figure 1:
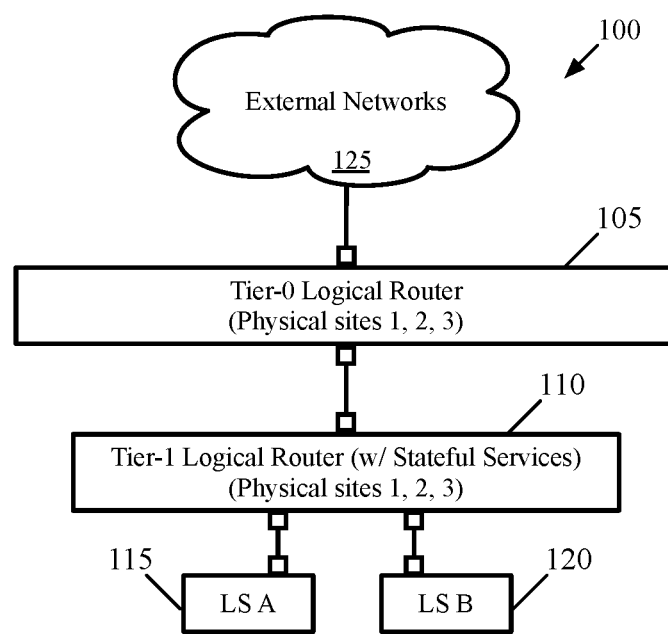
FIG. 1 conceptually illustrates a simple example of a logical network of some embodiments.

FIG. 1 conceptually illustrates a simple example of a logical network 100 of some embodiments. This logical network 100 includes a tier-0 (T0) logical router 105, a tier-1 (T1) logical router 110, and logical switches 115 and 120. Though not shown, various logical network endpoints (e.g., virtual machines, containers, or other types of data compute nodes) attach to logical ports of the logical switches 115 and 120. These logical network endpoints execute on host computers in the physical sites spanned by the logical switches to which they attach. In this example, both the T0 logical router 105 and the T1 logical router 110 are defined to span three physical sites, though such routers can span any number of sites in other embodiments. In some embodiments, the logical switches 115 and 120 inherit the span of the logical router 105 to which they connect.

As in this example, logical routers, in some embodiments, may include T0 logical routers (e.g., router 105) that connect directly to external networks 125 and T1 logical routers (e.g., router 110) that segregate a set of logical switches from the rest of the logical network and may perform stateful services for endpoints connected to those logical switches. These logical routers 105-110, in some embodiments, are defined by the network managers to have one or more routing components, depending on how the logical router has been configured by the network administrator.

Figure 2:
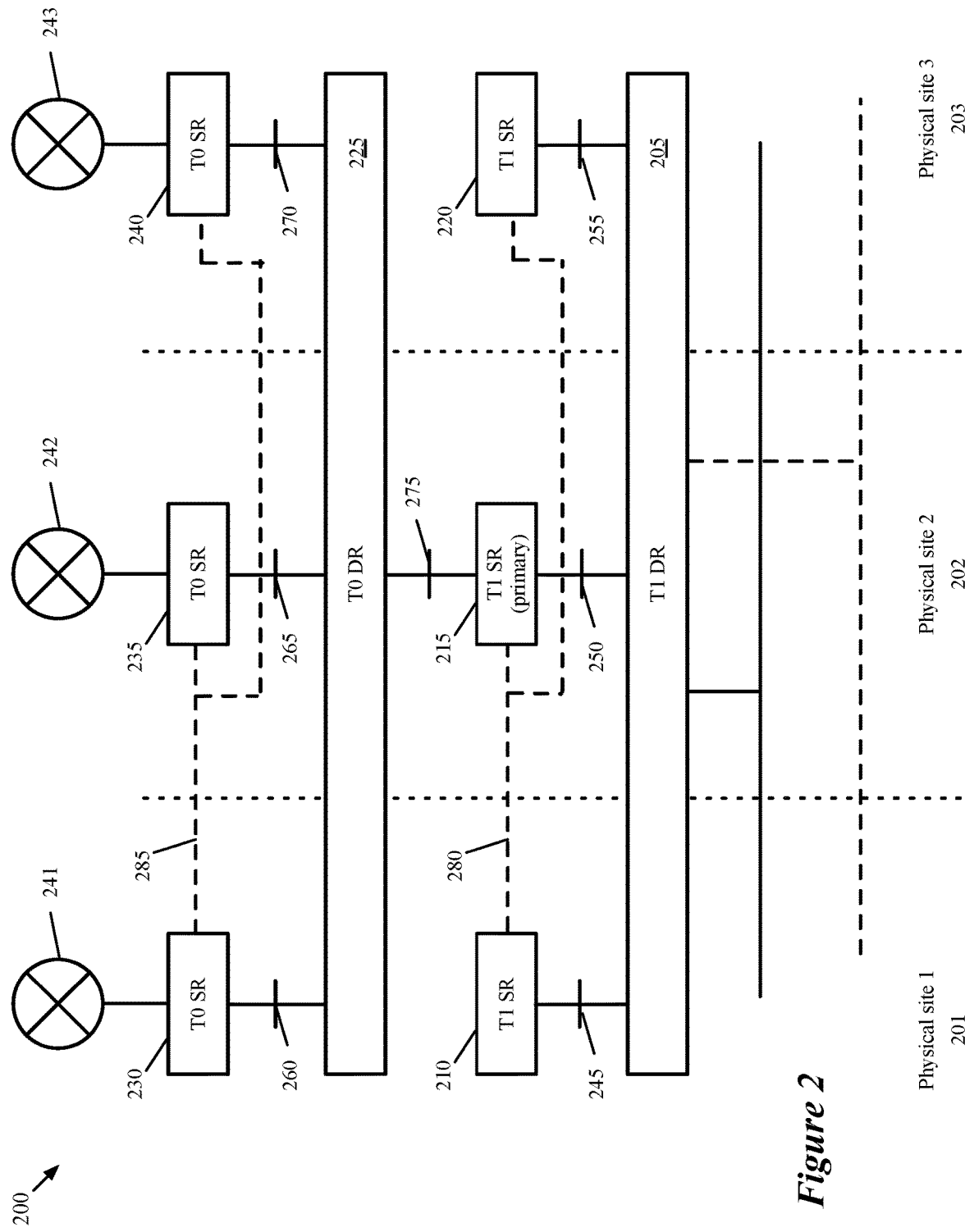
FIG. 2 conceptually illustrates the logical routing components of the logical routers.

FIG. 2 conceptually illustrates the logical network 200 showing the logical routing components of the logical routers 105 and 110 as well as the various logical switches that connect to these logical components and that connect the logical components to each other. The logical routers 105-110 span three physical sites 201-203, with some components of each router spanning all three sites and others only spanning a single site. As shown, the T1 logical router 110 includes a distributed routing component (DR) 205 as well as a set of centralized routing components (also referred to as service routers, or SRs) 210-220. T1 logical routers, in some embodiments, may have only a DR, or may have both a DR as well as SRs. For T1 logical routers, SRs allow for centralized (e.g., stateful) services to be performed on data messages sent between (i) logical network endpoints connected to logical switches that connect to the T1 logical router and (ii) logical network endpoints connected to other logical switches that do not connect to the tier-1 logical router or from external network endpoints. In this example, data messages sent to or from logical network endpoints connected to logical switches 115 and 120 will have stateful services applied by one of the SRs 210-220 of the T1 logical router 110 (specifically, by the primary SR 215).

T1 logical routers may be connected to T0 logical routers in some embodiments (e.g., T1 logical router 110 connecting to T0 logical router 105). These T0 logical routers 105, as mentioned, handle data messages exchanged between the logical network endpoints and external network endpoints. As shown, the T0 logical router 105 includes a DR 225 as well as a set of SRs 230-240. In some embodiments, T0 logical routers include an SR (or multiple SRs) operating in each physical site spanned by the logical router. In some or all of these physical sites, the T0 SRs 230-240 connect to external routers 241-243 (or to top of rack (TOR) switches that provide connections to external networks).

In addition to the logical switches 115 and 120 (which span all of the physical sites spanned by the T1 DR 205), FIG. 2 also illustrates various automatically-defined logical switches. Within each physical site, the T1 DR 205 connects to its respective local T1 SR 210-220 via a respective transit logical switch 245-255. Similarly, within each physical site, the T0 DR 225 connects to its respective local T0 SR 230-240 via a respective transit logical switch 260-270. In addition, a router link logical switch 275 connects the primary T1 SR 215 (that performs the stateful services for the T1 logical router 110) to the T0 DR 225. In some embodiments, similar router link logical switches are defined for each of the other physical sites, but are marked as down.

Lastly, the network management system also defines backplane logical switches that connect each set of SRs. In this case, there is a backplane logical switch 280 connecting the T1 SRs 210-220 and a backplane logical switch 285 connecting the T0 SRs 230-240. These backplane logical switches, unlike the transit logical switches, are stretched across the physical sites spanned by their respective logical routers. When one SR for a particular logical router routes a data message to another SR for the same logical router, the data message is sent according to the appropriate backplane logical switch.

Figure 3:
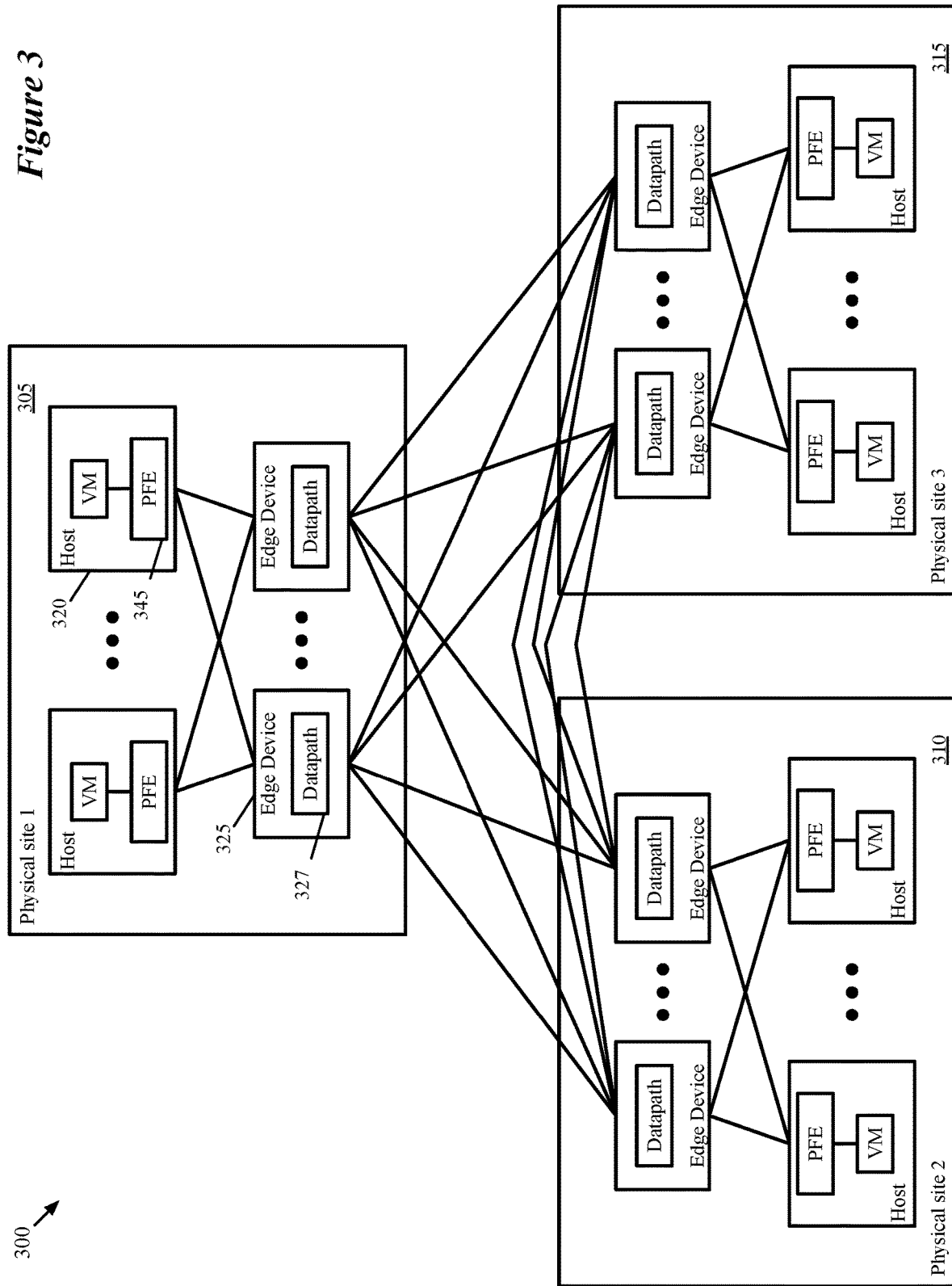
FIG. 3 conceptually illustrates physical sites spanned by the logical network, with the host computers and edge devices that implement the logical network.

As mentioned, the LFEs of a logical network may be implemented by PFEs executing on source host computers as well as by the edge devices. FIG. 3 conceptually illustrates physical sites 305-315 spanned by the logical network 300 with the host computers 320 and edge devices 325 that implement the logical network. Virtual machines (VMs) (in this example) or other logical network endpoints operate on the host computers 320, which execute virtualization software for hosting these VMs. The virtualization software, in some embodiments, includes the PFEs such as virtual switches and/or virtual routers. In some embodiments, one PFE (e.g., a flow-based PFE) executes on each host computer 320 to implement multiple LFEs, while in other embodiments multiple PFEs execute on each host computer 320 (e.g., one or more virtual switches and/or virtual routers). In still other embodiments, different host computers execute different virtualization software with different types of PFEs. Within this application, "PFE" is used to represent the set of one or more PFEs that execute on a host computer to implement LFEs of one or more logical networks.

The edge devices 325, in some embodiments, execute datapaths 327 (e.g., data plane development kit (DPDK) datapaths) that implement one or more LFEs. In some embodiments, SRs of logical routers are assigned to edge devices and implemented by these edge devices (the SRs are centralized, and thus not distributed in the same manner as the DRs or logical switches). The datapaths 327 of the edge devices 325 may execute in the primary operating system of a bare metal computing device and/or execute within a VM or other data compute node (that is not a logical network endpoint) operating on the edge device, in different embodiments.

In some embodiments, as shown, the edge devices 325 connect the physical sites 305-315 to each other (and to external networks 125). In such embodiments, the host computers 320 within a physical site can send data messages directly to each other, but send data messages to host computers 320 in other physical sites via the edge devices 325. When a source logical network endpoint (e.g., VM 330) in the first physical site 305 sends a data message to a destination logical network endpoint (e.g., VM 335) in the second physical site 310, this data message is first processed by the PFE 340 executing on the same host computer 320 as the source VM 330, then by an edge device 325 in the first physical site 305, then an edge device 325 in the second physical site 310, and then by the PFE 345 in the same host computer 320 as the destination logical network endpoint 335.

More specifically, when a logical network endpoint sends a data message to another logical network endpoint, the PFE executing on the host computer at which the source logical network endpoint resides performs logical network processing. In some embodiments, the source host computer PFE set (collectively referred to herein as the source PFE) performs processing for as much of the logical network as possible (referred to as first-hop logical processing). That is, the source PFE processes the data message through the logical network until either (i) the destination logical port for the data message is determined or (ii) the data message is logically forwarded to an LFE for which the source PFE cannot perform processing (e.g., an SR of a logical router).

Figure 4:
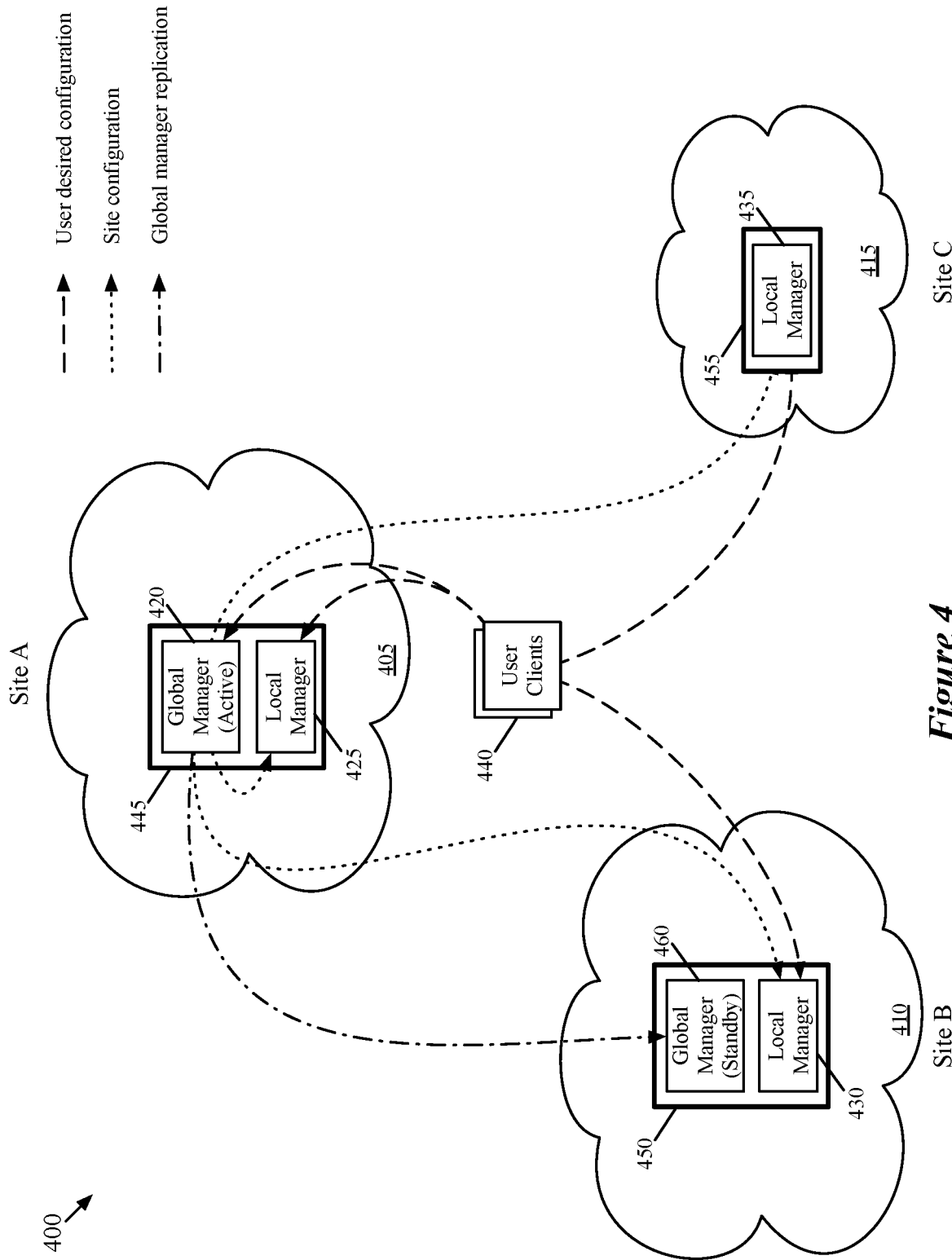
FIG. 4 conceptually illustrates an example of a network management system of some embodiments for a logical network that spans multiple physical sites.

FIG. 4 conceptually illustrates an example of a network management system 400 of some embodiments for a logical network that spans physical sites 405-415. The network management system 400 includes (i) a global manager 420 that manages the entire logical network spanning all of the physical sites 405-415 as well (ii) the local managers 425-435 for each of the sites that manage the logical network at their respective sites. Each physical site also includes central controllers, host computers, and edge devices (not shown) in addition to the local manager. In some embodiments, the global manager 420 executes on a computing device 445 at one of the sites 405 spanned by the logical network, and the local managers 425-435 also execute on computing devices 450-455 at their respective sites 410-415.

In some embodiments, the global manager 420 receives a global desired configuration for the logical network via one or more user clients 440. Each of the local managers 425-435 also receives in some embodiments a (site-specific) desired configuration for the logical network via the user clients 440. The desired configuration is provided to the managers 420-435 and 460 from a user client 440 in some embodiments using a representational state transfer (REST) application programming interface (API), and is represented by dashed lines in FIG. 4. The global manager 420 also provides a site-specific portion of the global desired configuration to each of the local managers 425-435, as represented by dotted lines in FIG. 4.

Figure 5:
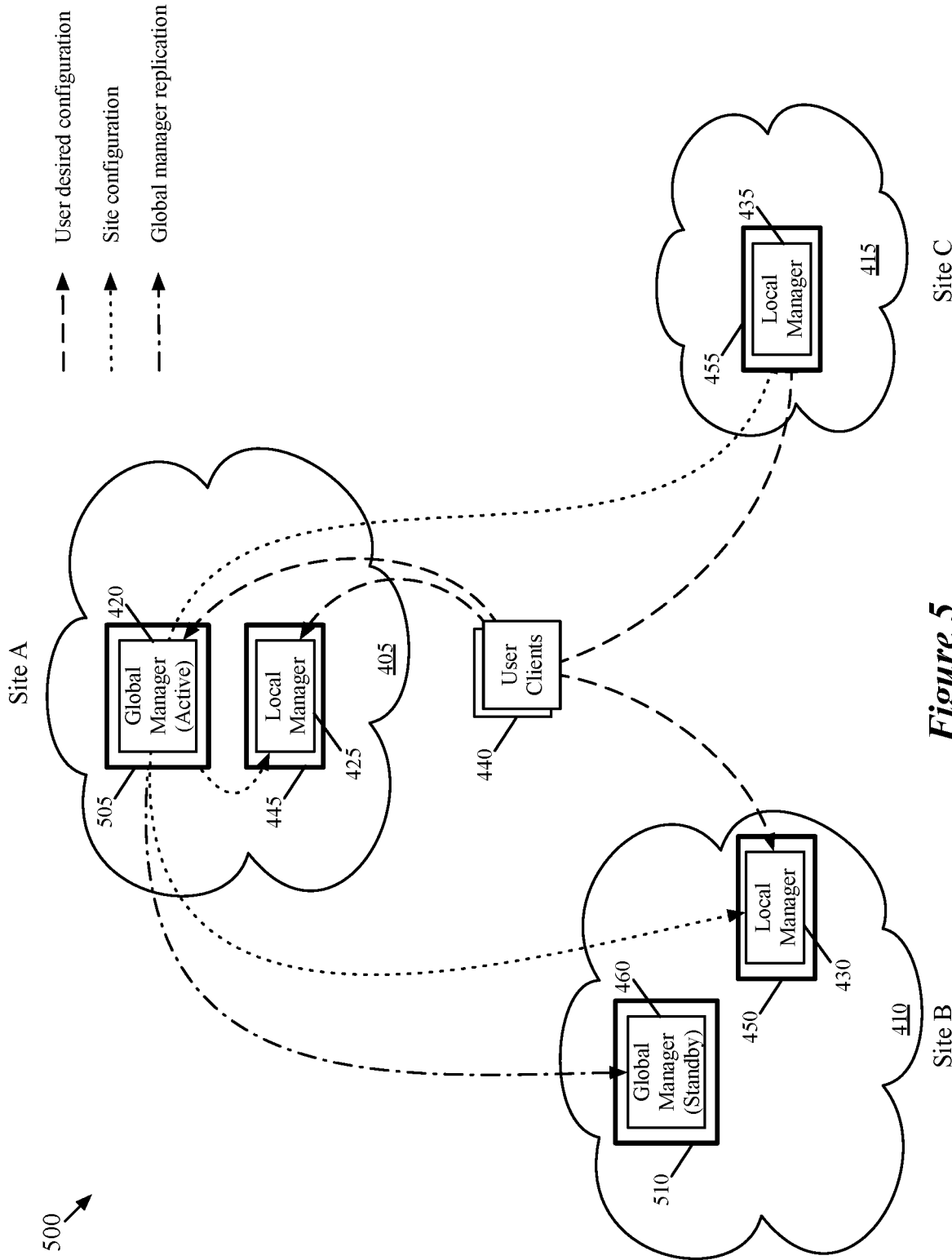
FIG. 5 conceptually illustrates a global manager executing on a separate computing device at a given site from any computing device executing the site's local manager.
Figure 6:
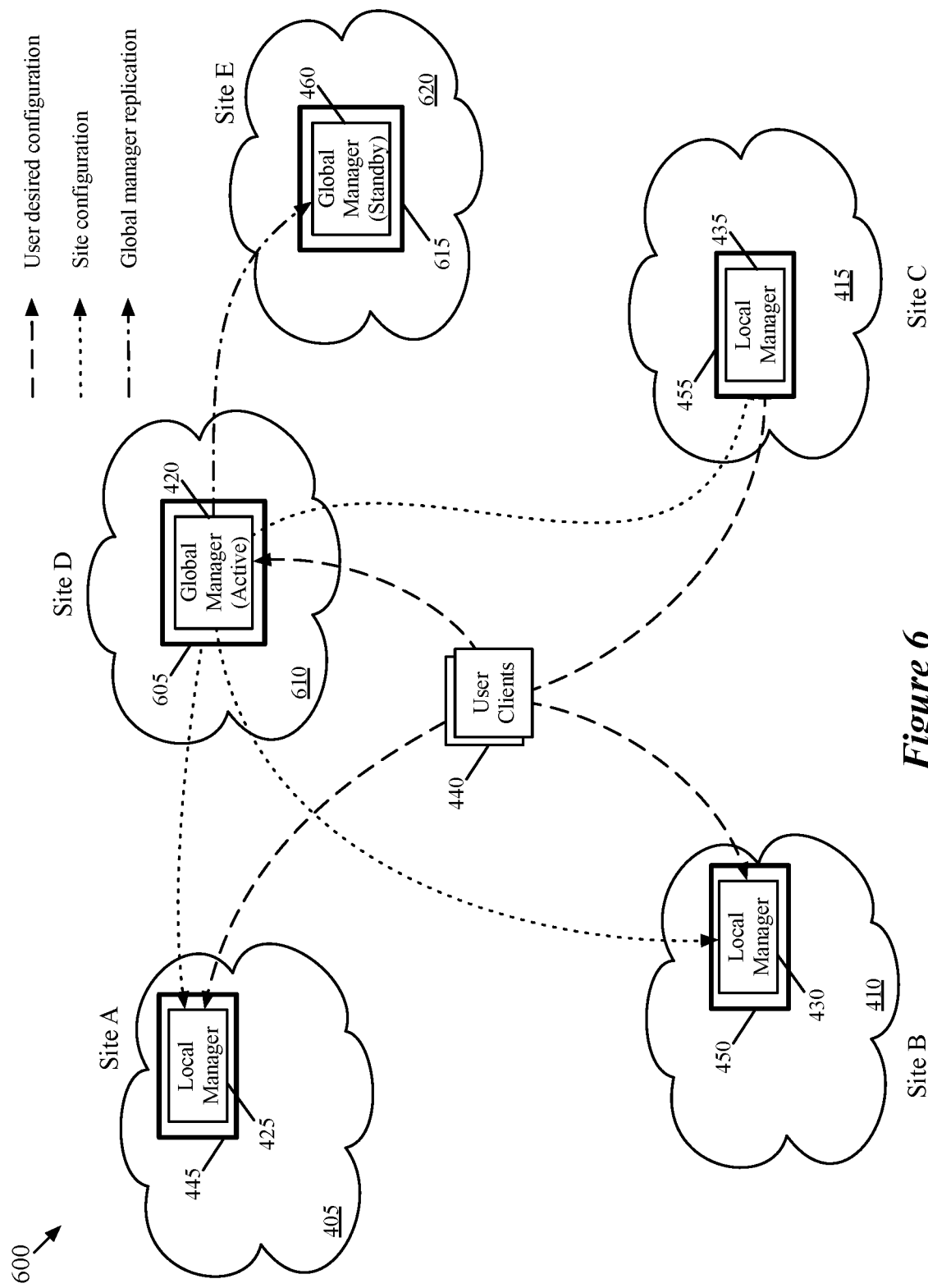
FIG. 6 conceptually illustrates a global manager executing on a computing device at a separate site that is not spanned by the logical network, and therefore has no local managers.

In some embodiments, as illustrated in FIG. 4, the global manager 420 executes on the same computing device 445 at a given physical site 405 as the local manager 425 managing that site. In other embodiments, as illustrated in FIG. 5, the global manager 420 executes on a computing device 505 at a given physical site 405 separately from any local manager 425 managing that site. In still other embodiments, as illustrated in FIG. 6, the global manager 420 executes on a computing device 605 at a separate site 610 that is not spanned by the logical network, and therefore has no local managers.

Some embodiments employ a secondary global manager 460, in an active-standby arrangement with the (primary) global manager 420. The primary global manager 420 is asynchronously synchronized (e.g., not real-time) with the secondary global manager 460 as a standby for failover scenarios. This asynchronous replication is represented by a dot-dash line in FIG. 4. For resiliency, the secondary global manager 460 is located at a different physical site 410 than the site 405 where the primary global manager 420 is located, and maintains an independent database. This ensures that a failover scenario due to connectivity issues to the active global manager's physical site does not also automatically affect the secondary global manager's physical site, and exploits the multisite architecture of the federated logical network.

The secondary global manager 460 executes in some embodiments on the same computing device 450 as the local manager 430 managing its site 410, as illustrated in FIG. 4. In other embodiments, as illustrated in FIG. 5, the secondary global manager 460 executes on a different computing device 510 at its physical site 410, separately from any local manager 430 managing that site 410. In still other embodiments, as illustrated in FIG. 6, the secondary global manager 460 executes on a computing device 615 at a separate site 620 that is not spanned by the logical network, and therefore has no local managers. Even though FIGS. 4-6 illustrate examples where the primary global manager 420 and the secondary global manager 460 have identical hosting arrangements, in some embodiments any combination or permutation of hosting may be employed as required. As just one example, the primary global manager 420 may be co-located with a local manager (as in FIG. 4), and the secondary global manager 460 may execute at a physical site that is not spanned by the logical network (as in FIG. 6).

The primary global manager 420, the secondary global manager 460, and the local managers 425-435 are in some embodiments separate modules of a single application, and in other embodiments are separate applications. These applications in some embodiments execute as one or more processes within machines that execute on host computers at each physical site. Some embodiments deploy one or more of the managers 420-435 and 460 as a cluster of machines at their physical site, with each machine executing on a different computing device at the same site, as described in further detail below with reference to FIG. 8.

Figure 7:
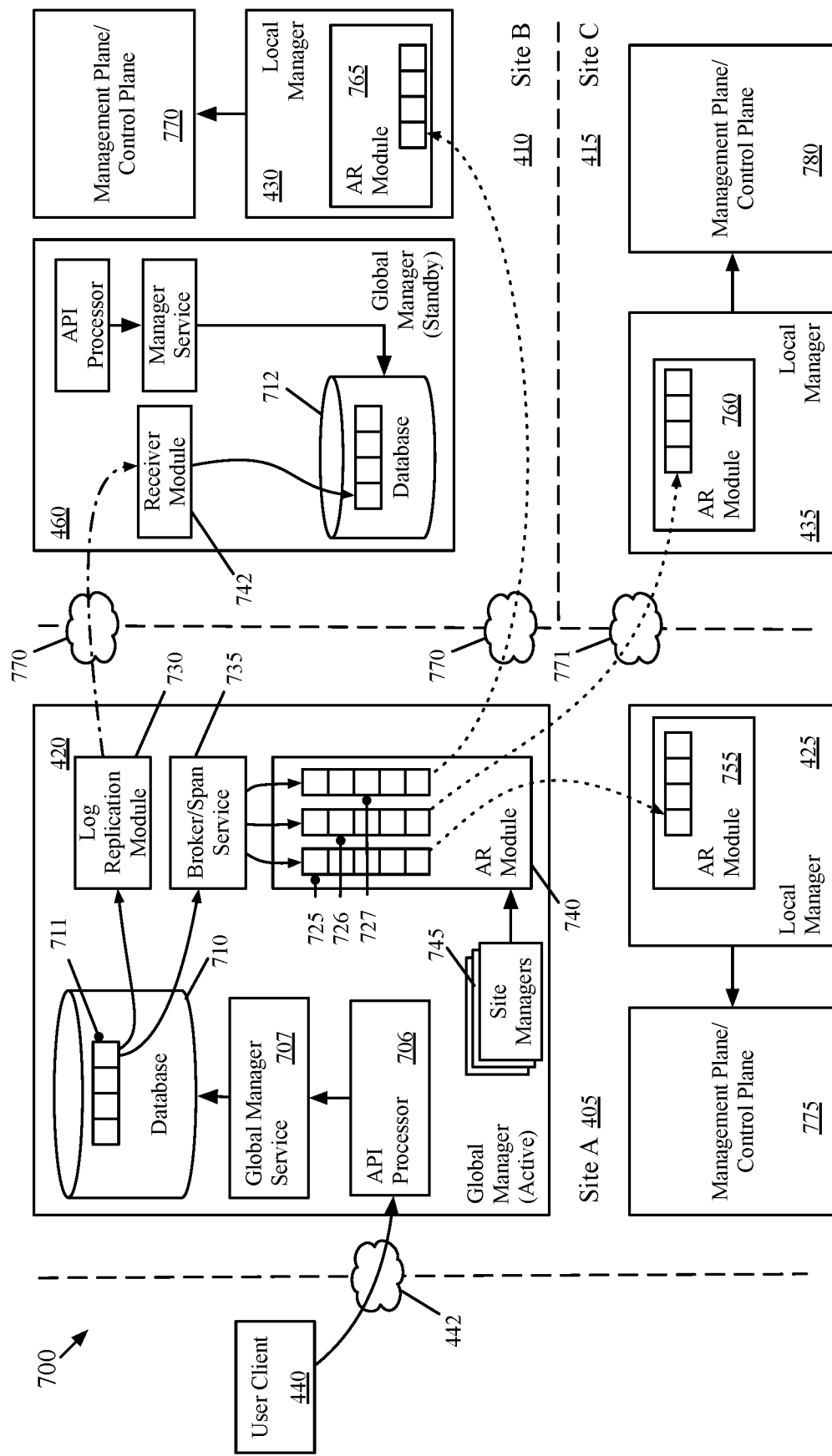
FIG. 7 conceptually illustrates different components of the network management system described in FIG. 4.

FIG. 7 conceptually illustrates different components of the network management system 400 described in FIG. 4. The desired configuration of the logical network is received by the primary global manager 420 from a user client 440 (e.g., over a wide area network 442 such as the Internet), stored in a database 710, and replicated to the secondary global manager 460 for storage in a separate database 712. A site-specific portion of the desired configuration is also provided to each of the local managers (via dedicated asynchronous channels) 425-435 for storage in their respective databases (not shown).

The global manager 420 also includes a number of additional modules, including an API processor 706 for receiving the user client input via a REST API, a core global manager service 707 that writes data to the database 710, a persistent work queue 711 in the database 710 to maintain causality for incoming create/update/delete (CUD) events, a log replication module 730 to replicate CUD events to the database 460 at the secondary global manager 460, a broker/span service 735 to perform span calculations on the CUD events (and the logical network elements referenced therein), an asynchronous replication (AR) module 300 which includes dedicated persistent queues 725-727 for disseminating CUD events to different local managers at different physical sites, and site managers 745 for maintaining connection parameters used by the AR module to establish channels to the other local managers. Each of these modules and their functionality are described in further detail below.

Figure 8:
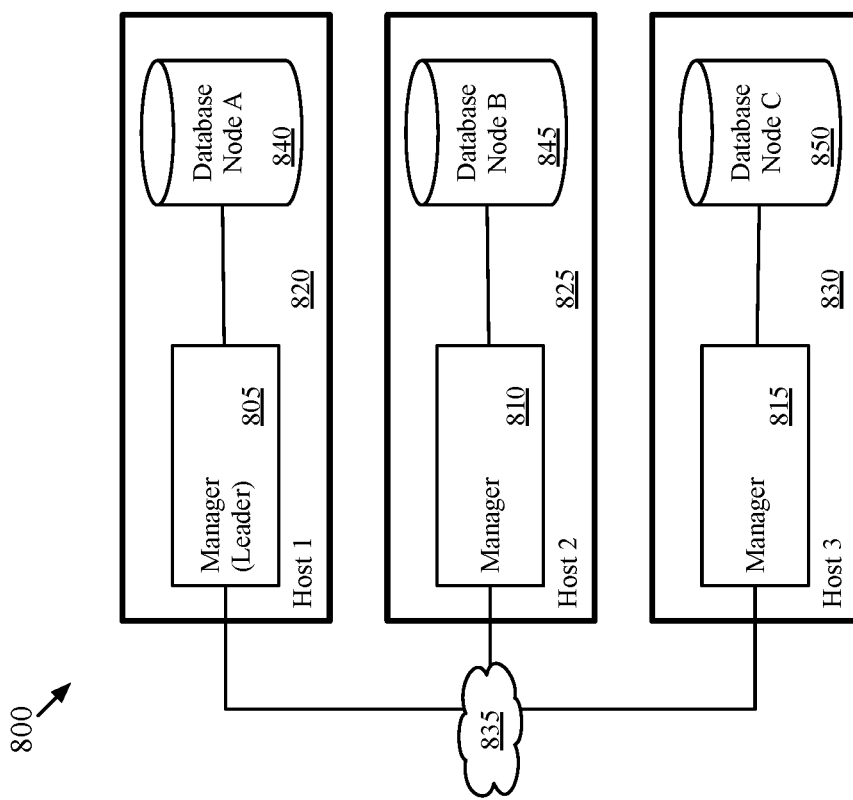
FIG. 8 conceptually illustrates a manager cluster and a distributed database system at a physical site spanned by the logical network.

In some embodiments, the databases 710 and 712 are distributed databases (e.g., a shared log) implemented across a set of storage devices at the managers' respective physical sites. In addition, in some embodiments, the global managers 420 and 460 are implemented as a cluster of machines executing on separate computing devices at its respective physical site. FIG. 8 conceptually illustrates a manager cluster and a distributed database system at a physical site spanned by the logical network. The manager cluster illustrated in this example may function in different embodiments as a primary global manager in active mode, as a secondary global manager in standby mode, or as a local manager. The manager is an application that runs on several manager machines 805-815 executing on separate host computers 820-830 at the physical site, which communicate with each other over a physical network 835 at the physical site (e.g., a datacenter network fabric). One of the manager machines 805 is assigned as the leader for the cluster in some embodiments, which shares tasks with the other manager machines in either active/active mode (e.g., using load balancing), active/standby mode, or some combination of these modes. The cluster of manager machines 805-815 appears as a single logical manager to other managers in the logical network.

In some embodiments, the manager application that runs on the machines 805-815 has separate modules for the global manager and local manager, which can be enabled or disabled as required. Alternatively or conjunctively, in some embodiments, at least one of the machines 805-815 is a dedicated global manager machine, with a separate machine (not shown) for running an application for the local manager, executing on either the same host computers 820-830, or different host computers (as described above with reference to FIGS. 4-6).

The manager cluster stores desired configuration data in a distributed database system that is managed by one or more instances 840-850 of a database that execute on the host computers 820-830 in some embodiments. The database executes within the local manager machine on the host in some embodiments, though they are shown as separate in the figure for clarity. The database instances 840-850 communicate with each other over the physical network 835 at the physical site (e.g., the datacenter network fabric) that is used by the manager cluster. The database instances 840-850 collectively appear to the manager cluster as the single logical database 710. In some embodiments, the instances are shards or slices of the database. In other embodiments, each instance is a node with a full copy of the data (e.g., as illustrated in the example of FIG. 8). The redundancy allows for durability in case one of the hosts 820-830 fails.

In some embodiments, the database instances 840-850 are nodes of a distributed log that is stored on the host computers 820-830. Entries in the distributed log provide an ordered, persisted history of updates to the state of different logical network elements and logical network policies, which the manager cluster accesses via application programming interfaces (APIs) provided by the database instances 840-850. The distributed log and the database APIs are described in more detail by U.S. Pat. No. 10,540,119, which is incorporated herein by reference.

Returning to the example of FIG. 7, data describing the global desired configuration is received from the user client 440 and stored in the database 710 in some embodiments using a series of transactions, initiated through a series of REST API calls from the user client 440 to the primary global manager 420. These API calls are received and processed by an API processor module 706 in some embodiments, which then provides the received data to a manager service 707 that performs the core functions of the global manager 420. The manager service 707 stores the received data in the database 710. In some embodiments, the data is stored in the database in tables that store configuration parameters for the logical network elements of the logical network. In some such embodiments, the data in the tables is expressed as a hierarchical tree of user intent, as described below with reference to FIG. 17. Furthermore, in some embodiments, the manager service 707 also stores (e.g., duplicates) the incoming series of transactions in a work queue 711, to preserve their causality and order. The work queue is a persistent queue in the database 712 in some embodiments, and for redundancy is also replicated across the database nodes.

In some embodiments, the manager service 707 is the cluster of manager machines 805-815, as described above with reference to FIG. 8. As illustrated in FIG. 7, in some embodiments the secondary global manager also has a corresponding API processor and manager service, which are activated in a failover scenario when the primary global manager fails (e.g., becomes unreachable) and the secondary global manager becomes the active manager.

Figure 9:
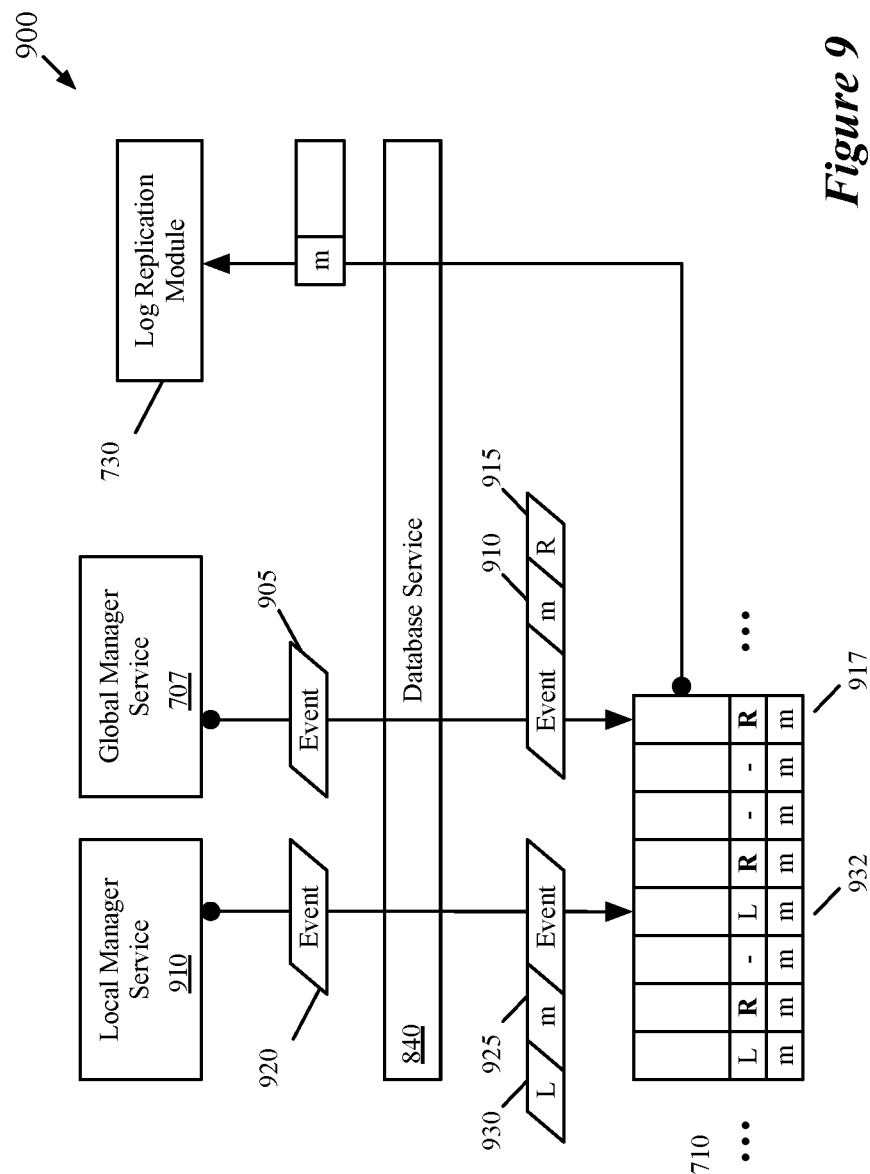
FIG. 9 conceptually illustrates generating an update stream for use by the primary global manager, to replicate the desired configuration to the secondary global manager.
Figure 10:
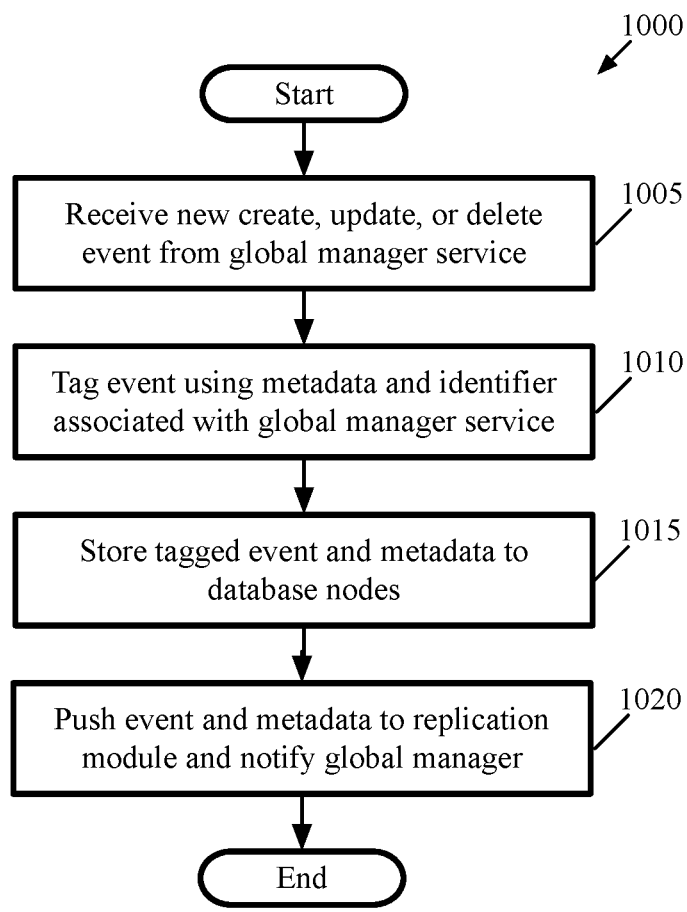
FIG. 10 illustrates a process performed in some embodiments by a database instance to generate an update stream.

In some embodiments, the database 710 generates one or more update streams from the series of transactions. FIG. 9 conceptually illustrates generating an update stream for use by the primary global manager 420, to replicate the desired configuration to the secondary global manager 460. FIG. 10 illustrates a process 1000 performed in some embodiments by a database instance 840 to generate the update stream, with reference to FIG. 9.

The process 1000 begins by receiving at 1005 data describing a desired configuration of the logical network. The received data is in some embodiments one or more create, update, or delete (CUD) events received at the global manager 420 as a series of API transactions, each CUD event affecting one or more logical network elements spanning one or more of the physical sites. For example, in FIG. 9 a CUD event 905 is received by a database instance 840 from the global manager service 707.

At 1010, the process 1000 tags the received CUD event using metadata associated with each transaction, such as timestamp information that can be used for data ordering, and database status to prevent race conditions for access. The metadata also includes in some embodiments parameters associated with the API call, such as user ID, source address, etc. Furthermore, in some embodiments, the metadata includes span information that was specified (e.g., by an administrator) when the CUD event was defined through the user client 440. In the example of FIG. 9, the database instance 840 appends the metadata 910 (denoted by "m") to the data prior to storing it in the database 710.

In some embodiments, not all data stored by the global manager in the database is necessarily intended for replication. Data to be replicated in some embodiments includes policy tables, permissions, physical site information, and other data that the secondary global manager would require in order to assume active status in the event of failure of the primary global manager. Other database tables, such as those that pertain to managing the network in active mode, are not necessary for replication to the secondary global manager in standby mode. In addition, state information about the realization status of the logical network would not need to be replicated to the secondary global manager, since the realization status would be obsolete by the time a failover scenario occurred. Some embodiments distinguish data to be replicated from data that is not to be replicated, by tagging the data for replication.

In some embodiments, the process 1000 also tags (at 1010) the CUD event with an identifier that indicates that the event is to be replicated. For example, in FIG. 9 the database instance 840 appends an identifier 915 (denoted by "R") to the event intended for replication, prior to storing it in the database 710. The database instance 840 does not append any identifier to data that is not intended for replication some such embodiments.

At 1015, the process 1000 stores the tagged CUD event, along with at least some of the metadata, in the database 710. Specifically, in some embodiments, the process 1000 stores the tagged data in each of the database nodes 840-850. In embodiments where the database 710 is a distributed shared log, the tagged data is appended to the log. In the example of FIG. 9, the tagged data is appended to position 917 of the database 710, which is the most recent position in the database.

As noted above, in some embodiments the database 710 is shared by the primary global manager 420 with a local manager 425 (e.g., on the same computing device 445, as illustrated in the example of FIG. 4). In such embodiments, the local manager also writes data corresponding to CUD events to the database, separate from the data written by the global manager. In the example of FIG. 9, the database instance 840 also receives a CUD event 920 from a local manager service 910, which received the event from a user client 440 via a series of API transactions. Unlike the event 905 received from the global manager service 707, the event 920 affects one or more logical network elements that only span the physical site 405. In this example, the database instance 840 received the event 920 from the local manager service 910 before it received the event 905 from the global manager service 707. The database instance 840 appended metadata 925 and a different identifier 930 (denoted by "L") to the event 920 prior to storing it in the database. Accordingly, this tagged event was written to position 932 of the database 710, which at that time was the most recent position of the database.

The process 1000 pushes at 1020 the CUD event 905 and associated metadata 910 to the log replication module 730. In some embodiments, the process 1000 pushes the CUD event to a work queue 711 in the database (not shown in FIG. 9), from which the log replication module 730 (and, the broker service 735, as described below) retrieves it, e.g., after a notification. The database instance 840 does not include the identifier 915 in some embodiments when pushing the CUD event to the log replication module 730. In some embodiments, the process 1000 also notifies the global manager that the CUD event 905 has been pushed to the queue, for dissemination to relevant local managers, as described with reference to FIGS. 12-11 below. As illustrated in FIG. 9, data tagged with a different identifier, or not tagged with any identifier, are not pushed to the log replication module 730. The process 1000 then ends.

As noted above, the database 710 generates an update stream which pushes newly-written CUD events to a log replication module 730, for replication to the secondary global manager 460. Returning to FIG. 7, the global manager 420 also includes an asynchronous replication (AR) module 740 in some embodiments, which has several persistent queues 725-727. Each of these persistent queues 725-727 is dedicated for dissemination of desired configuration data to one of the local managers 425-435 at each physical site 405-415. These queues are replicated across the manager cluster in some embodiments, so that in the event of failure, causality of the database events is preserved and the network management system can pick up where it left off after that failure. In some embodiments, these queues are stored in active memory (e.g., rather than on disk).

Figure 11:
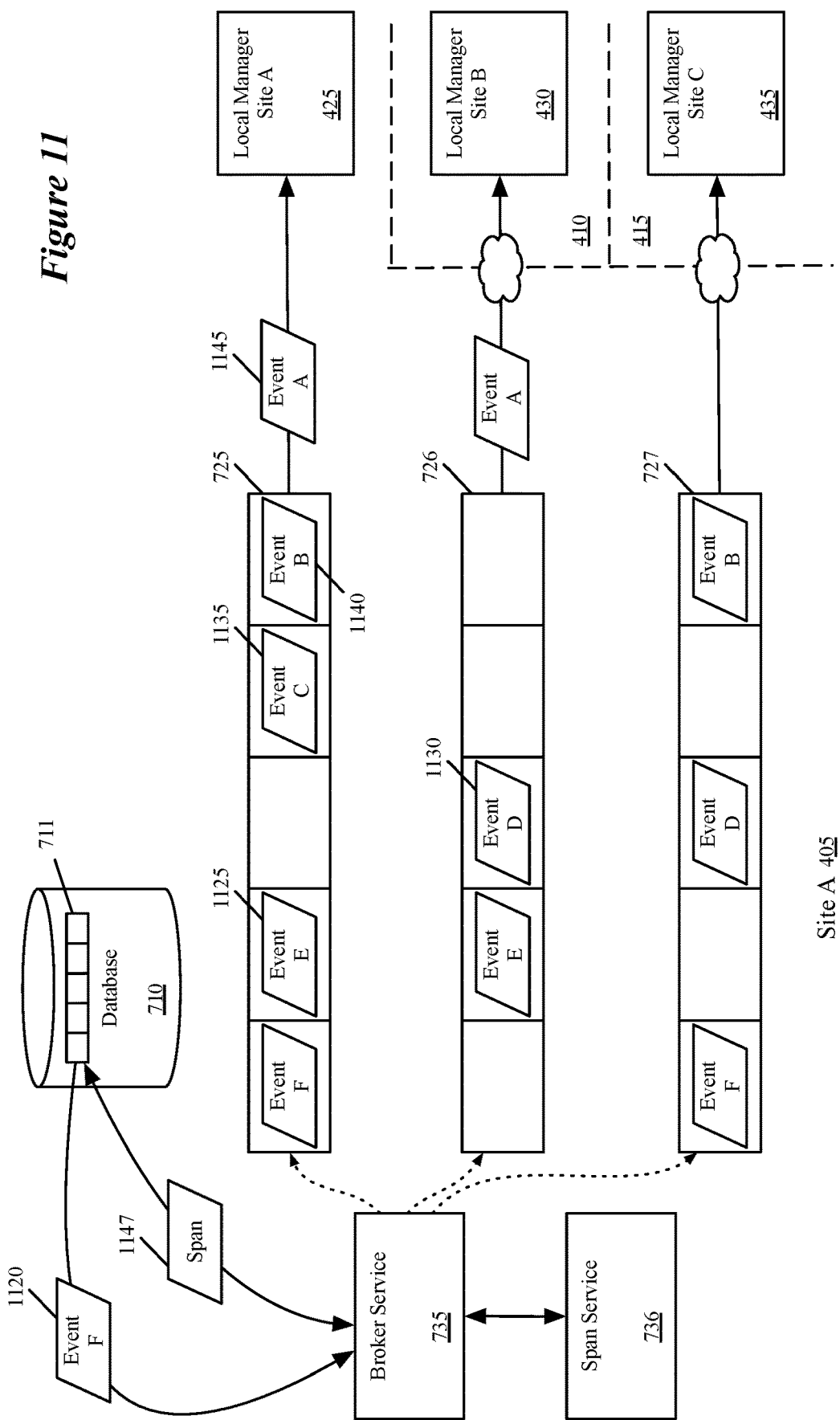
FIG. 11 conceptually illustrates a broker service retrieving a create, update, or delete event from the database and populating relevant persistent queues.

When the primary global manager 420 receives the global desired configuration for the logical network, the global manager stores various portions of the global configuration in the persistent queues 725-727, based on the relevance of the portions to the configuration of the logical network at the queue's corresponding physical site. In some embodiments, a broker service 735 of the global manager 420 identifies the relevant portions the global desired configuration for each physical site, for example based on the span of the logical network elements, as described in further detail below. Span is determined in some embodiments by a span service, which in some embodiments is part of the broker service 735 (as depicted in FIG. 7), and in other embodiments is a standalone service (as depicted in FIG. 11 below). The desired configuration is received in some embodiments as one or more create, update, or delete (CUD) events received at the global manager 420 as a series of API transactions, with each CUD event affecting one or more logical network elements spanning one or more of the physical sites. Each CUD event is a portion in some embodiments of the global desired configuration.

Figure 12:
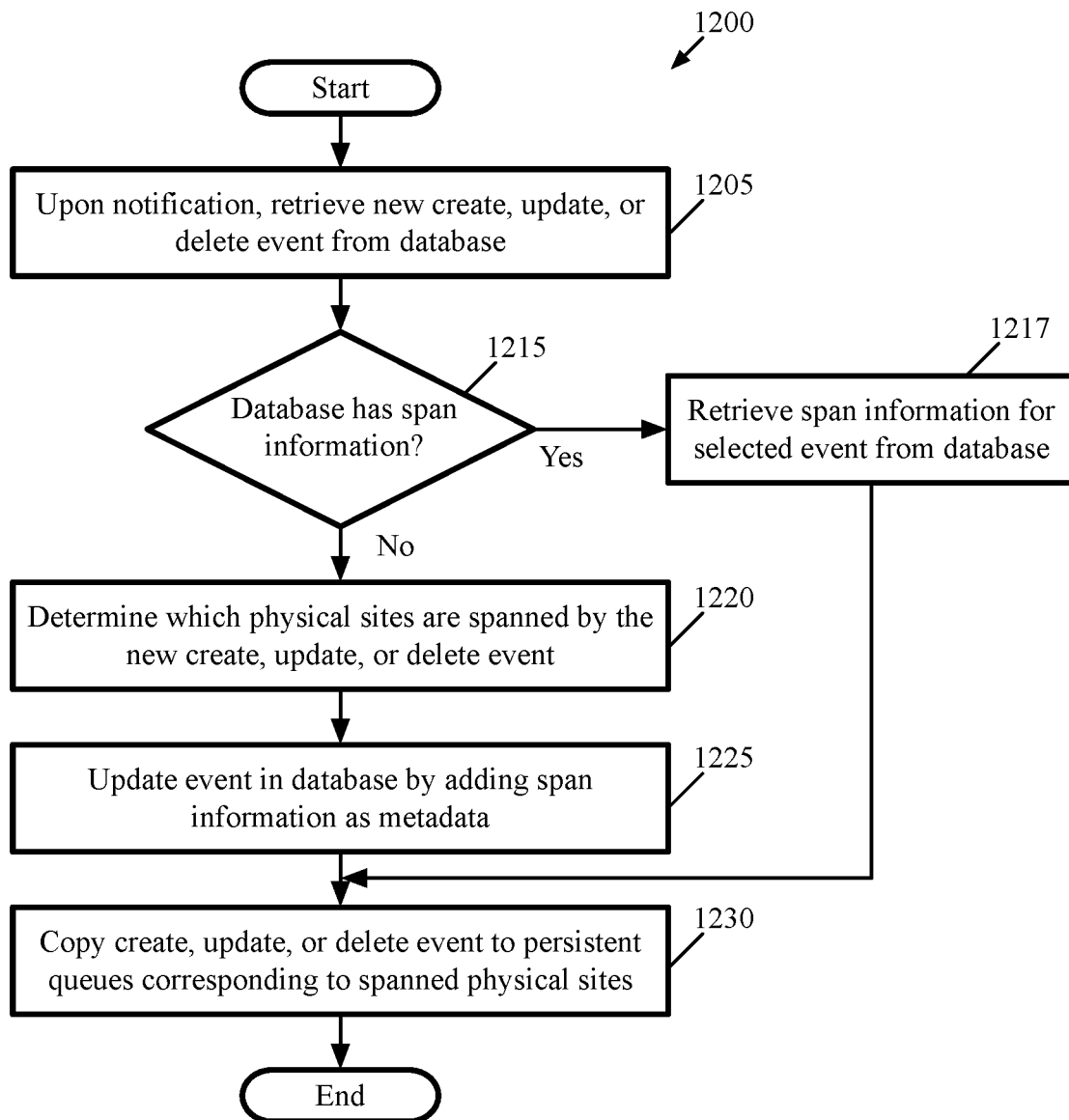
FIG. 12 illustrates a process performed in some embodiments by the broker service to populate the persistent queues.

FIG. 11 conceptually illustrates the broker service 735 of the global manager retrieving a CUD event from the database 712 and populating the relevant persistent queues 725-727 of the AR module 740. FIG. 12 illustrates a process 1200 performed in some embodiments by the broker service 735 to populate the persistent queues 725-727, with reference to the example of FIG. 11.

The process 1200 begins at 1205 by receiving a notification of a new CUD event that has been stored in the database 710. This notification is sent from the global manager 420 or a database instance 840 in some embodiments (e.g., as part of operation 1020 of process 1000). In response to the notification, the broker service 735 retrieves the CUD event. In other embodiments, the broker service 735 periodically queries the database for new CUD events. In either case, in some embodiments, the CUD events are stored in a work queue 711 in the database 712, to preserve their causality and order. The broker service 735 then sequentially retrieves each CUD event from this queue. In the example of FIG. 11, the broker service 735 retrieves CUD event 1120 (labeled, "F") from the work queue 711, after having already received CUD events 1125-1145 (labeled "A" through "F").

At 1215, the process 1200 determines whether the database 710 already stores span information 1147 for the CUD event. In some cases, the span for the CUD event is pre-defined (e.g., when specifying the CUD event through the user client 440) and is stored in the database 712 as metadata (e.g., metadata 910) associated with the event. If the span for the CUD event is available, at 1217 the process 1200 retrieves the span information and proceeds to operation 1230, which is described below.

If the span for the CUD event is not available, then the process 1200 determines at 1220 which physical sites are spanned by the CUD event. In some embodiments, the broker service 735 invokes a span service 736 to perform a span calculation to determine the span, taking into account the definition of the logical network elements that are referenced by the CUD event, as well as the relationship of those logical network elements with other logical network elements in the logical network. Span calculations are described in further detail below with reference to FIG. 17. After determining the span for the CUD event, at 1225 the process 1200 also updates the database with the span information in some embodiments, by storing it as metadata associated with the event.

Based on the span information, at 1230 the process 1200 stores a copy of the event in each persistent queue that corresponds to one of the spanned physical sites. In the example of FIG. 11, after either retrieving or determining the span 1147 for CUD event F 1120, the broker service 735 determines that the span is equal to site A 405 and site C 415. The broker service 735 then copies CUD event F 1120 to the corresponding queues 725 and 727, respectively. The process 1200 then ends.

As noted above, a CUD event refers to one or more logical network elements in some embodiments. If the CUD event refers to different logical network elements with different span attributes, then in some embodiments the broker service 735 copies the relevant portions of the CUD event (corresponding to the different logical network elements) to the relevant queues instead of the entire event.

As noted above, the persistent queues are first-in, first-out (FIFO) queues. In the example of FIG. 11, the broker service 735 first received CUD event A 1145 and determined the span to be sites A 405 and B 410. Therefore, event A 1145 was copied to queues 725 and 726. Since event A 1145 was the first event in the sequence to have been queued, it is the first event to be transmitted (as shown in FIG. 11) from the queues to the respective local managers at the respective sites. Since the primary global manager is also located at site A 405, event A 1145 is transmitted to the local manager 425 over the physical network at the physical site (e.g., a datacenter network fabric). However, since site B 410 is a different physical site, event A 1145 must be transmitted to the local manager 430 over a wide-area network (e.g., the Internet).

The subsequent CUD events B-F 1120-2940 are similarly queued in the same order as received, as illustrated in FIG. 11, with event B 1105 spanning site A 405 and C 415, event C 1135 spanning site A 405, event D 1130 spanning sites B 410 and C 415, event E 1125 spanning sites A 405 and B 410, and event F 1120 spanning sites A 405 and C 415 (as discussed above). Accordingly, queue 1105 stores events B 1140, C 1135, E 1125, and F 1120; queue 1110 stores events D 1130 and E 1125, and queue 1115 stores events B 1140, D 1130, and F 1120. The events are transmitted from each FIFO queue in the same order as they were received.

Returning to FIG. 7, in some embodiments, the AR module 740 at the global manager 420 maintains a set of asynchronous channels that connect the primary global manager 420 to the local managers 425-435. These channels are depicted as dotted lines from the persistent queues 725-727 to corresponding AR modules 755-765 at the local managers 425-435.

In some embodiments, the AR module 740 maintains a dedicated asynchronous channel that connects the primary global manager 420 to the secondary global manager 460. In other embodiments, replication to the secondary global manager 460 is handled by a dedicated log replication module 730, which was described above with reference to FIG. 9. The log replication module receives the data to be replicated from the work queue 711 in the database 712 as described above, and in some embodiments replicates the data, (as depicted by a dot-dash line) directly to the database 712 of the secondary global manager 460, bypassing the AR module.

In some embodiments the secondary global manager 460 also has a receiver module 742 for establishing the connection to the log replication module 730 of the primary global manager, receiving the replicated data, and writing the data to the database 712. If the secondary global manager 460 becomes active (e.g., due to failover), then in some embodiments the receiving module 742 assumes the role of the replication module.

The AR modules 740 and 750-765 maintain the channels between the physical sites, and in some embodiments guarantee various connection parameters (e.g., the minimum bandwidth, the maximum roundtrip time, etc.) that are required for replication of data to the secondary global manager and dissemination of data to the local managers. In embodiments where the secondary global manager and/or the local managers are implemented as a cluster of machines, the channels also identify the leader machine for each manager cluster.

Some embodiments execute a set of site managers 745 at the primary global manager 420 that provide information (e.g., connectivity statistics, IP addresses, etc.) about the physical sites to the AR module 740 to use in maintaining the channels, each site manager corresponding to one of the physical sites 405-415. The site managers 745 execute separately from the AR module 740 in some embodiments (as depicted in FIG. 7), or run as a sub-module of the AR module in other embodiments. The secondary global manager 460 also executes a set of site managers in such embodiments (not shown), though these are not active until a failover scenario.

Figure 13:
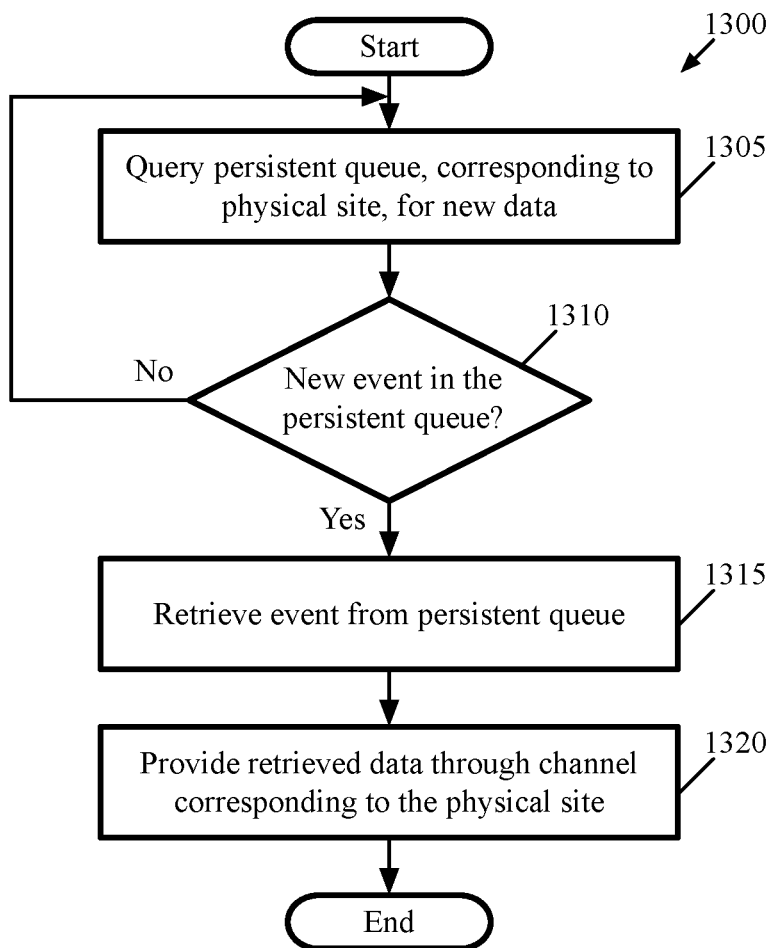
FIG. 13 conceptually illustrates a process performed in some embodiments by the sending AR module at the primary global manager for providing the retrieved data to the secondary global manager and the local managers.

As noted above, the broker service 735 enqueues CUD events to the persistent queues 725-727 of the AR module 740. In some embodiments, the AR module 740 polls its persistent queues 725-727 to determine if there are new CUD events. If data (e.g., corresponding to CUD events) is found in a queue, the AR module 740 retrieves the data (i.e., dequeues the CUD events) and transmits the retrieved data over the channel corresponding to that queue to the AR module of the local manager at the corresponding site. FIG. 13 conceptually illustrates a process 1300 performed in some embodiments by the sending AR module 740 at the primary global manager 420 for providing the retrieved data to one of the local managers 425-435. The process 1300 is described below with reference to FIG. 7.

The process 1300 begins at 1305 by querying a persistent queue that is dedicated to one of the local managers 425-435 at one of the physical sites 405-415. The process 1300 queries the selected queue to see if there are any new CUD events in the queue. The queue will potentially include CUD events that were copied to the queue by the broker service 735 after performing a span calculation, as described in FIG. 12 above. In some embodiments the CUD events reference one or more logical network elements that each span one or more physical sites.

If the process 1300 determines (at 1310) that there is no new data in the selected queue, then the process 1300 returns to 1305 after a specified period of time. The period of time in some embodiments is a time-out value, which varies according to the specific connection parameters of the channel to the physical site. This partly depends in some embodiments on the location of both the global manager 420 and the specific local manager at the site associated with the persistent queue (e.g., the different scenarios for placement of the global manager 420 and the local managers, as described above in FIGS. 4-6). If the process 1300 determines (at 1310) that there is new data in the selected queue, then the process retrieves (at 1315) the data from the queue.

At 1320, the process 1300 then provides the retrieved data to the corresponding physical site, through a channel that connects the AR module 740 of the primary global manager 420 and the corresponding AR module of the physical site's local manager. For example, if the selected queue is queue 725, then the process 1300 transmits the data to the AR module 755 of the local manager 425 at the same site 405, over the network fabric of site 405 through its dedicated channel (represented by a dotted line in FIG. 7). As another example, if the selected queue is queue 726, then the process 1300 transmits the data to the AR module 760 of the local manager 435 at physical site 415, over wide area network 771 through its dedicated channel (represented by a dotted line in FIG. 7).

In this manner the AR module 740 sends the data to the destination corresponding to the queue from which it retrieved the data, whether that destination is at the same physical site or a different physical site, through whatever intervening network infrastructure is necessary. The process 1300 then ends.

Figure 14:
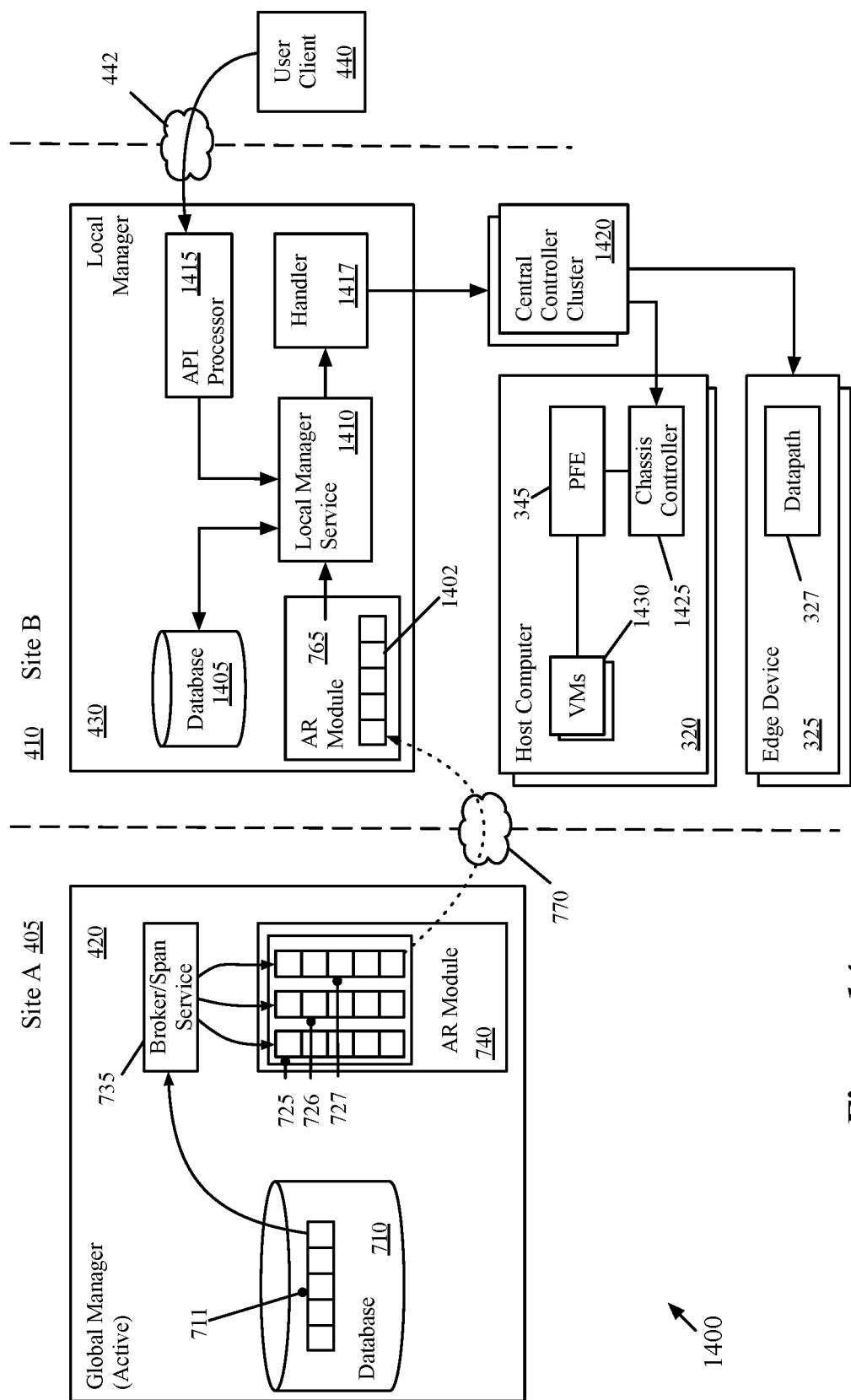
FIG. 14 conceptually illustrates the architecture of a local manager receiving data through a channel from the primary global manager.

FIG. 14 conceptually illustrates the architecture of a local manager receiving data through a channel from the primary global manager 420. The local manager 430 of some embodiments includes a number of modules, including a receiving AR module 765 for receiving the data from the global manager 420, an ingress queue 1402 of the AR module for storing received events, a local manager service 1410 that performs the core local manager functionality, and a database 1405 (which is a distributed database in some embodiments, as described above with reference to FIG. 8). The local manager 430 also includes in some embodiments an API processor 1415 to receive input via REST APIs from a user client 440, and a handler 1417 to send configuration data to the control plane for realization of the desired logical network configuration. These modules and their functions are described in more detail below.

In the example of FIG. 14, the local manager 430 is at a different physical site 410 than the primary global manager's site 405, so the data is received via a wide area network 770 (e.g., the Internet). However, the medium of communication depends in some embodiments on the location of the local manager relative to the global manager 420. For example, if the local manager (e.g., local manager 425) is at the same physical site as the global manager, the data is received in some embodiments through the local physical network at that site (e.g., a datacenter fabric). As another example, if the local manager is co-located on the same host machine (e.g., as illustrated in FIG. 4), then the data is received in some embodiments through an inter-process communication method.

Figure 15:
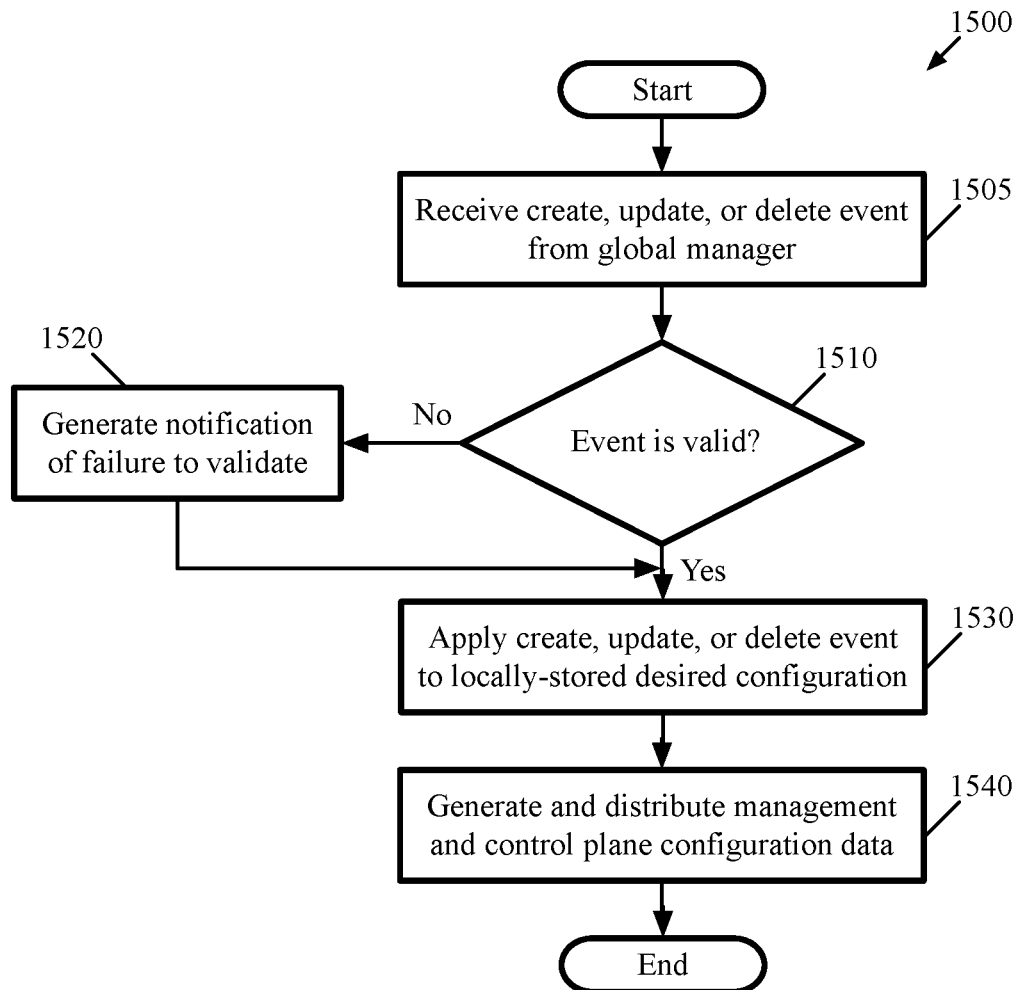
FIG. 15 illustrates a process performed in some embodiments by a local manager when receiving data from the global manager.

As described above with reference to FIG. 12, in some embodiments the broker service 735 retrieves new data from the database 710 and performs a span calculation to determine which queues 725-727 the data should be stored. The global manager's sending AR module 740 then retrieves the data from each queue, as described above with reference to FIG. 13, and transmits the data through dedicated channels to the corresponding physical sites. Each channel connects the sending AR module 740 of the primary global manager 420 to one of the receiving AR modules 755-765 of the local managers 425-435. FIG. 15 illustrates a process 1500 performed in some embodiments by a local manager when receiving data from the global manager, with reference to the example of FIG. 14.

The process 1500 begins at 1505 by receiving data from the primary global manager. Specifically, the data is received from the sending AR module 740 of the primary global manager, via a dedicated channel between the sending AR module and the receiving AR module of the local manager (e.g., AR module 765 of local manager 430 in FIG. 14). In some embodiments, the receiving AR module 765 maintains a persistent ingress queue 1402 to store the received data, which in some such embodiments is stored in active memory. The received data corresponds in some embodiments to one or more CUD events that each reference one or more logical network elements that span one or more physical sites, including the physical site 410. The order and causality of the received data is preserved by the ingress queue 1402 in some embodiments.

At 1510, the process 1500 determines if the CUD event (or events) associated with the received data is valid. The validation is based on whether there is any error or inconsistency in applying the CUD event to the configuration of the logical network at the physical site. In addition, other validations are rules in some embodiments that govern whether a logical network element can be updated to stretch its span to a new site. For example, prior to stretching an element to a new site, the security policies that affect the element must be stretched to the new site first. Otherwise, a loophole is created where the security policies applicable to the logical network element are not fully applied. In some embodiments, the validation is performed by the local manager service 1410, which retrieves the CUD event from the ingress queue 1402 and stores it in the database 1405.

If the process 1500 determines that the CUD event is invalid, then a notification for the primary global manager of the failure to validate the CUD event is generated at 1520. The notification in some embodiments is a notification event that is queued in an egress queue (not shown) of the AR module 765, to be sent back to the AR module 740 at the global manager 420 via the same asynchronous channel (e.g., the dotted line in FIG. 14). In other embodiments, the notification event is sent via an out-of-band notification channel. Notification events in the egress queue are retrieved and sent over the channel separately from process 1500, e.g., as part of the core functionality of the local manager service 1410, or as another module (not shown).

Invalid events are not dropped in some embodiments, but are also persisted in order to maintain causality. The invalid event will still be accepted, and an intervention (e.g., by an administrator of the network) will be required to resolve the invalidity. The notification events are described in more detail with reference to FIGS. 30-32 below. Accordingly, the process 1500 then continues to 1530.

At 1530, the process 1500 applies the CUD event to the local desired configuration of the logical network at the physical site. The desired configuration of the logical network is expressed as a policy tree in some embodiments, which is described in further detail below with reference to FIGS. 17-20. In the example of FIG. 14, the desired configuration of the logical network, e.g. the configuration of the logical network elements whose span includes the physical site 410, is stored in the local database 1405.

For example, if the validated CUD event is a create event, then a logical network element defined by the event is created within the desired configuration stored in the database 1405. If the CUD event is an update event, then the desired configuration of a logical network element referenced by the event is updated within the desired configuration stored in the database 1405. If the CUD event is a delete event, then a logical network element referenced by the event is deleted within the desired configuration stored in the database 1405.

At 1540, the process 1500 uses the (now modified) desired configuration of the logical network to generate and provide configuration data to the control plane of the logical network (e.g., a central controller or cluster of controllers at each site). In some embodiments, these controllers identify computing devices at the site which execute physical forwarding elements, and distribute the configuration data to the identified computing devices. In some embodiments, different logical network elements span different computing devices (e.g., host computers, edge devices, etc.). Each logical network element is implemented in some embodiments by physical forwarding elements executing on the identified computing devices at the sites that are spanned by that logical network element. In other words, a logical network element is implemented by at least one physical forwarding element at each site which it spans. Some embodiments have local controllers (also referred to as chassis controllers) that execute on one or more of the computing devices alongside the physical forwarding elements, and which receive the configuration data from the controller cluster. The local controllers use the configuration data to configure the physical forwarding elements to implement the logical network elements at each computing device. The process 1500 then ends.

Figure 16:
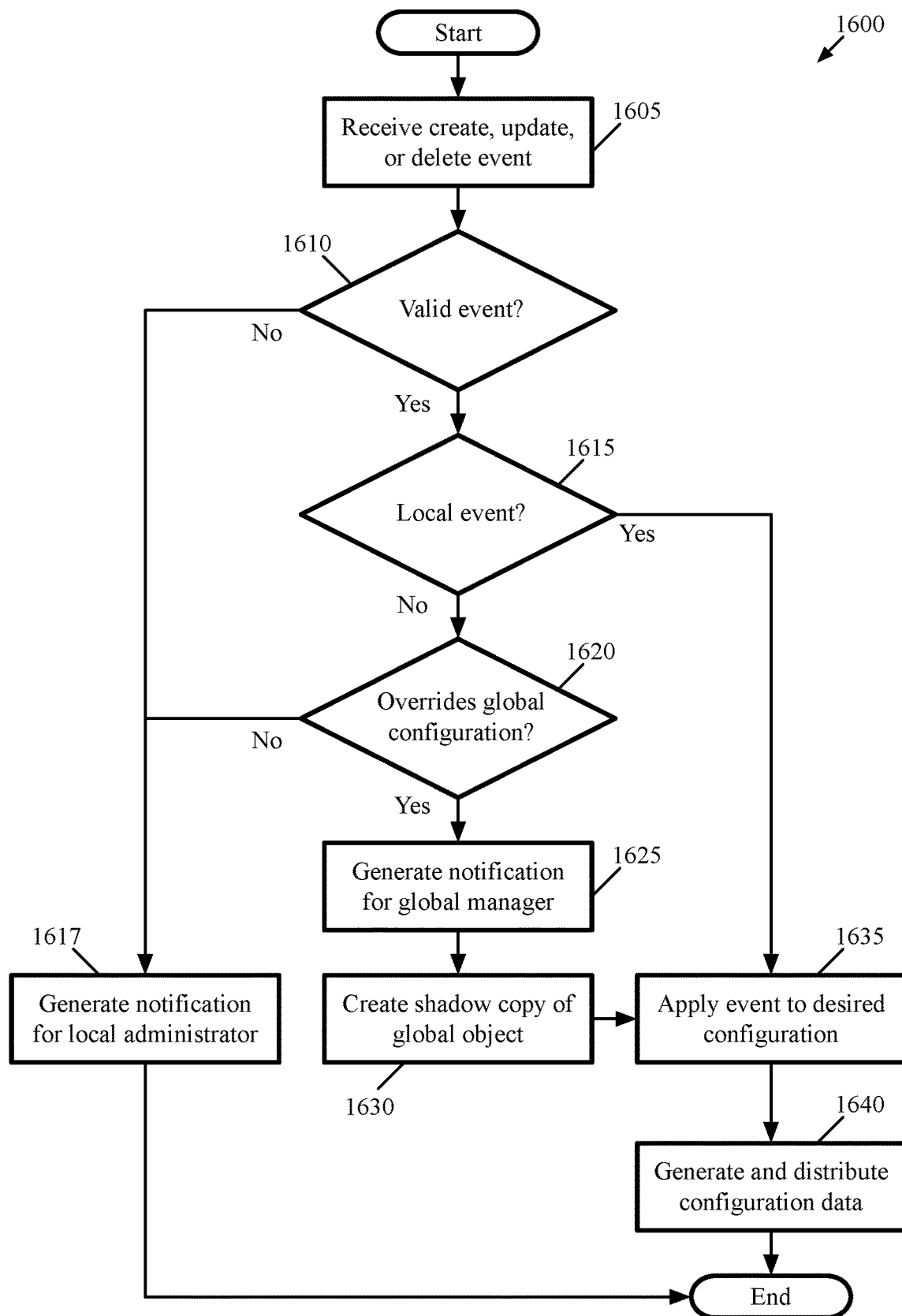
FIG. 16 conceptually illustrates a process performed in some embodiments by the local manager when it receives a CUD event directly from a user client, instead of from the global manager.

FIG. 16 conceptually illustrates a process 1600 performed in some embodiments by a local manager at a physical site, when it receives a CUD event directly from a user client 440, instead of from the global manager 420. This scenario occurs for example when a local administrator of the physical site (who may or may not be the same as the administrator of the global federated logical network as a whole) modifies the logical network's desired configuration as implemented at the local site (e.g. by specifying a series of create, update, or delete events for logical network elements whose span includes the local site).

The process 1600 begins at 1605 by receiving a CUD event directly from a user client 440. For example, as illustrated in FIG. 14, data describing the CUD event is received from a user client 440 and directly stored in the database 710 in some embodiments using a series of transactions, initiated through a series of REST API calls from the user client to the primary global manager 420. The user client 440 is not at the same physical site in some embodiments, so the CUD event is received by the local manager 430 over a wide-area network 442 (e.g., the Internet). These API calls are received and processed by an API processor module 1415 of the local manager 430 in some embodiments, which then provides the received data to the local manager service 1410 that performs the core functions of the local manager 430.

The process 1600 determines at 1610 whether the CUD event (or events) is valid. The validation is based on whether there is any error or inconsistency in applying the CUD event to the configuration of the logical network at the physical site. In some embodiments, the validation is performed by the local manager service 1410, either directly upon receipt from the API processor 1415, or after retrieving the event from the database 1405.

If the process 1600 determines that the CUD event is invalid, then a notification for the failure to validate the CUD event is generated at 1617. The notification in some embodiments is a notification event, that is provided to the user client 440 for intervention (e.g., by an administrator of the network). The process 1600 then ends.

If the process determines that the CUD event is valid, then the process determines at 1615 whether the event is a local event. In other words, it determines if the CUD event only references logical network elements defined at the local site. These elements, if defined through the local manager, have no span beyond the physical site, and are not known to the global manager 420 in some embodiments. If the CUD event is a local event, then the process 1600 continues to 1635, which is described below.

If the process 1600 determines that the CUD event is not a local event, i.e. it references a logical network element that was defined at the global manager 420, then the process determines at 1620 whether the event overrides the globally-defined desired configuration of the logical network element. This determination is made in some embodiments by applying a set of priority rules to the CUD event to determine whether the CUD event is allowed to override the globally-defined desired configuration. For example, some embodiments only allow overriding of the desired configuration by a local CUD event for networking-related configurations (e.g., message forwarding rules and policies) or configuration profiles (timers, etc. which are affected by the local site's parameters, such as latency). In such cases, the local CUD event would have priority.

As another example, some embodiments prevent overrides of the desired configuration by a local CUD event for security-related configurations. In such cases, the globally-defined desired configuration would have priority. In addition, in some cases the event is an emergency-related event, which is only recognized by the local manager and therefore does override any related global configuration. If the event does not have priority to override the global configuration (e.g., according to the priority rules), then the process continues to 1617, which was defined above.

At 1625, if the process 1600 determines that the CUD event does have priority to override the globally-defined desired configuration, then a notification for the primary global manager of the override event is generated at 1625. The notification in some embodiments is a notification event that is queued in an egress queue (not shown) of the AR module 765 to be sent back to the AR module 740 at the global manager 420, via the same asynchronous channel (e.g., the dotted line in FIG. 14). In other embodiments, the notification event is sent via an out-of-band notification channel. Notification events in the egress queue are retrieved and sent over the channel separately from process 1600, e.g., as part of the core functionality of the local manager service 1410, or as another module (not shown).

At 1630, the process 1600 creates a local copy of the logical network element the configuration of which is to be overridden by the CUD event. The original logical network element from the global manager 420 remains as a read-only object in the local manager's database 1405. This local copy (also referred to as a shadow object) is the target of the CUD event instead of the original.

At 1635, the process 1600 applies the CUD event to the local desired configuration of the logical network at the physical site. If the event is an override, then the process 1600 applies the CUD event to the shadow copy of the object instead of the original object received from the global manager 420. The desired configuration of the logical network is expressed as a policy tree in some embodiments, which is described in further detail below with reference to FIGS. 17-20. In the example of FIG. 14, the desired configuration of the logical network, e.g. the configuration of the logical network elements the span of which includes the physical site 410, is locally stored in the database 1405. The CUD event is applied to the local desired configuration.

For example, if the CUD event is a create event, then a logical network element defined by the event is created within the local desired configuration stored in the database 1405. If the validated CUD event is an update event, then the desired configuration of a logical network element referenced by the event is updated within the local desired configuration stored in the database 1405. If the validated CUD event is a delete event, then a logical network element referenced by the event is deleted within the local desired configuration stored in the database 1405.

At 1640, the process 1600 uses the desired configuration of the logical network to generate and provide configuration data to the control plane of the logical network (e.g., a central controller or cluster of controllers at each site). The process 1600 then ends.

As noted above with reference to FIGS. 15-16, the local manager 430 generates and provides configuration data from the desired configuration of the logical network stored in the local database 1405. In the embodiment exemplified by FIG. 14, the local manager service 1410 generates the configuration data from the stored desired configuration, and provides the generated data to a handler module 1417. The handler module 1417 then distributes the configuration data to a central controller cluster 1420 of one or more controllers. The controller cluster 1420 identifies host computers 320 and edge devices 325 to which to distribute the configuration data. At each edge device 325, the configuration data is used to configure the edge's datapath 327. At each host computer 320, the configuration data is received by a chassis controller 1425, which uses it to configure at least one PFE 345 executing on the host 320, to forward data messages to and from one or more attached VMs 1430.

The controllers 1420, in addition to distributing configuration data to computing devices such as host computers 320 and edge devices 325, receive physical network to logical network mapping data from the computing devices in some embodiments and share this information across datacenters. For example, these mappings are in some embodiments between logical addresses (e.g., MAC addresses of logical network endpoints i.e. VMs 1430 executing on the computing devices) and physical addresses (e.g., IP addresses of tunnel endpoints at the computing devices). The controllers 1420 retrieve and share tunnel endpoint to logical network address mapping data between the host computers 320 and edge devices 325 at the physical site 410, and also share that data with the controllers at the other physical sites 405 and 415 so that those controllers can share this data with their own site's host computers and edge devices.

In some embodiments, the computing devices at each site also execute machines alongside physical forwarding elements and local controllers. These machines include logical network endpoints, which are sources and destinations of data message traffic (e.g. computers, virtual machines, containers, etc.), and service machines, which perform services on the data traffic (e.g. firewalls, load balancers, etc.). A machine is located at a single site at a given time, but may be migrated between sites in some embodiments. These machines connect in some embodiments to the physical forwarding elements in order to exchange data messages in the network.

Figure 17:
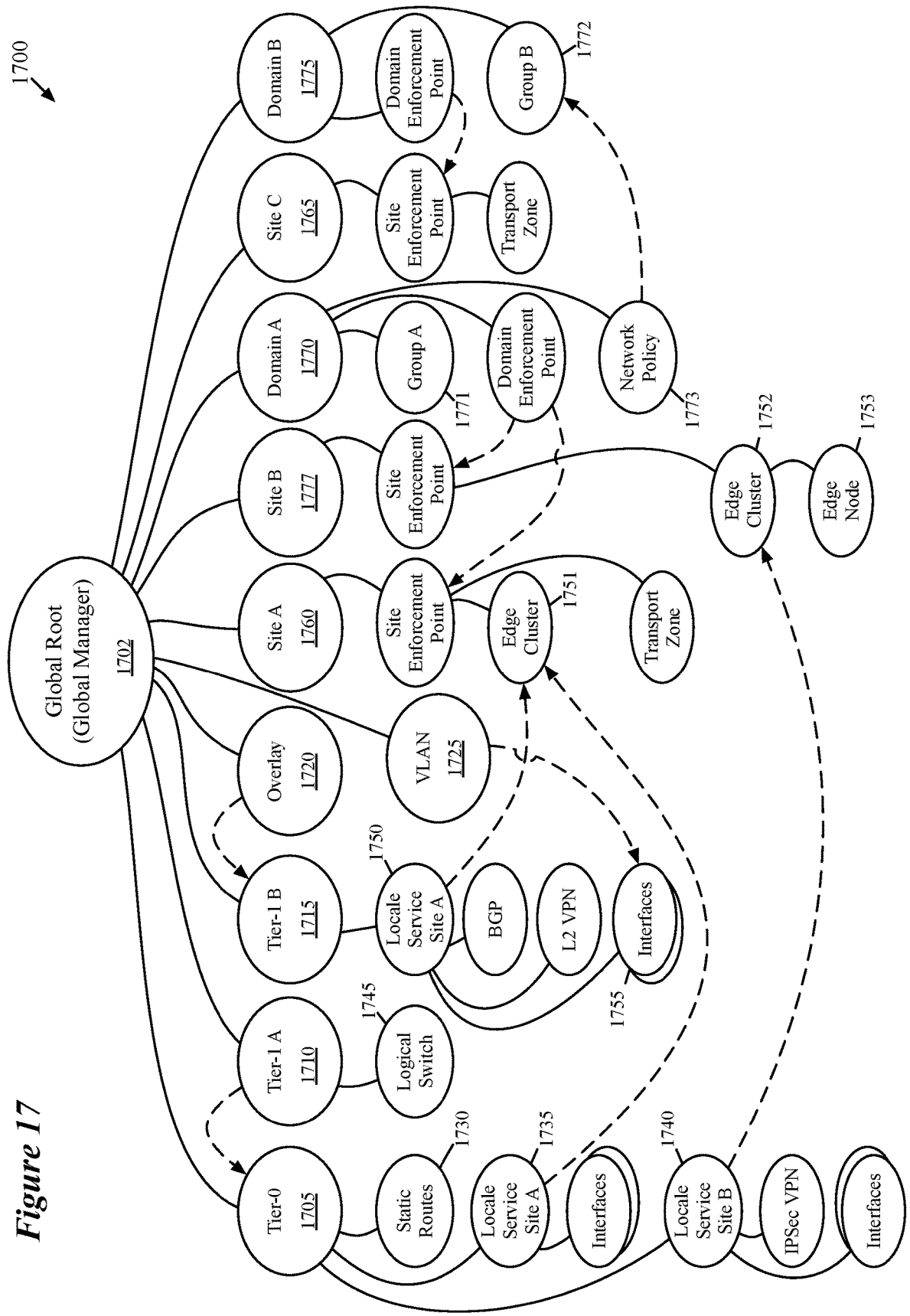
FIG. 17 conceptually illustrates an example of a global policy tree of some embodiments.

In some embodiments, the global desired configuration of the logical network is expressed as a hierarchical tree (also referred to as a global policy tree) with nodes and connections between the nodes. The global policy tree is stored by the primary global manager 420 in its database 710. A replicated global policy tree is also stored by the secondary global manager 460 in its database 712. In some embodiments, the nodes represent logical network elements that span one or more sites and logical network policies that apply to those elements, and the connections represent relationships between the nodes (e.g., parent-child relationships, logical network connections, etc.). Cross-referencing between nodes is achieved by reference to a path through the tree's hierarchy (e.g., global-infra/sites/London/enforcepoint/edge-cluster) which provides information about the span of each node. FIG. 17 conceptually illustrates an example of one such global policy tree 1700 of some embodiments, for a logical network that spans multiple physical sites.

The logical network elements include logical forwarding elements that forward data in the logical network, e.g. logical routers, logical switches, etc. For example, in FIG. 17, the global policy tree root 1702 connects a single Tier-0 logical router T0 1705, two Tier-1 logical routers T1A 1710 and T1B 1715, and two different types of network segments. These segments are an overlay network segment 1720 and a VLAN segment 1725. The node for router T0 1705 has a number of child nodes, including static route definitions 1730 and locale services 1735 and 1740 referencing physical sites A 1760 and B 1777. In this example, the router T0 1705 also spans site C 1765, but the corresponding locale services referencing site C are not shown in the figure for clarity. The node for router T1A 1710 has a child node for a logical switch 1745. The node for router T1B 1715 has a child node for a locale service 1750 referencing physical site A.

The locale service nodes for the T0 router and the T1 routers define these routers' span. For example, router T0 1705 spans sites A 1760, B 1777, and C 1765, while router T1B 1715 spans site A 1760. As more locale services are added to a T0 or T1 router, the router is stretched to the corresponding sites. Unlike router T1B 1715, router T1A 1710 does not have a locale service child node, and instead has a reference (dashed line) to router T0 1705. Therefore, router T1A 1710 inherits the span of router T0 1705 (i.e., router T1A 1710 spans sites A 1760, B 1777, and C 1765). Certain child nodes also inherit that span automatically in some embodiments. Accordingly, the static route definitions 1730 under the T0 router 1705 also span sites A 1760, B 1777, and C 1765. The logical switch 1745 inherits the span of its parent router T1A 1710, which in turn derives its span from the reference to router T0 1705. Therefore, logical switch 1745 also spans sites A 1760, B 1777, and C 1765.

Each node in the global policy tree 1700 has multiple attributes that define configuration parameters, some of which are defined by the user and others of which are inherited. In some embodiments, span is not the only attribute that is inherited by a child node from a parent node. For example, certain T0 or T1 routers that span more than one site have one of the physical sites assigned as a primary site, with the other sites being secondary sites. If such a logical router has multiple service router (SR) components, then the SR component at the primary site takes precedence for certain operations. This configuration is specified (e.g., by an administrator of the network) for the router and is not part of the configuration of the locale services under the router.

The locale service nodes 1735, 1740, and 1750 have references (dashed lines) to edge clusters 1751 and 1752 at the respective sites A 1760 and B 1777. As noted above, in this example the T0 router 1705 also spans site C 1765, but the router's locale service for that site and therefore the corresponding reference to an edge cluster under the site C node 1765 is omitted for the sake of visual clarity. The locale service nodes are associated in some embodiments with the service routers described above with reference to FIG. 2. Edge clusters are described below with reference to site nodes. The local service nodes also have various types of child nodes in some embodiments, defining various different types of configuration information available at the respective site, including interfaces (e.g., logical ports), L2 VPNs, BGP services, and IPSec VPNs. Even though locale services are child nodes of other elements, they do not necessarily inherit the full span of those elements. A locale service node has the span of the single site in some embodiments (i.e., the site of the edge cluster node referenced by the local service node), so all child nodes only inherit the span of the single site to which the local service node refers.

The logical switch 1745 is shown as a child node under router T1A 1710. Such logical switches, also referred to as segments, are restricted to the parent router if they are connected as child nodes (as in FIG. 17). However, in some embodiments logical switches are also directly connected to the global root 1702. For example, overlay segment 1720 is directly connected to the global root 1702, and has a reference (dashed line) to router T1B 1715. This allows the overlay segment 1720 to be moved to a different router if desired, by simply changing the reference to another logical router at the top level below global root 1702. The overlay segment 1720 inherits the span of router T1B 1715, e.g. site A, but the overlay segment could be stretched automatically if another locale service were to be added to router T1B 1715.

Another type of segment in some embodiments is a VLAN-backed segment. These are defined with respect to a transport zone, which is a group of host devices at a single physical site. Therefore, the VLAN-backed segment can only span that single site where the transport zone is defined. In some embodiments, VLAN-backed segments are used as uplinks in some embodiments, to connect a logical router to an external physical router outside the logical network. In other words, the VLAN is between the Tier-0 router and the external router. Since multiple Tier-0 routers may connect to same external physical router, VLAN-backed segments are used in some embodiments to distinguish their traffic. Typically, connecting a logical Tier-0 router to physical router happens at a single physical site, since each site has its own connection to the wide-area network (e.g., the Internet) between the sites, i.e. a unique Internet Service Provider (ISP). Accordingly, VLAN-backed segments provide a way of logically isolating traffic from different Tier-0 routers to the same external router, even though the Tier-0 routers may be stretched across multiple sites and overlap in their span.

In the example of FIG. 17, VLAN segment 1725 has a reference (dashed line) to an interface 1755 of the locale service 1750 under router T1B 1715. The interface 1755 is limited to the span of the locale service 1750, so by connecting the VLAN segment 1725 to the interface 1752, the span of the VLAN segment is limited to only site A 1760 as required. If another locale service were to be added under router T1B 1715, then the span of router T1B would stretch to include the new site, but the span of VLAN segment 1725 would be unchanged since its reference is to the interface 1755 of the local service 1750.

Interfaces in some embodiments are uplinks or service ports. Interfaces connect to logical switches or segments, and then logical network endpoints (such as virtual machines, data compute nodes, or other types of workloads) are attached to those logical switches and segments. These endpoints also have their own services, such as DNS, TCP, etc.

In addition, the logical network elements include nodes for each physical site. For example, in FIG. 17, there are nodes for site A 1760, site B 1777, and site C 1765 under the global root 1702. Each site has an enforcement point child node, under which specific resources are assigned, such as edge clusters, transport zones, etc. In the example, site A's edge cluster 1751 has incoming references from locale services 1735 attached to router T0 1705 and from locale services 1750 attached to router T1B 1715. The edge cluster 1752 at site B 1777 has an incoming reference from the locale services 1740 attached to router T0 1705. In some embodiments, edge clusters also have children corresponding to edge nodes 1753, which actually execute the services such as firewalls, DHCP, etc.

The logical network elements also include logical constructs in some embodiments, such as domains that are logical groupings of one or more sites (e.g., geographic regions), and groups of logical network endpoints that share one or more attributes (e.g., operating system, region, etc.). Domains are defined and represented as nodes in the global policy tree 1700 beneath the global root 1702. The domains are defined in some embodiments at the global manager 420, e.g. by an administrator of the logical network. Unlike sites, which represent a physical construct, domains are a logical construct, which serve as an envelope to group different logical entities together, e.g. for security purposes. For example, firewall policies or other policy micro-segmentation applied to the domain will automatically be applied to all groups of logical endpoints defined within the domain.

In some embodiments, there are different types of domains. For example, some domains are specific to a single physical site, and are referred to as locations. This type of domain acts as the container for all site-wide and site-specific configuration and policies. In some embodiments, a location domain is automatically created for each physical site in the federated logical network, and cannot be modified by the user.

Other domains are logical groups of one or more sites, and are referred to as regions. Regions are assigned to geographic regions in some embodiments. For example, in the example of FIG. 7, physical site A 405 may be in Paris, physical site B 410 in London, and physical site C 415 in New York. These correspond to the site nodes A 1760, B 1777, and C 1765 in the example of FIG. 17, respectively. One region can then be defined (e.g., Europe), which includes physical sites A and B, and a different region defined (e.g., North America) which includes physical site C. This is useful for example in case there are different regulatory environments (e.g., the European Union's General Data Protection Regulation, or GDPR). Regions and locations, like all domains, are attached to global root 1702 and are not attached to other domains as child nodes. Some embodiments restrict each physical site to membership in a single location and a single region. In other words, a location may not have more than one physical site, and a physical site may not be a member of two regions.

In some embodiments, domains are only created as top-level nodes beneath the global root 1702, and cannot be children of other domains or inherit span from other domains. Instead, the span of a domain is manually defined in some embodiments at the global manager (e.g., by an administrator of the logical network) as the sites that are members of the domain. The span is represented in some embodiments by a domain enforcement point, which is configured to reference the site enforcement point for whichever sites the domain is intended to span. These domain enforcement points are only used by the global manager in some embodiments, and are not used by the local managers. For example, in FIG. 17, the domain enforcement point for domain A 1770 references the site enforcement point of site A 1760 (e.g., Paris) and the site enforcement point of site B 1777 (e.g., London). Therefore, the domain A 1770 is a region (e.g., Europe) spanning sites A and B, as well as other sites (e.g., Berlin) that are not shown in FIG. 17. In addition, the domain enforcement point for domain B 1775 references the site enforcement point of site C 1765 (e.g., New York). Therefore, the domain B 1775 spans site C 1765. In this example, domain B 1775 is a region (e.g., North America) that may also span other physical sites (e.g., Chicago, Los Angeles, etc.) that are not shown in FIG. 17. Alternatively, domain B 1775 is a location that is specific to site C 1765 alone. For a given domain, the group of (one or more) site enforcement points that are referenced by the domain's enforcement point is also referred to as a domain deployment map in some embodiments.

In some embodiments, logical network endpoints at each site are logically organized into security groups which can span multiple sites. Service machines as well as managed forwarding elements executing on host computer apply logical network policies (such as network policy 1773) to the data messages exchanged between security groups of endpoints in some embodiments, based on policy rules that are defined in terms of these groups. Such security groups and network policies are defined at the global manager 420 through the user client 440 (e.g., by an administrator of the logical network). In some embodiments, security groups and network policies are represented in the global policy tree 1700 as child nodes of domains, and accordingly inherit their parent domain's span. In some embodiments, the span of a network policy is defined not only by its parent domain, but also by sites and/or domains which are referenced by the policy.

For example, in FIG. 17, domain A 1770 has a child node corresponding to security group A 1771, which accordingly inherits a span of sites A 1760 and B 1777 (i.e., the span defined by the domain deployment map of domain A). In addition, domain B 1775 has a child node corresponding to security group B 1772, which accordingly inherits a span of site C 1765 (i.e., the span defined by the domain deployment map of domain B 1775).

Domain A 1770 also has a child node corresponding to a network policy 1773. The network policy is applicable to any groups defined under the same domain (e.g., group A 1771). In order to apply a policy to a security group, the span of the security group in some embodiments must include the span of the policy.

In some embodiments, network policies may also refer to security groups that are not in the same domain. For example, the network policy 1773 also references security group B 1772, which is in domain B 1775, even though the domain deployment map for the parent domain A 1770 does not include domain B 1775. Such cross-domain policies are discussed in further detail below with reference to FIG. 25.

In some embodiments, some nodes derive their span from span leaders. Certain types of nodes are span leaders, for example a T0 router, a T1 router that is below the global root, a domain, or locale services. A T1 router that is defined beneath a T0 router is not a span leader, in some embodiments. A domain is the span leader for all security policies defined under the domain. Groups are also span leaders in some embodiments, and do not strictly inherit span from their parent nodes (e.g., domains) since the span of a group may be extended beyond its parent domain through reference groups, which are described in more detail below with reference to FIG. 25.

Figure 18:
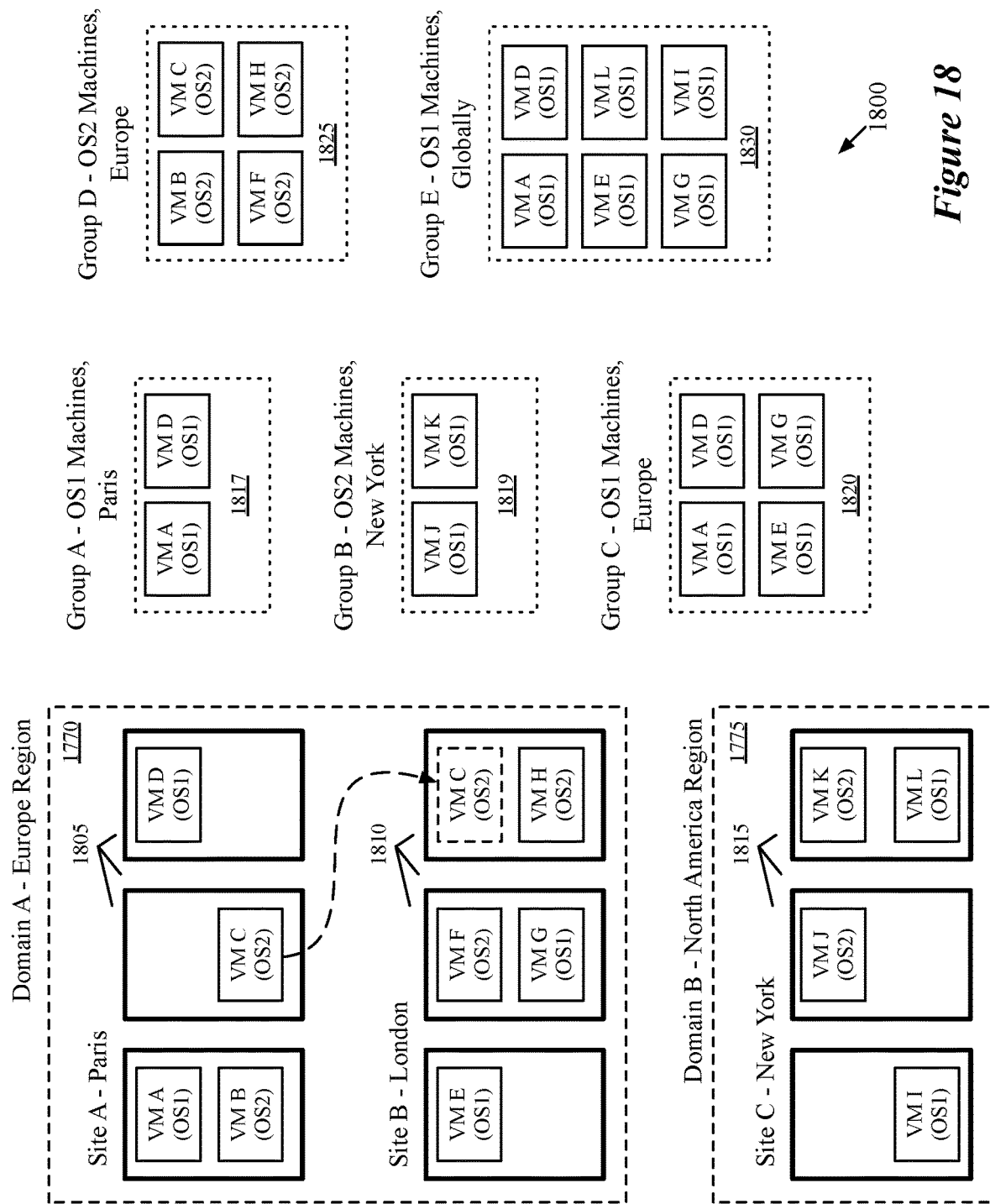
FIG. 18 conceptually illustrates examples of security groups that span one or more physical sites.

FIG. 18 conceptually illustrates five examples of security groups that span one or more physical sites. The figure illustrates a group of host computers 1805 located at physical site A (e.g., Paris), a group of host computers 1810 located at physical site B (e.g., London), and a group of host computers 1815 located at physical site C (e.g., New York). The host computers 1805 at site A execute a group of virtual machines (VMA-VMD) each of which either runs operating system OS1 (e.g., Windows Server by Microsoft Corporation) or operating system OS2 (e.g., Linux). Likewise, the host computers 1810 at site B execute VMs VME-VMH, and the host computers 1815 at site C execute VMs VMI-VML.

As noted in the discussion above with reference to FIG. 17, groups are also represented in some embodiments as child nodes of a domain. In such cases, the group inherits the span of its parent domain, i.e. the group is defined at the sites which are members of its parent domain. Logical network endpoints located at a site may join a group if the group is defined at that site (i.e., if the group spans that site).

As described above with reference to FIG. 17, sites A and B (e.g., Paris and London) are members of domain A 1770, which is a region (e.g., Europe). This logical grouping of the two physical sites is represented by a dashed line enclosing the host computers 1805 and the host computers 1810. In addition, site C (e.g., New York) is a member of domain B 1775, which is also a region (e.g., North America). This logical grouping is represented by a dashed line enclosing the host computers 1815.

The first security group is group A 1817, which is defined as all VMs which run operating system OS1 in Paris. This security group is defined logically at the global manager 420 (e.g., by an administrator of the logical network) to have a span of domain A 1770 (i.e., sites A and B). As a result, VMs A and D are automatically added to security group A 1817. Security policies which span domain A 1770 may be applied by an administrator of the network to security group A 1817, and would automatically therefore be applied to VMs A and D.

The second security group is group B 1819, which is defined as all VMs which run operating system OS2 in New York. This security group is defined logically at the global manager 420 (e.g., by an administrator of the logical network) to have a span of domain B 1775 (i.e., site C). As a result, VMs J and K are automatically added to security group B 1819. Security policies which span site C (i.e., domain B 1775) may be applied by an administrator of the network to security group B 1819, and would automatically therefore be applied to VMs J and K.

The third security group is group C 1820, which is defined as all VMs which run operating system OS1 in Europe. This security group is defined logically at the global manager 420 (e.g., by an administrator of the logical network) to have a span of domain A 1770 (i.e., sites A and B). As a result, VMs A, D, E, and G are automatically added to security group C 1820. Security policies which span site A, site B, or sites A and B may be applied by an administrator of the network to security group C 1820, and would automatically therefore be applied to VMs A, D, E, and G.

The fourth security group is group D 1825, which is defined as all VMs which run operating system OS2 in Europe. This security group is defined logically at the global manager 420 (e.g., by an administrator of the logical network) to have a span of sites A and B. As a result, VMs B, C, F, and H are automatically added to security group D 1825. Security policies which either span site A, site B, or sites A and B may be applied by an administrator of the network to security group D 1825, and would automatically therefore be applied to VMs B, C, F, and H.

The fifth security group is group E 1830, which is defined as all VMs which run operating system OS1 in all regions globally. This security group is defined logically at the global manager 420 (e.g., by an administrator of the logical network) to have a span of sites A, B, and C. As a result, VMs A, D, E, G, I, and L are automatically added to security group E 1830. Security policies which either span site A, site B, site C, or any combination of sites A-C, may be applied by an administrator of the network to security group E 1830, and would automatically therefore be applied to VMs A, D, E, G, I, and L.

As noted above, in some embodiments for a network policy to be applicable to a security group, the span of the security group must include the span of the network policy. For example, network policy 1773 in the example of FIG. 17 would be applicable to security group E 1830, since the span of security group E 1830 includes the span of network policy 1773. The applicability of network policies to security groups is discussed in further detail with reference to FIG. 25 below. In addition, in some embodiments, VMs may migrate between physical sites, e.g. VM C migrating (dashed arrow) from host machines 1805 to host machines 1810.

As discussed above, the global manager 420 performs a span calculation in some embodiments for each logical network element, to determine which logical network elements are implemented at each physical site. This is performed to provide the relevant desired global configurations to each physical site (e.g., through the asynchronous replicator channel, as described above in some embodiments with reference to FIG. 13).

Figure 19:
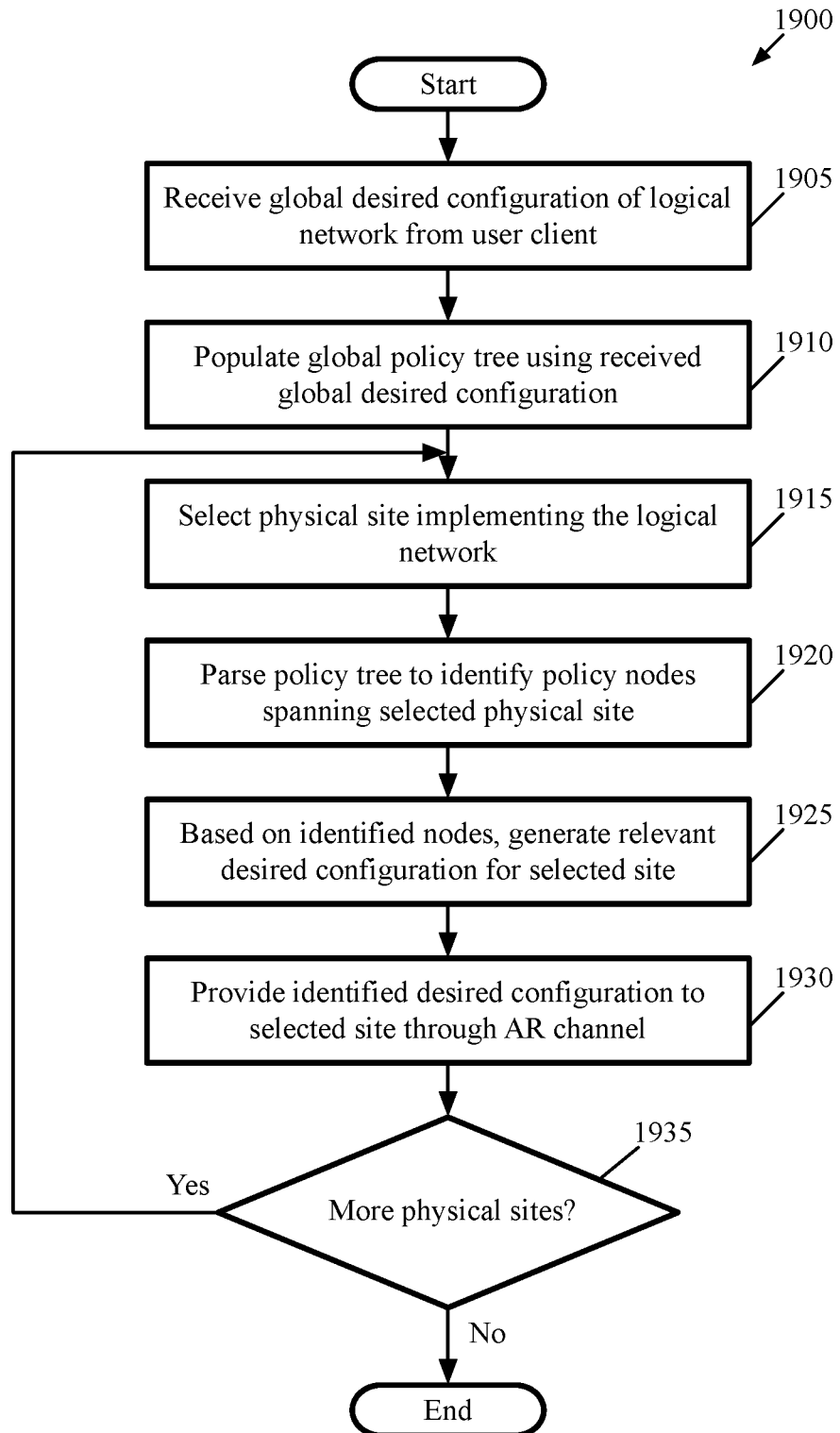
FIG. 19 conceptually illustrates a process performed in some embodiments by the global manager to parse the global desired configuration in order to populate the global policy tree and identify, for each physical site, a relevant portion of the global desired configuration.

FIG. 19 conceptually illustrates a process 1900 performed in some embodiments by the global manager 420 to parse the global desired configuration in order to populate the global policy tree 1700 and identify, for each physical site, a relevant portion of the global desired configuration. The process begins at 1905 by receiving the global desired configuration of the logical network from a user client 440 (e.g., from an administrator of the logical network). In some embodiments, the received configuration is a complete configuration, e.g. an initialization of the logical network. In other embodiments, the received configuration is a modification to a previously received global configuration, such as a create, update, or delete event to one or more logical network elements.

At 1910, the process 1900 populates a global policy tree (e.g., the global policy tree 1700 in FIG. 17). based on the received global desired configuration. For example, the process 1900 identifies each logical network element referenced in the desired configuration, and creates a node in the global policy tree corresponding to the logical network element. In addition, in some embodiments each logical network element is associated with configuration parameters in the received desired configuration. These associated parameters are used to define the attributes of the created node. In some embodiments, the associated parameters in the desired configuration include references to other logical network elements. These references are used to define references between the created node and other nodes. In some embodiments, the nodes are defined in hierarchical fashion, starting from the global root 1702, and iterating over each branch of the policy tree from the top-level nodes (e.g., logical routers, logical switches and segments, domains, sites, etc.). Some embodiments create nodes for sites first, based on auto-discovery of the physical sites, either prior to or after receiving the global desired configuration.

At 1915, the process 1900 selects a physical site that implements the logical network. In some embodiments, the physical sites are identified through auto-discovery of the physical sites as discussed above. For the selected physical site, the process 1900 parses at 1920 the global policy tree, to identify policy nodes whose span include the selected physical site. The process 1900 uses the identified nodes to generate (at 1925) relevant desired configuration for the selected physical site. In some embodiments, the process generates the relevant configuration by identifying portions of the global desired configuration. The process 1900 provides the generated relevant configuration (e.g., the portions of the global desired configuration) to the local manager at the selected physical site, through the asynchronous replicator channel as described above in some embodiments with reference to FIG. 13.

The process 1900 determines, at 1935, whether there are additional physical sites. If there are additional sites, the process 1900 returns to 1915, which was described above. If there are no additional sites, the process 1900 ends.

The relevant portion of the global desired configuration that is provided to each local manager in some embodiments is a site-specific policy subtree of the global policy tree, corresponding to the logical network elements implemented at that site. The subtree for each site only includes nodes for logical network elements that span the site. The global policy tree 1700 is stored by the global manager 420 in its database 710.

Figure 20:
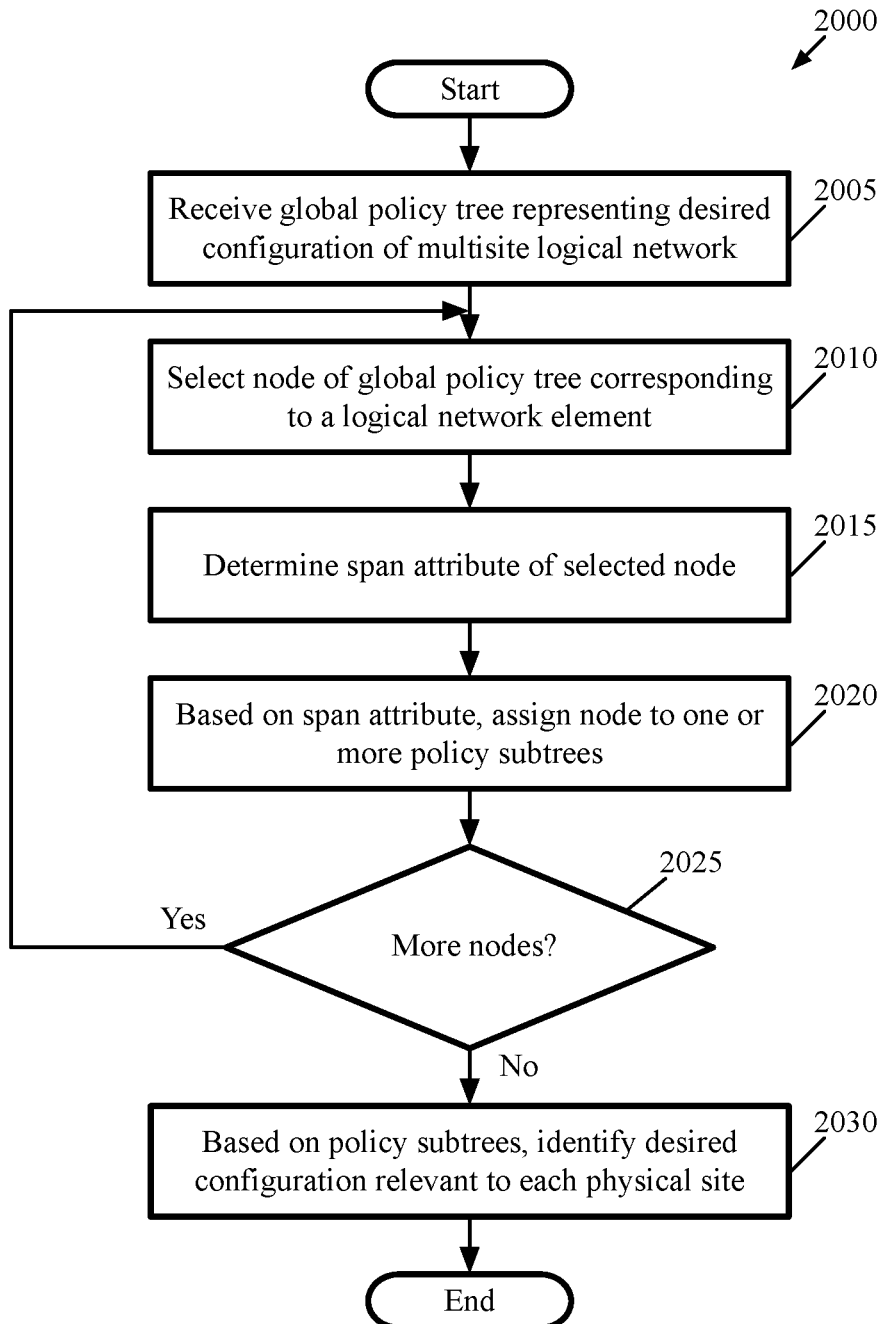
FIG. 20 conceptually illustrates a process performed in some embodiments by the global manager to generate policy subtrees.
Figure 21:
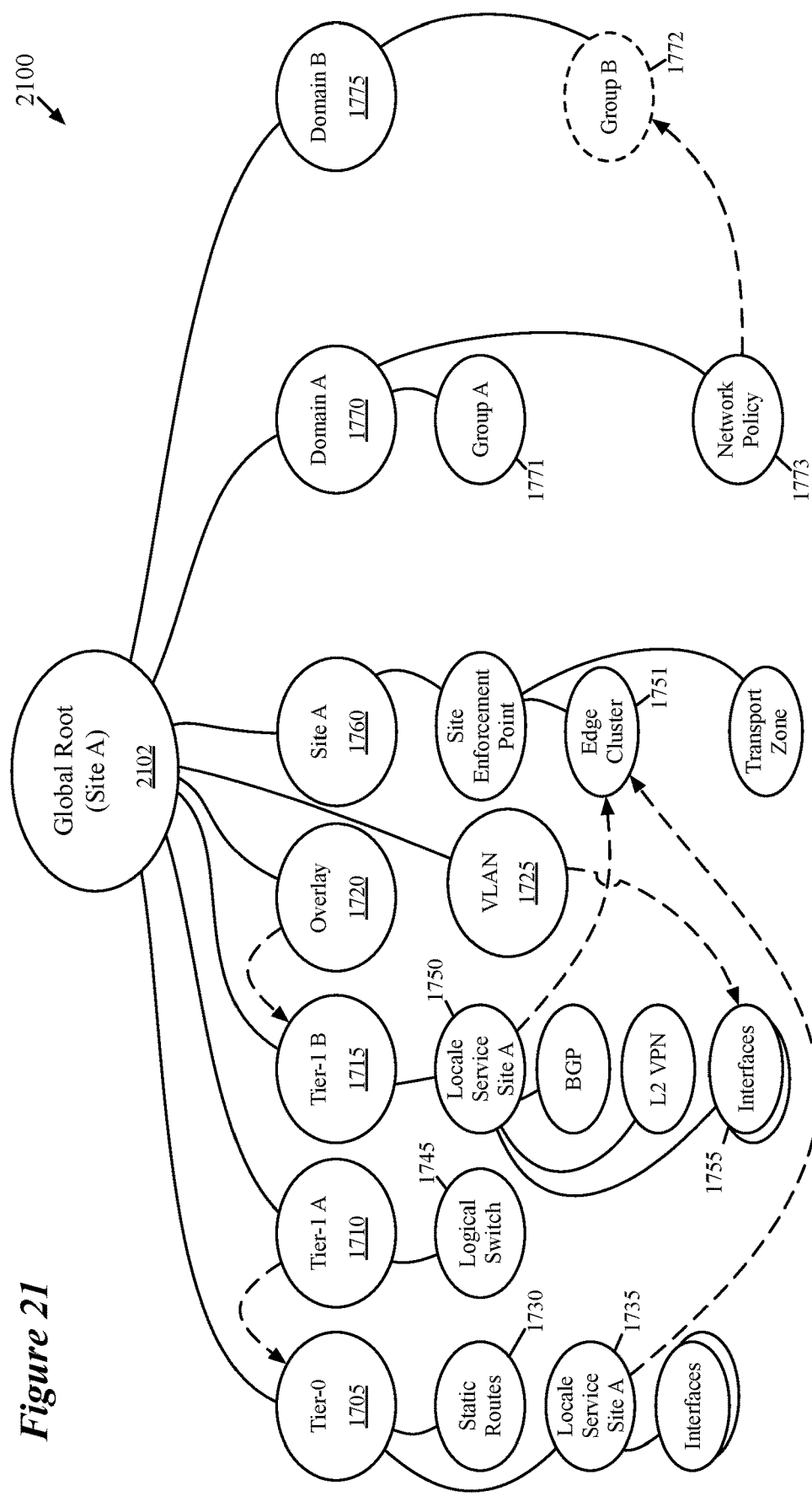
FIG. 21 conceptually illustrates an example of a global policy subtree for a single physical site.

In some embodiments, the global policy tree is parsed to identify the span of each node in order to generate a policy subtree for each physical site. In some embodiments, the subtree is generated by first identifying the span of each node in the global policy tree. The global policy tree is then parsed, using the identified span for each node, to generate the policy subtree for each site. The local manager at each site (or a management plane application, which may be separate from the local manager) uses the relevant portion of the global desired configuration, received from the global manager, along with any desired configuration received directly by the local manager itself, to manage the logical network at the site. FIG. 20 conceptually illustrates a process 2000 performed in some embodiments by the global manager 420 to generate policy subtrees. FIG. 21 conceptually illustrates an example of a policy subtree for a single site generated by process 2000.

The process 2000 begins at 2005 by receiving a global policy tree (e.g., the global policy tree 1700 in FIG. 17) that represents the desired configuration of the multisite logical network. The process 2000 selects at 2010 one of the nodes of the global tree, corresponding in some embodiments to one of the logical network elements. In some embodiments, the nodes are selected in an iterative fashion over the hierarchy of the global tree, starting with the top-level nodes under the global root 1702 (e.g., logical routers, logical switches and segments, domains, etc.).

The process 2000 determines (at 2015) the span attribute for the selected node. In some embodiments, the span attribute is determined by a span calculation performed by the broker service 735 of the global manager 420. In some embodiments, the span calculation is based on the relationships between the nodes in the global policy tree. For example, when the relationship between two nodes is a parent-child relationship, the child node may inherit its span from the parent node. In other cases, however, a child node does not inherit the entire span of its parent node. As another example, when the relationship between two nodes is a dependence of one node on another node, expressed as a reference from one node to the other, the span of the dependent node will depend on the referenced node. Some logical network elements also have a pre-defined span in some embodiments, e.g. defined by an administrator of the network, which is stored in the database 710. In such embodiments, the process 2000 retrieves the span attributes from the database.

At 2020, the process 2000 uses the span attribute to assign the selected node to a policy subtree for each physical site that is spanned by the node. These policy subtrees are stored in some embodiments in the database 710. In some embodiments, the policy subtrees are associated with the dedicated persistent queues 725-727 that each correspond to the physical sites.

The process 2000 determines (at 2025) if there are additional nodes in the global policy tree. If there are additional nodes, then the process returns to 2010, which was described above. If there are no additional nodes, then the process continues to 2030. At 2030, the process uses the generated policy subtrees to generate relevant desired configuration for each physical site. In some embodiments, the process generates the relevant configuration from the policy subtrees by identifying portions of the global desired configuration. The process 2000 then ends.

FIG. 21 illustrates a global policy subtree 2100 for the physical site A 405, stored at the database for local manager for site A (i.e., local manager 425). Since the subtree 2100 is specific to site A, all top-level nodes below global root 2102 with span that includes site A are preserved, while top-level nodes that are relevant to sites B and C are omitted. For example, the top-level nodes for sites B 1777 and C 1765 are omitted, as are all their respective child nodes. However, the top-level node for domain B 1775 remains, since in some embodiments all local managers are informed of all available domains. In addition, for router T0 1705, the locale services node for site B 1740 is also omitted. Router T0 1705 still spans sites A and B in some embodiments, since its span attribute is associated with its definition at the global manager 420, not the local manager 425.

Network policy 1773 is also preserved in the global policy subtree 2100. This policy 1773 is defined under domain A 1770, so in some embodiments it has a span of site A and site B, even though this subtree is specific to site A. In addition, as noted above with reference to FIG. 21, network policy 1773 also references group B 1772. As a result, the span of the policy 1773 also includes site C, even though that site is in a different domain. This reference to group B 1772 is also preserved in the policy subtree 2100, and is discussed in more detail below with reference to FIG. 25.

Figure 22:
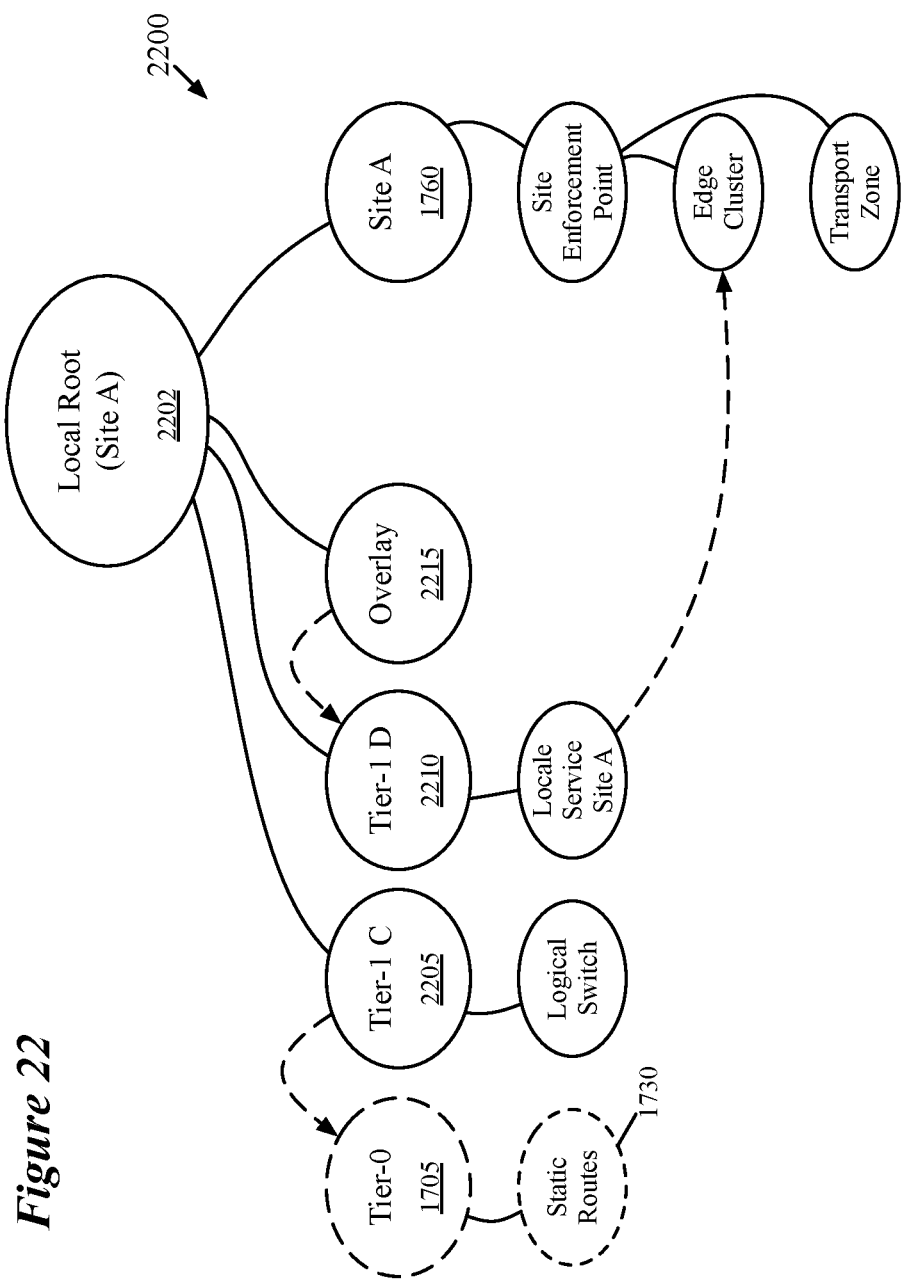
FIG. 22 conceptually illustrates a local policy tree at a single physical site.

In some embodiments, a local manager also stores a separate policy tree, that is generated based on desired configuration received directly at the local manager instead of from the global manager 420. FIG. 22 conceptually illustrates a local policy tree 2200 for site A that is generated in some embodiments by one or more operations of process 1900. This local policy tree 2200 is distinct from the global policy subtree 2100 received from the global manager 420. In this example, the local root 2202 of the local policy tree 2200 connects a site node for site A 0560, two Tier-1 logical routers T1C 2205 and T1D 2210, as well as an overlay segment 2215. The overlay segment 2215 includes a reference to the router T1D 2210, which has a locale service corresponding to site A.

In some embodiments, logical network elements defined in the local policy tree 2200 may reference logical network elements defined in the global policy tree 1700. For example, in FIG. 22, the router T1C 2205, references the router T0 1705 that was defined from the global manager 420. As a result, the router T1C 2205 is able to utilize the static routes 1730 associated with the T0 router 1705, even though these routes are not defined locally at site A.

The global policy tree 1700 is stored by the primary global manager 420 in its database 710. A replica of the global policy tree 1700 is also stored by the secondary global manager 460 in its database 712. As noted above, in some embodiments the nodes also represent logical network policies that apply to the logical network elements. The logical network policies include forwarding policies, service policies, and security policies, and are applied in some embodiments to govern the behavior of the logical forwarding elements (e.g., by governing the behavior of the physical forwarding elements that implement the logical forwarding elements).

Policies are defined in some embodiments at the global manager 420 through a user client 440, e.g. by an administrator of the logical network. In some embodiments, policies are one or more service rules which are enforced at the sites on data message flows based on a set of flow attributes. The global manager 420 in some embodiments distributes the service rules to local managers 425-435 at the sites 405-415 at which the policy is to be enforced (i.e., the policy's span). Each local manager uses the received service rules to generate configuration data for distribution by controllers 1420-1425, to configure the data plane (i.e., the physical forwarding elements 345 and edge devices 325) to enforce the received service rules on data message flows between logical network endpoints, such VMs and other data compute nodes.

The policies are defined in some embodiments by reference to groups of logical network endpoints that span one or more sites, e.g. the security groups 1817-1830 described above with reference to FIG. 18, which are defined in some embodiments at the global manager 420 (e.g. by an administrator of the logical network). The service rules refer to these groups in some embodiments by using a group identifier that is assigned at the global manager 420 when the groups are defined. The definitions of these groups are distributed to the sites 405-415 spanned by the policies, so that the controllers 1420-1425 at these sites are able to identify hosts for member VMs for each group and enforce the policy at the identified hosts.

As discussed above, the service rules for a given policy are enforced on data messages that are associated with a group of logical network endpoints (e.g., VMs) spanning one or more sites. Service rules have multiple fields in some embodiments, including source fields, destination fields, and action fields. Some embodiments refer to these groups in these fields by using group identifiers that are assigned to the groups (e.g., by the global manager when the groups are defined). For example, when the group identifier for the group is referenced in a source field of the service rule, the service rule is enforced on data messages that originate from machines in that group. When the group identifier for the group is referenced in a destination field of the service rule, the service rule is enforced on data messages that are directed to machines in that group. In addition to group identifiers, the service rule is also enforced in some embodiments on data message flows with other attributes matching those specified in the rule. For example, the rule may specify a flow 5-tuple (source IP address and port number, destination IP address and port number, and transmission protocol). Alternatively or conjunctively, the rule may specify other attributes of the flow or a referenced group identifier.

Figure 23:
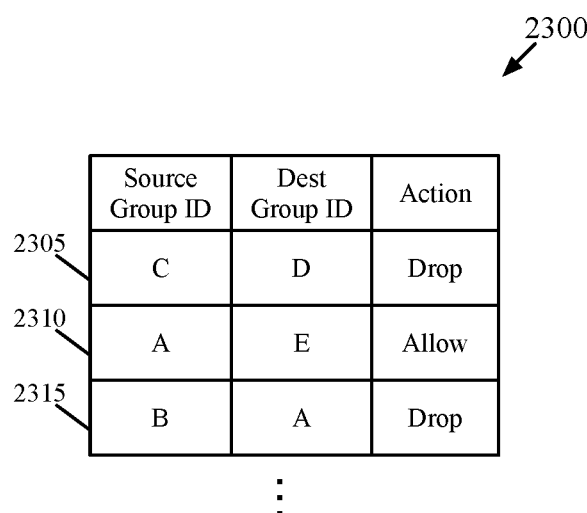
FIG. 23 conceptually illustrates a match-action table of some embodiments.

In some embodiments, the controllers 1420-1425 provide the service rules to identified hosts executing PFEs, and the PFEs store the service rules as match-action tables. FIG. 23 conceptually illustrates a match-action table 2300 of some embodiments. In this example, fields for source group identifier, destination group identifier, and action are shown. Other attribute fields, used in some embodiments for matching to data message flows as discussed above, are not shown for the sake of clarity.

The match-action table 2300 has multiple flow entries 2305-2315 each specifying different service rules. The number of entries shown is simplified for illustrative purposes only and in practice there are hundreds, even thousands of such entries. These entries refer to the security group definitions introduced earlier with reference to FIG. 18. For example, the first entry 2305 indicates that matching data messages originating from group C (OS1 machines in Europe) and destined for group D (OS2 machines in Europe) should be dropped. The rationale for such a rule in some embodiments may be differing security criteria between the two different operating systems.

The second entry 2310 indicates that matching data messages originating from group A (OS1 machines in Paris) and destined for group E (OS1 machines globally) should be allowed. This rule indicates that OS1 machines at one site in a domain are allowed to send data messages to machines at other sites in the domain.

The third entry 2315 indicates that matching data messages originating from group B (OS1 machines in New York) and destined for group A (OS1 machines in Paris) should be dropped. This rule indicates that OS1 machines in one region are not allowed to send data messages to OS2 machines in another region. In this example, the rule specified by this entry 2315 is one possible rule for network policy 1773, which as illustrated in FIG. 17 is defined under domain A 1770, alongside group A 1771, but has a reference to group B 1772 defined under domain B 1775. In this example, the policy tree reference points from the policy 1773 to group B 1772, even though group B is the source group and not the destination group for the policy. This is because the policy tree reference is related to the policy's span, which is independent of whether the groups are source or destinations of data message traffic within that span.

The PFEs identify matching flows by performing match classification operations on each data message, to determine if the flow attributes and/or group identifier match those specified in the service rule. When a data message matches the service rule, it is provided to a service machine in some embodiments, which performs the action that is specified by the rule on the matching data message. These actions include dropping the data message, allowing the data message, or performing other service operations on the data message. For example, a service operation may modify the header of the data message, to redirect the message to a different destination. These service operations include load-balancing, firewall, Dynamic Host Configuration Protocol (DHCP), Network Address Translation (NAT), and other services.

In some embodiments, policies are defined as nodes in the policy tree, and defined as child nodes of domain nodes. In such cases, the policy (and therefore, any service rule of the policy) inherits the span of its parent domain, i.e. the policy is enforced at the sites which are members of its parent domain. Furthermore, groups are also represented in some embodiments as child nodes of a domain, and the group inherits the span of its parent domain. For a policy to be applicable to members of a group, the span of the group must in some embodiments include the span of the policy. This is so the controllers are able to recognize the identifiers referenced by the service rules, and identify the members of those groups to enforce the service rules.

In some embodiments, a policy's service rules distributed to a first set of sites (e.g., a first domain) for applying to a first group of machines defined at those sites make reference to a second group of machines defined at a second, different set of sites (e.g., a second domain). In other words, the span of the referenced second group does not include the span of the policy. Since such service rules reference a group of machines that is undefined for one or more of the sites in the first set of sites (e.g., the first domain), not all the machines in the first group are able to enforce the policy. Therefore, some embodiments identify which sites in the first set of sites (e.g., the first domain) do not have the definition of the referenced group, and distribute the definition of the referenced group to those identified sites.

Figure 24:
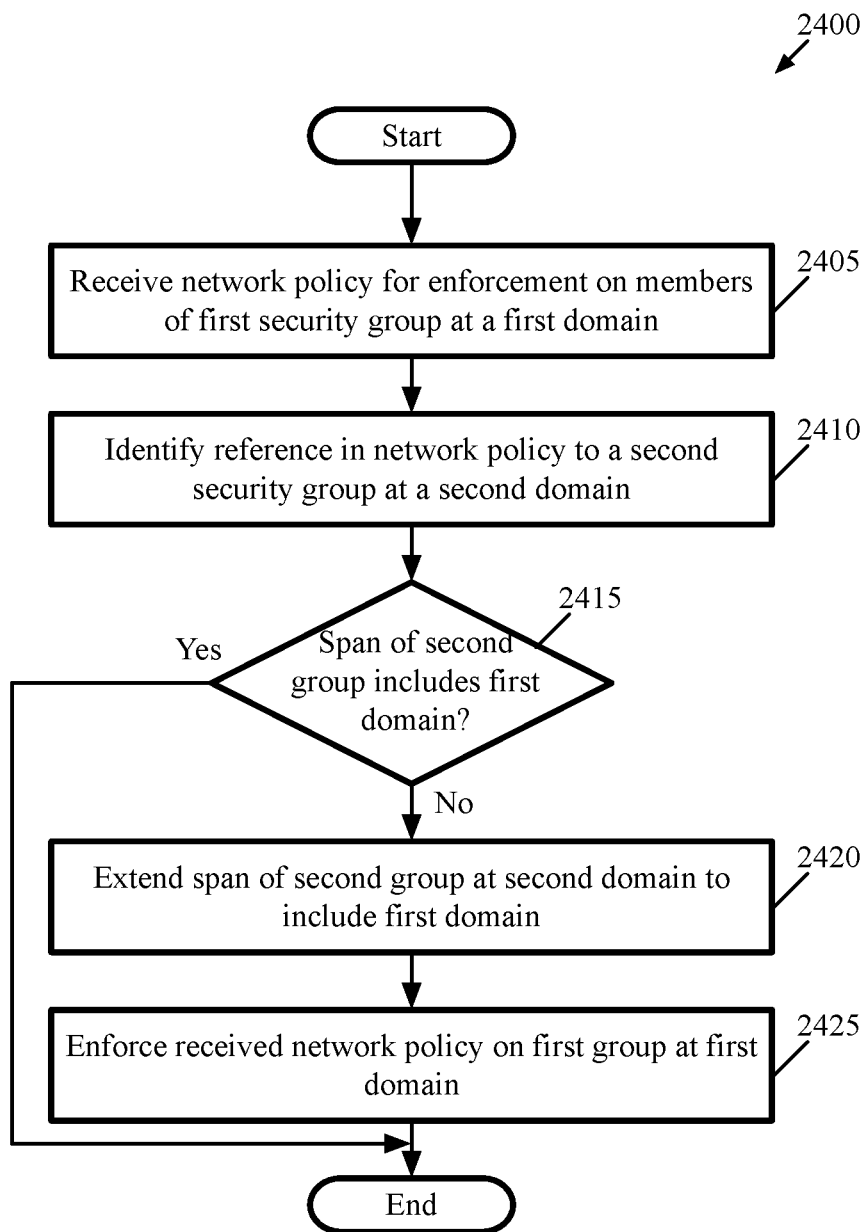
FIG. 24 conceptually illustrates a process performed in some embodiments by the global manager to extend the span of a group for applying a cross-domain policy.

FIG. 24 conceptually illustrates a process 2400 performed in some embodiments by the global manager 420 to extend the span of a group for applying a cross-domain policy. FIG. 25 conceptually illustrates an example of extending the group span due to a cross-domain policy. The policy in this example is the same policy 1773 described above in FIG. 17, and defined with respect to the security groups described above in FIG. 18.

Figure 25A:
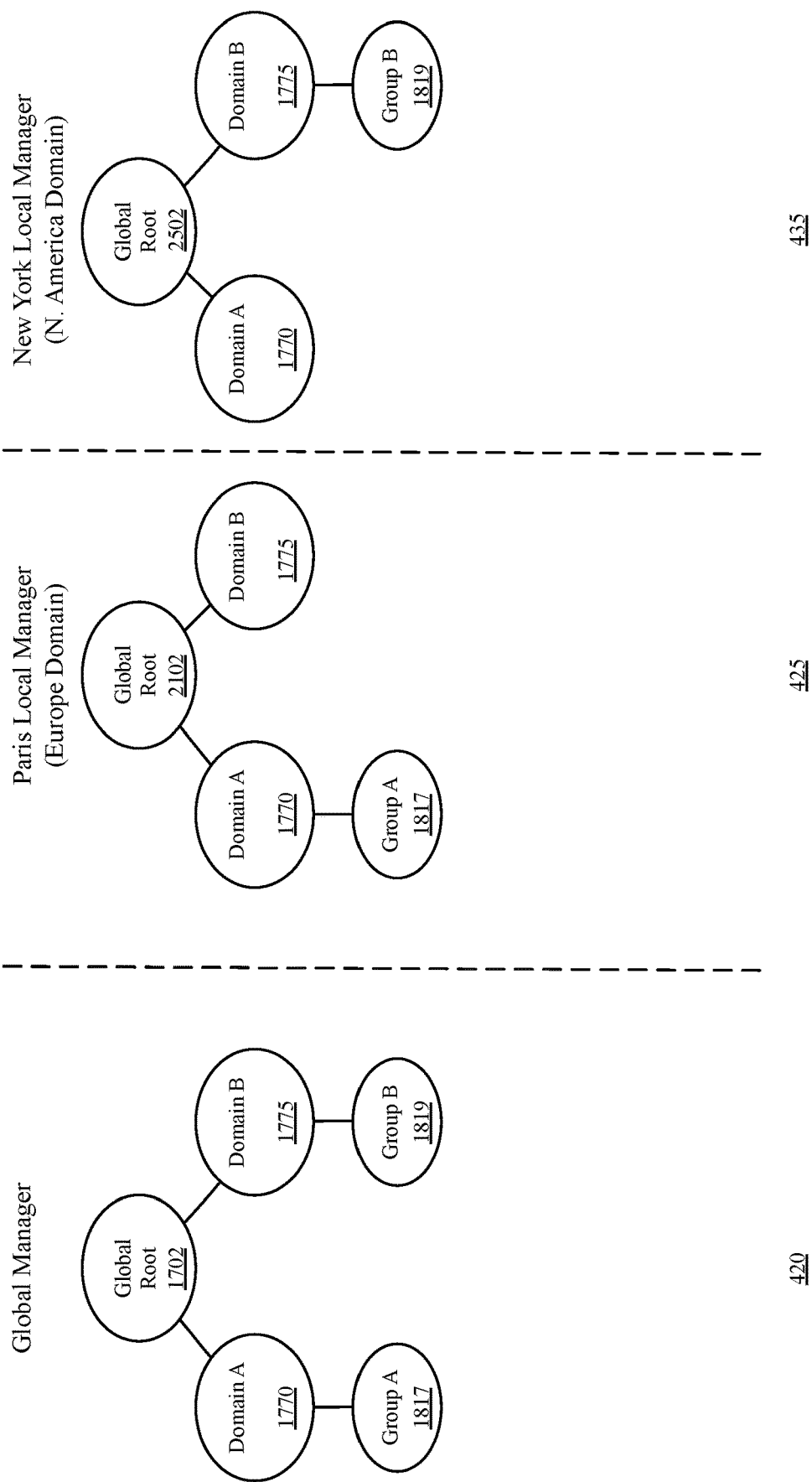
FIGS. 25A-B conceptually illustrate an example of extending the group span due to a cross-domain policy.
Figure 25B:
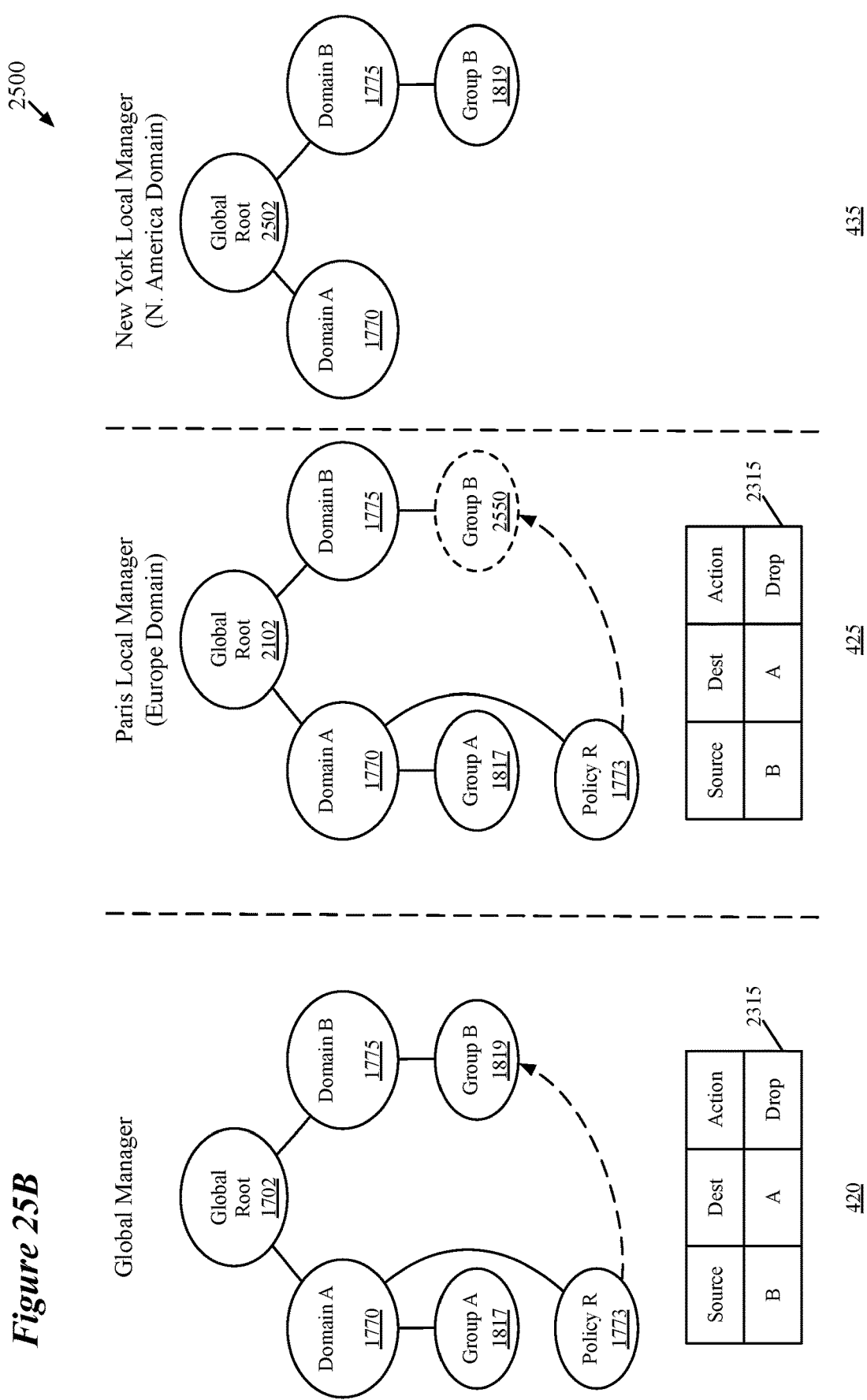

FIG. 25A conceptually illustrates simplified versions 2500 of the global tree 1700, as defined at the global manager 420, the local manager 425 at site A 1760 (e.g., Paris), and the local manager 435 at site C 1765 (New York), prior to defining any network policies. The Paris site is a member of the Europe region (domain A 1770) and the New York site is a member of the North America region (domain B 1775). As described above in FIG. 18, the Europe domain also spans site B (London).

Two groups are defined beneath these regions, group A 1817 (OS1 machines in Paris) under domain A 1770 (Europe), and group B 1819 (OS2 machines in New York) under domain B 1775 (North America). Both domains A 1770 and B 1775 and groups A 1817 and B 1819 are defined at the global manager 420. Group A 1817 is defined at the local manager 425 in Paris, and group B 1819 is defined at the local manager 435 in New York. However, both domains 1770-1775 are defined at both sites, since domains are in some embodiments defined at all sites. The corresponding site nodes under each domain are omitted from the trees in FIG. 25 for clarity.

The process 2400 begins at 2405 by receiving a network policy defined in a domain (e.g., which spans a first set of sites) for enforcement on members of a security group in that domain. The network policy is received at the global manager 420 through a user client 440 in some embodiments (e.g., from an administrator of the network). For example, in FIG. 25B, the security policy R 1773 is now defined at the global manager 420 as a policy beneath domain A 1770 (Europe), for enforcement on members of group A 1817. The policy 1773 is also distributed to the local manager 425 in Paris. Though not shown, the policy 1773 is also distributed to the other local managers at the other sites in domain A 1770 (Europe) (e.g. London). In the exemplified embodiment, the policy 1773 includes service rule 2315, which is distributed to the local managers in the domain.

At 2410, the process 2400 identifies a reference in the network policy to another security group in another domain. For example, in FIG. 25B, the policy R 1773 defines a service rule with a source group of group B 1819 and a destination group of group A 1817. Since group B 1819 is not in the same domain as the policy 1773, the reference to group B 1819 is indicated by a dashed line in the policy tree at the global manager 420, from policy R 1773 to group B 1819. The action specified by policy R 1773 is a drop action. In other words, the policy R 1773 specifies that incoming data message traffic is not allowed from machines in New York running OS2 to machines in Paris running OS1. Such traffic is to be dropped in Paris.

The process 2400 determines at 2415 whether the span of the other group includes the span of the policy. If the group span includes the policy span, then the process 2400 ends. If the group span does not include the policy span, as in the example of FIG. 25B, then the process continues to 2420, which is described below. For example, in FIG. 25B, the span of the policy is the first domain A 1770, e.g. Paris and London. The span of the referenced group B 1819 is the domain B 1775, e.g. New York. Since the policy references a group that is not in its parent domain, the span of the referenced group does not include the span of the policy.

The process 2400 extends at 2420 the span of the referenced group include the span of the policy. In effect, this distributes the definition of the group in the other domain to the sites in the original domain where the policy is defined. This is done in some embodiments by performing a new span calculation for the policy, based on separate span calculations for the groups referenced by the policy as well as the policy's parent domain. The span of the referenced group is then extended by sending an update event through a dedicated AR channel from the global manager 420 to the local manager 425, as described above with reference to FIG. 13 above.

As noted above, in some embodiments span is also determined according to span leaders for some nodes of the global policy tree 1700. Security groups are one type of node in some embodiments whose span leader is not their containing domain. For example, some groups serve as span leaders for other groups. In the case of cross-domain policies, the span of the referenced group is extended by specifying the span leader of the referenced group to be the first group in the same domain as the policy. In this manner, the span for the referenced group is broader than just its parent domain.

Upon receiving the update event, the local manager 425 in some embodiments creates a reference group underneath the global policy tree in Paris. For example, in FIG. 25B, a reference group 2550 is defined at the local manager 425 in Paris by the global manager 425. In some embodiments, this reference group 2550 is not a full group definition like group A 1817, but instead is a symbolic path reference to group B 1819. As a result of this reference, for the local manager 425, group B 1819 now effectively spans New York, London, and Paris (i.e., spans domains A and B). The process 2400 then ends.

Some embodiments extend the group definition using process 2400 for all local managers at all sites (e.g., London) in domain A (Europe). For example, if the group definition changes, i.e. a VM migrates from one site in the domain to another site in the domain, then the destination site will also need the reference group in its local manager's global tree.

In some embodiments, the policy tree at the local manager 435 in New York is not updated or modified in any way as a result of extending the span of the group 1819 at the global manager 420 and adding the reference group 2550 to the local manager 425. The administrator of the New York site is not aware in some embodiments that the group 1819 at the site is being referenced by a policy 1773 at a different domain 1770 and could even decide to delete the group. However, due to the reference group 2550 created at the referring domain 1770 the global manager 420 is aware of the reference. The global manager 420 then prevents the deletion of the group 1819 and in some embodiments displays an alarm to the administrators of both the referring site and the referred site, so that the conflict can be resolved.

After the local managers in the original domain receive the reference group, they generate configuration data and distribute to their respective site controllers, to configure the physical forwarding elements and service machines at the first set of sites to enforce the policy.

In some embodiments, the configuration of the logical network can be described in terms of several different types of state. The desired state represents the user intent, e.g. the state of the network that the user (e.g., an administrator) desires to implement, through the global manager 420. The realized state is the actual implementation of the desired state, which includes configuration of the physical forwarding elements in the data plane. The realized state only pertains to logical network elements created by the user, and includes configuration details that the network management and control system automatically determines on behalf of the user.

The third type of state is the discovered state, which represents configuration details of logical network elements that are not specified as part of the user intent. For example, one category of discovered state in some embodiments is site-specific information, such as the available physical resources at a physical site. In some embodiments, the desired state is dependent on the discovered state, or is informed by the discovered state. As the desired state is realized, some parts of the discovered state are also modified in some embodiments, and these modifications are then discovered again, informing the next iteration of desired state and realized state. The discovered state automatically discovered is in some embodiments by the global manager 420 based on information from the physical sites, communicated up from those sites' control planes to their local managers, and from the local managers to the global manager.

For example, the structure of the global policy tree 1700 beneath each site node is automatically discovered in some embodiments, from the controller cluster 1420 at the physical site, up to the local manager 430, and then to the global manager 420. Once the global manager 420 is configured with the access credentials of the local manager 430, it communicates with the local manager (e.g., through a REST API in some embodiments) to automatically populate the enforcement point node and identify which transport zones, edge clusters, and edge nodes are configured and available. In some embodiments, these were previously configured by the physical site's local manager. Corresponding child nodes are accordingly created for each.

In some embodiments, the creation of logical ports and segment ports is not allowed from the global manager 420. Such ports are site-specific in such embodiments, with unique identifiers that are assigned by the management/control plane at their home physical site, and the span of these ports cannot be stretched. Only one logical network endpoint can be attached to a port and a logical network endpoint can only be part of one site at a given point in time. When the span of a switch/segment gets stretched to multiple sites, active logical ports (e.g., with workloads attached) are automatically discovered as child nodes of the logical switch or segment in that tree (e.g., as interface nodes).

The desired configuration of the logical network represents the intentions of the user (e.g., the administrator). The user specifies their intent by specifying the desired configuration, which is why the desired configuration is also referred to as user intent. The global manager 420 is an intent-based policy manager that receives user intent (internally represented as the global policy tree 1700) and communicates that intent to the local managers at each site. The local managers then interpret the received user intent to generate configuration data, and provide the configuration data to the network managers and controllers as described above to implement the desired configuration. In some embodiments, this is referred to as realization of the user intent (e.g., in the control plane and the data plane). The actual implementation details (e.g., configuration parameters of the forwarding elements, IP addresses, internal UUID identifiers for ports, etc.) are not known or dictated by the user or by the global manager when specifying the intent, but are necessary details for realization of that intent. These details include data from the management plane and the control plane, e.g. site managers and controllers.

In a best-case idealized scenario, the realized state of the logical network would be identical at every physical site. However, since each physical site is independently configurable (e.g., via the local managers 425-435), and since certain configuration details are site-specific (e.g., unique identifiers for system-created objects in the management and control planes, such as logical port identifiers), in practice the realized state will be different for every physical site, even for the same logical network element. Even for a single site, the amount of realization data is vastly larger than the amount of data required to specify user intent, and this is then multiplied by the number of sites in the federated logical network. Accordingly, in some embodiments the global manager does not automatically maintain information on realization status (also referred to as the "realized state") for any given logical network element. Instead, the realized state may be queried from the global manager on an on-demand basis, for troubleshooting or other investigatory purposes.

The realized state of a logical network element indicates in some embodiments whether the desired configuration (also referred to as the desired state) of the logical network element has been realized at each of the sites that the element spans. Some embodiments describe the realized state partly in terms of a deviation from the desired state. In some embodiments, the realized state for a logical network element (e.g., a logical router, logical switch, etc.) describes how the logical network element is implemented at each of the physical sites that it spans. For example, the realized state includes data from PFEs executing on computing devices at each of the spanned sites to implement the logical network element.

For each logical network element, the realized state received in some embodiments from each local manager is a subset of the total realized state of that logical network element, just as the desired state for the logical network element that is provided to the local manager is a subset of the global desired state of that logical network element defined at the global manager.

In some embodiments, the realized states received from each local manager 425-435 are status messages that indicate whether the logical network element was successfully realized at the corresponding physical site. For example, if the logical network element has not been successfully realized at all physical sites, the status message may simply be a flag that indicates error or a pending realized state.

Figure 26:
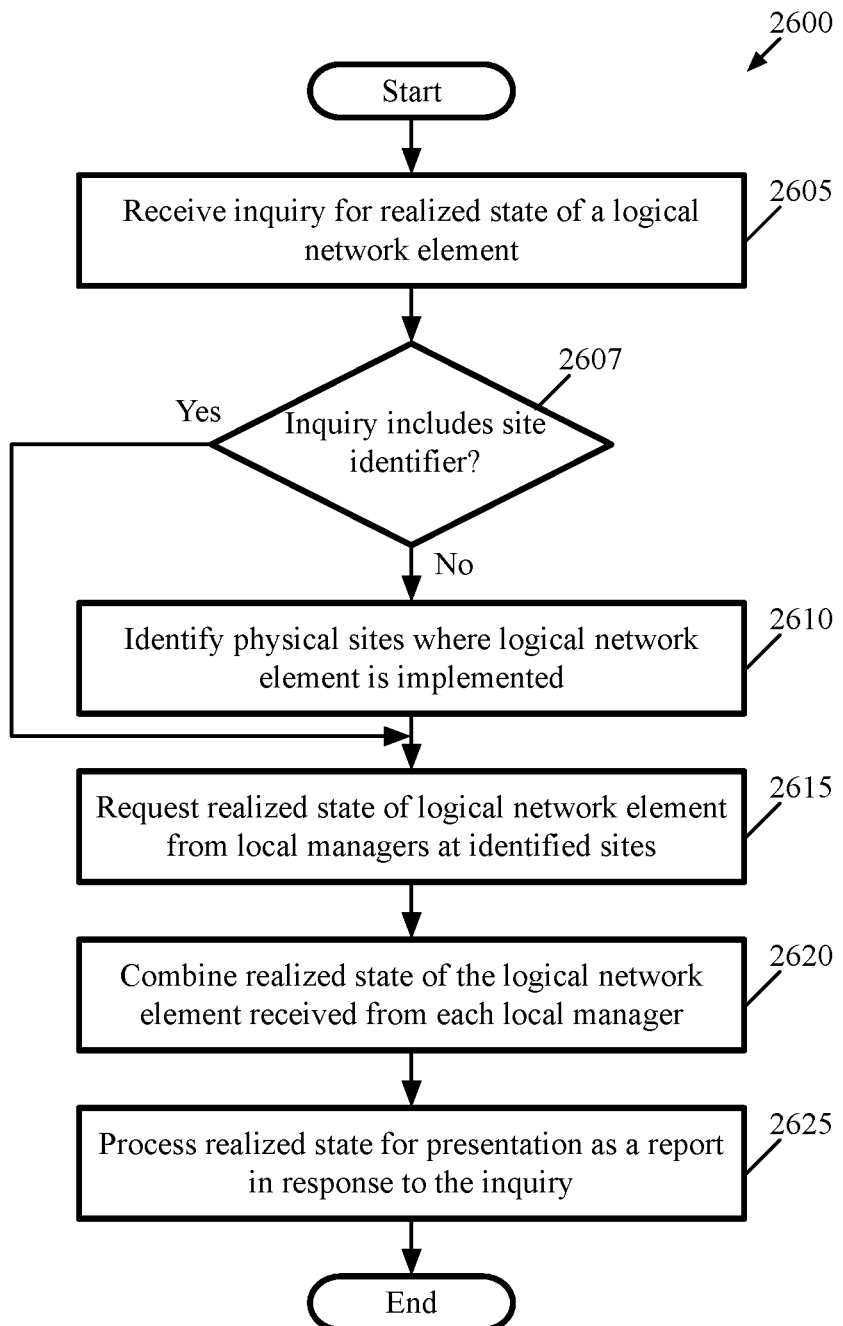
FIG. 26 conceptually illustrates a process performed in some embodiments by the global manager to retrieve the realized state of a logical network element.
Figure 27:
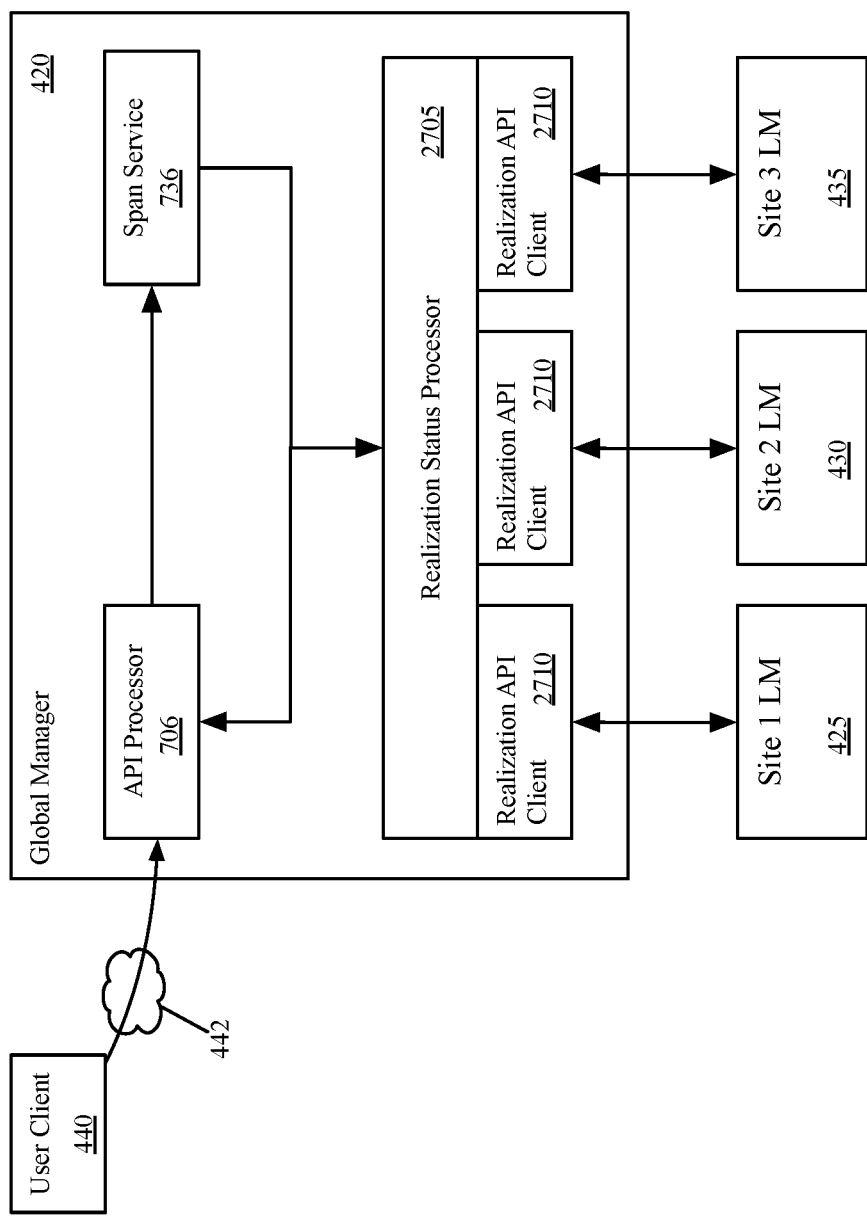
FIG. 27 conceptually illustrates a scatter-and-gather operation of the global manager to retrieve, on demand, the realized state of a logical network element that spans multiple physical sites.

FIG. 26 conceptually illustrates a process 2600 performed in some embodiments by the global manager to retrieve the realized state of a logical network element. FIG. 27 conceptually illustrates a scatter-and-gather operation of the global manager to retrieve, on demand, the realized state of a logical network element that spans multiple physical sites. FIGS. 28-29 conceptually illustrate examples of a user interface of some embodiments for presenting the realized state to an administrator of the logical network. In some embodiments, the interfaces described in FIGS. 28-29 are a single interface presented on a user client 440, which can select between modes of operation for accessing the global manager 420 or any of the local managers 425-435.

The process 2600 begins at 2605 by receiving an inquiry for the realized state of a logical network element (e.g., a logical router, a logical switch, services such as BGP or VPN, security policies, etc.). In some embodiments, the global manager receives the inquiry from a user client 440 (e.g., over a wide area network 442 such as the Internet), and is initiated in some embodiments by an administrator of the logical network. The inquiry is received and processed in some embodiments as one or more REST API calls from the user client 440 to an API processor module 706.

In some embodiments, the inquiry includes a reference to the logical network element, e.g. a path identifier that uniquely identifies the element. For example, an inquiry for the realization status of the logical switch 1745 includes a path identifier such as /global-infra/router_T1A/ which describes where the node corresponding to the logical switch is positioned in the global policy tree 1700.

In some embodiments, the inquiry is for the realized state of the logical network element at a single physical site, instead of at all sites spanned by the element. In such embodiments, the inquiry includes an identifier for the specified site. The process 2600 determines at 2607 whether the inquiry includes a site identifier. If the process 2600 determines that the inquiry includes a site identifier, then the process provides the site identifier to a realization status processor 2705 and continues to 2615, which is described below.

If the process 2600 determines at 2607 that the inquiry does not include a site identifier, the process 2600 identifies at 2610 the physical sites spanned by the logical network element. Identifying the spanned sites is achieved in some embodiments by performing a span calculation as described above with reference to FIG. 12. Specifically, in some embodiments, the API processor 706 provides parameters associated with the inquiry to the span service 736 to perform the span calculation. For example, in some embodiments the parameters include the path identifier for the logical network element. In some embodiments, the span is determined from the definition of the logical network element (e.g., the span was specified by an administrator of the logical network). After determining the span, the span service 736 provides site identifiers corresponding to the span of the logical network element to the realization status processor 2705.

The process 2600 sends at 2615 a request for the realized state of the logical network element to each local manager 425-435 at each identified site. In some embodiments, the request is sent from the realization status processor 2705 that receives one or more site identifiers from the broker service 735 or the API processor 706. Some embodiments send the requests in parallel (e.g., "scatter" the requests) to the local managers 425-435.

In some embodiments, the requests are made through an API of the local managers 425-435. In such embodiments, the realization status processor 2705 employs multiple realization API clients 2710 to perform the API calls, with one client assigned to each local manager. In some embodiments, the requests are transmitted through the same AR channels 725-727 as are used to provide the desired configuration data to each local manager.

The process 2600 receives at 2615 realized state from each of the local managers in response to the requests (e.g., "gathers" the realized state). After receiving the realized state from the local managers at each of the sites spanned by each of the logical network elements, the process 2600 combines at 2620 the received realized state from each site. In some embodiments, the received realized states are received by the realization API clients 2710 and combined by the realization status processor 2705 in a single realization state for the logical network element.

At 2625, the process 2600 processes the single combined realization state and presents the realized state in response to the initial request. For example, the realized state may be presented in a report on a user client 440 for an administrator of the logical network in some embodiments. The process 2600 then ends.

Figure 28A:
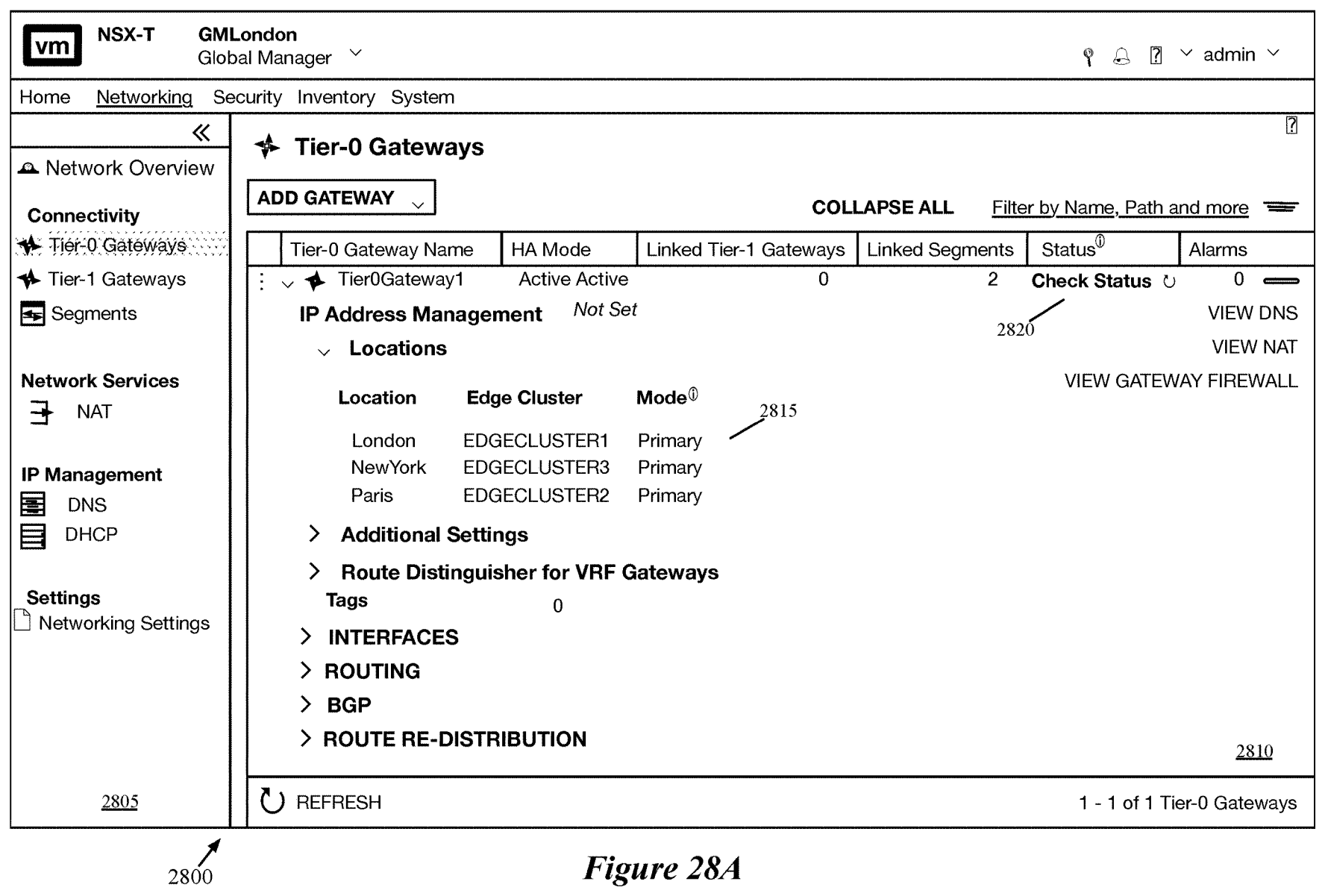
Figure 28B:
Figure 28C:
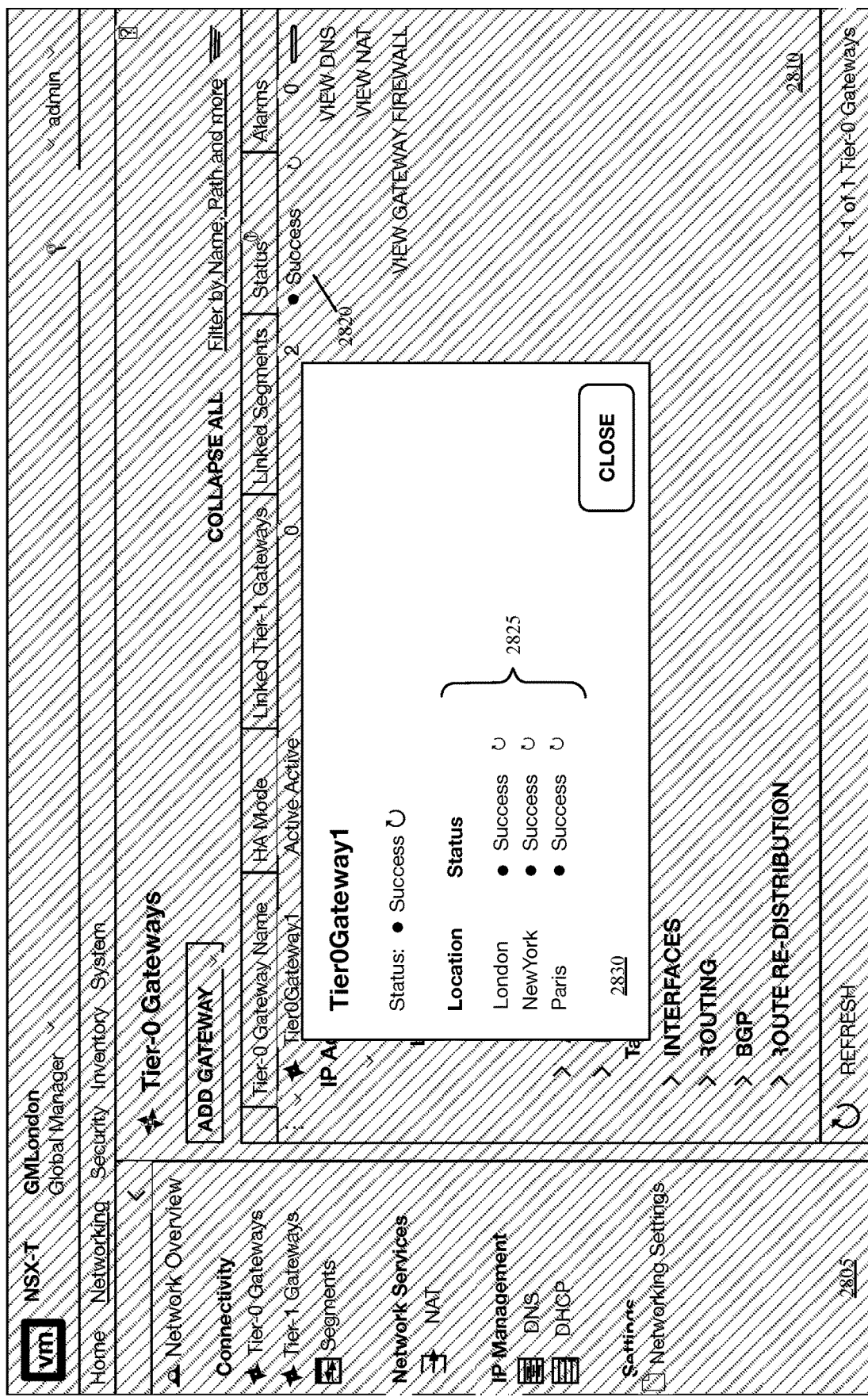

FIGS. 28A-28C conceptually illustrate an example of a user interface 2800 for querying the realization status of logical network routers from the global manager 420. In some embodiments, the interface 2800 is presented on a user client 440 accessed by an administrator of the logical network. The user interface 2800 is in some embodiments a full user interface for the network management and control system, and used to define the desired state of the logical network (e.g., by issuing create, update, and delete events for logical network elements) as well as query the realized state of one or more logical network elements. The discussion below focuses on use of the interface 2800 for querying the realized state of a logical router (e.g., a Tier-0 router or a Tier-1 router). While the example in FIG. 28A relates to a Tier-0 router for illustrative purposes, the discussion below also applies to Tier-1 routers and segments.

The side panel 2805 of FIG. 28A is a menu in some embodiments that allows the administrator to select different classes of logical network routers to query the realized state. In the example, Tier-0 Gateways have been selected in the side panel, causing the main panel 2810 to display a list of all current Tier-0 routers defined for the logical network. A single Tier-0 router is active, labeled Tier0Gateway1, and therefore highlighted by default.

The main panel 2810 provides various configuration information sections for this router, including interfaces, routing, and Border Gateway Protocol (BGP) settings. In some embodiments, one or more of these sections are not configurable via the global manager as desired state, but are instead discovered state based on configuration at the physical sites.

The main panel 2810 also displays in some embodiments information related to the desired state of the logical network element, such as the element's span. In the example, the Locations section 2815 shows a list of all locations that the Tier0Gateway1 router currently spans (e.g., London, Paris, and New York). Other available desired configuration information includes Domain Name System (DNS) information, Network Address Translation (NAT) settings, and firewall configuration. Some or all of these settings may be modified by the administrator to define the desired state of the logical network.

The realization status of the Tier0Gateway1 router is visually represented in some embodiments as a status indicator 2820. In different embodiments, the status indicator may display different text, symbols, colors, or some combination of these. This status indicator 2820 represents in some embodiments a global status indicating the global realization status at all sites in the element's span.

The global status indicator 2820 is in some embodiments an on-demand realization status. In some such embodiments, selecting the logical network element from the interface is the action that initiates the realization status request. In the example of FIG. 28, only a single Tier-0 router (Tier0Gateway1) is active, so selecting the side panel item for Tier-0 routers also selects this router by default, and initiates the global realization status request. If there are multiple Tier-0 routers, then an additional selection is required in some embodiments to initiate the request, or alternatively one of the routers is selected by default and the global realization status request is issued. In other such embodiments, the global status indicator 2820 does not display any realization status even after selecting the Tier-0 router, and an additional user interaction is required to initiate the request for the global realization status. For example, in such embodiments, the global status indicator 2820 displays text or a user interface element (a button, etc.) labeled "Check status." Interaction with the indicator (e.g, the reload button to the right of the text) then initiates the global realization status request.

If the router has been successfully realized at all physical sites, as illustrated in FIG. 28B, then the global status indicator 2820 may display a colored icon (e.g., green) and/or the word "Success." If the router is not successfully realized at one or more of the physical sites in the span, then the global status indicator 2820 will display a different color (e.g., yellow or red) and/or different text such as "Pending" or "Error." In some embodiments, if the global status is not "Success" then there may be one or more alarms. The number of alarms is also displayed alongside the global status indicator in some embodiments, though in this example the number of alarms is zero since the router has been successfully realized.

In some embodiments, the global status indicator 2820 is also a user interface element. Interaction with the global indicator, i.e. clicking, mouseover, or touching (if the interface is on a touchscreen) the global status indicator, creates a pop-up window in such embodiments, as in the example of FIG. 28C. The pop-up window 2830 displays the local realization status for the logical network element at each individual physical site that is spanned by the element. In this example, each of the local managers at each spanned site each has reported "Success" to the global manager (as indicated by the status indicators 2825 next to each of the listed sites), in response to the realization status inquiry from the global manager. If the router is not successfully realized at one or more of the physical sites in the span, then the local status indicator 2825 for that site will display a different color (e.g., yellow or red) and/or different text such as "Pending" or "Error." The status may also be refreshed by selecting a refresh icon in some embodiments, either for an individual physical site or for a global refresh, which initiates a new request for realization status at the specified site or sites. If refresh is selected for a specific site, then the request includes a site identifier in some embodiments, which is used as described above with reference to operation 2607 in process 2600.

Figure 29B:
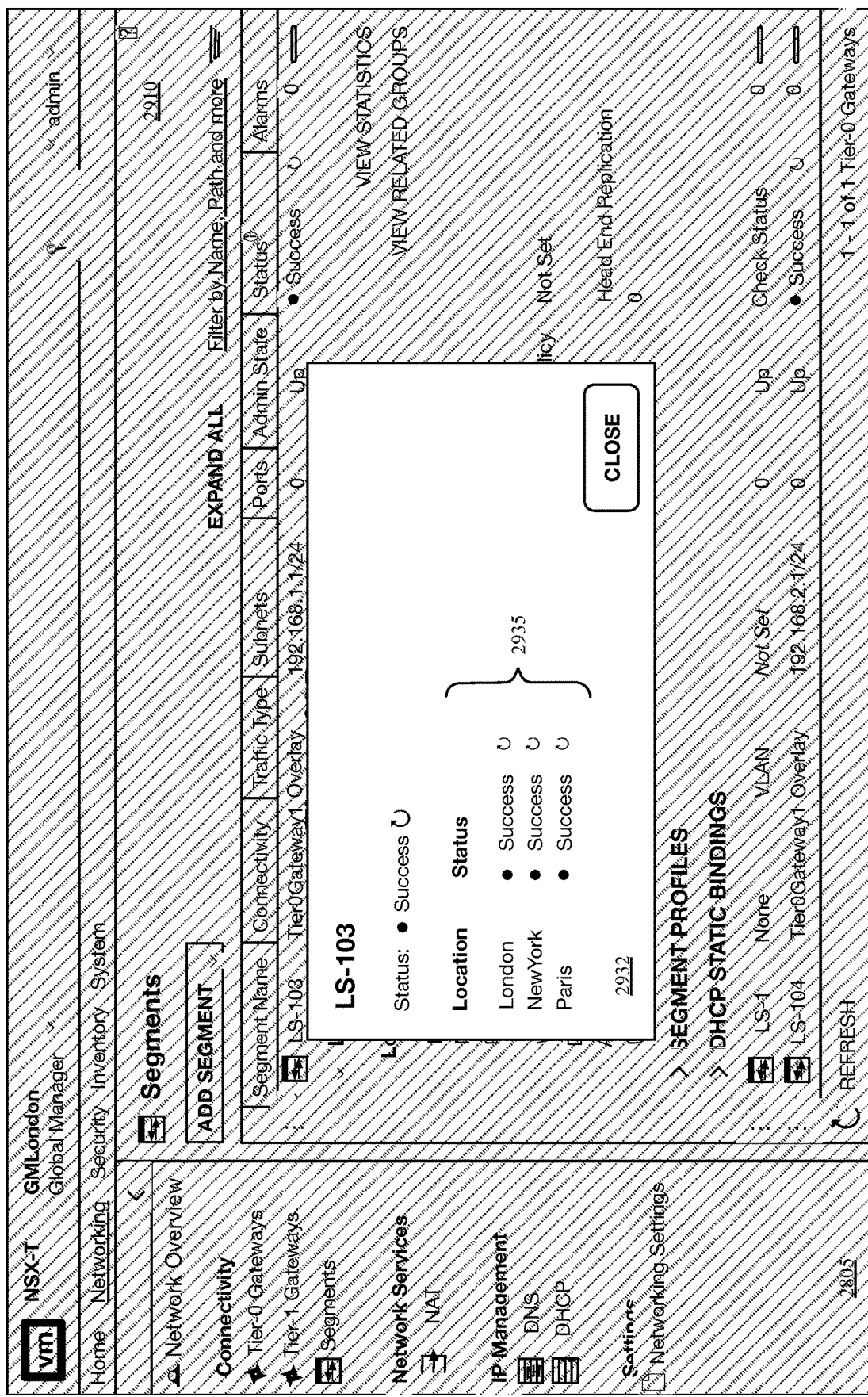

FIGS. 29A-29B conceptually illustrate another example of a user interface 2900 for querying the realization status of logical network segments from the global manager 420. In some embodiments, the interface 2900 is presented on a user client 440 accessed by an administrator of the logical network. The user interface 2900 is in some embodiments a full user interface for the network management and control system, and used to define the desired state of the logical network (e.g., by issuing create, update, and delete events for logical network elements) as well as query the realized state of one or more logical network elements. The discussion below focuses on use of the interface 2900 for querying the realized state for a logical switch (e.g., an overlay segment or a VLAN segment). While the example in FIG. 29A relates to an overlay segment for illustrative purposes, the discussion below also applies to VLAN segments.

The side panel 2905 of FIG. 29A is a menu in some embodiments that allows the administrator to select different classes of logical network routers to query the realized state. In the example, Segments have been selected in the side panel, causing the main panel 2910 to display a list of all current logical switches defined for the logical network. Multiple logical switches are active, and a logical switch labeled LS-103 is highlighted (either by default or by user interaction). Each entry provides a brief summary 2915 of the segment, indicating to which router the segment is connected, the type of segment, the associated subnet (if an overlay), and realization status. In the example, the summary indicates that logical switch LS-103 is an overlay segment associated with an IP subnet of 192.168.1.1/24, connected to router Tier0Gateway1 (described above with reference to FIG. 28), and successfully realized.

The main panel 2910 provides various configuration information sections for this segment, including segment profiles and DHCP static bindings. In some embodiments, one or more of these sections are not configurable via the global manager as desired state, but are instead discovered state based on configuration at the physical sites. Other available information includes statistics and related groups defined for the segment.

The main panel also displays in some embodiments information related to the desired state of the logical network element, such as the element's span. In the example, the Locations section 2920 shows a list of all locations that the LS-103 switch currently spans (e.g., London, Paris, and New York). Other available desired configuration information 2925 includes VLAN-specific settings such as domain name and address bindings, which are not applicable for this overlay network but which are populated for VLAN segments. Some or all of these settings may be modified by the administrator to define the desired state of the logical network.

The realization status of the LS-103 switch is visually represented in some embodiments as a status indicator 2930. In different embodiments, the status indicator may display different text, symbols, colors, or some combination of these. This status indicator 2930 represents in some embodiments a global status indicating the global realization status at all sites in the element's span. For example, if the switch has been successfully realized at all physical sites, the global status indicator 2820 may display a colored icon (e.g., green) and/or the word "Success." If the switch is not successfully realized at one or more of the physical sites in the span, then the global status indicator 2820 will display a different color (e.g., yellow or red) and/or different text such as "Pending" or "Error." In some embodiments, if the global status is not "Success" then there may be one or more alarms. The number of alarms is also displayed alongside the global status indicator in some embodiments, though in this example the number of alarms is zero since the switch has been successfully realized.

The global status indicator 2930 is in some embodiments an on-demand realization status. In some embodiments, selecting the logical network element from the interface is the action that initiates the realization status request. In the example of FIG. 29A, selecting the logical switch LS-103 from the list of segments initiates the global realization status request. In some embodiments, the global status indicator does not display any realization status even after selecting the segment, and an additional user interaction is required to initiate the request for the global realization status. For example, in such embodiments, instead of displaying the global status indicator, text or a user interface element (a button, etc.) labeled "Check status" could be displayed in the same part of the interface. Interaction with this element then initiates the global realization status request.

In some embodiments, the global status indicator 2930 is also a user interface element. Interaction with the global indicator, i.e. clicking, mouseover, or touching (if the interface is on a touchscreen) the global status indicator, creates a pop-up window in such embodiments, as in the example of FIG. 29B. The pop-up window 2932 displays the local realization status for the logical network element at each individual physical site that is spanned by the element.

In this example, each of the local managers at each spanned site each has reported "Success" to the global manager (as indicated by the status indicators 2935 next to each of the listed sites), in response to the realization status inquiry from the global manager. If the switch is not successfully realized at one or more of the physical sites in the span, then the local status indicator 2825 for that site will display a different color (e.g., yellow or red) and/or different text such as "Pending" or "Error." The status may also be refreshed by selecting a refresh icon in some embodiments, either for an individual physical site or for a global refresh, which initiates a new request for realization status at the specified site or sites. If refresh is selected for a specific site, then the request includes a site identifier in some embodiments, which is used as described above with reference to operation 2607 in process 2600.

In some embodiments, the global manager also receives notifications from the local managers. Unlike requests for realized state which are provided on-demand (e.g., pulled from the local managers), these notifications are automatically pushed from the local managers. The notifications pertain in some embodiments to site-specific implementation problems or situations. Notifications are provided in some embodiments to the GM as the events they describe occur, e.g. in real-time or near-real-time rather than on-demand. These notifications are also displayed in some embodiments as a report, e.g. for review by an administrator of the logical network.

Figure 30:
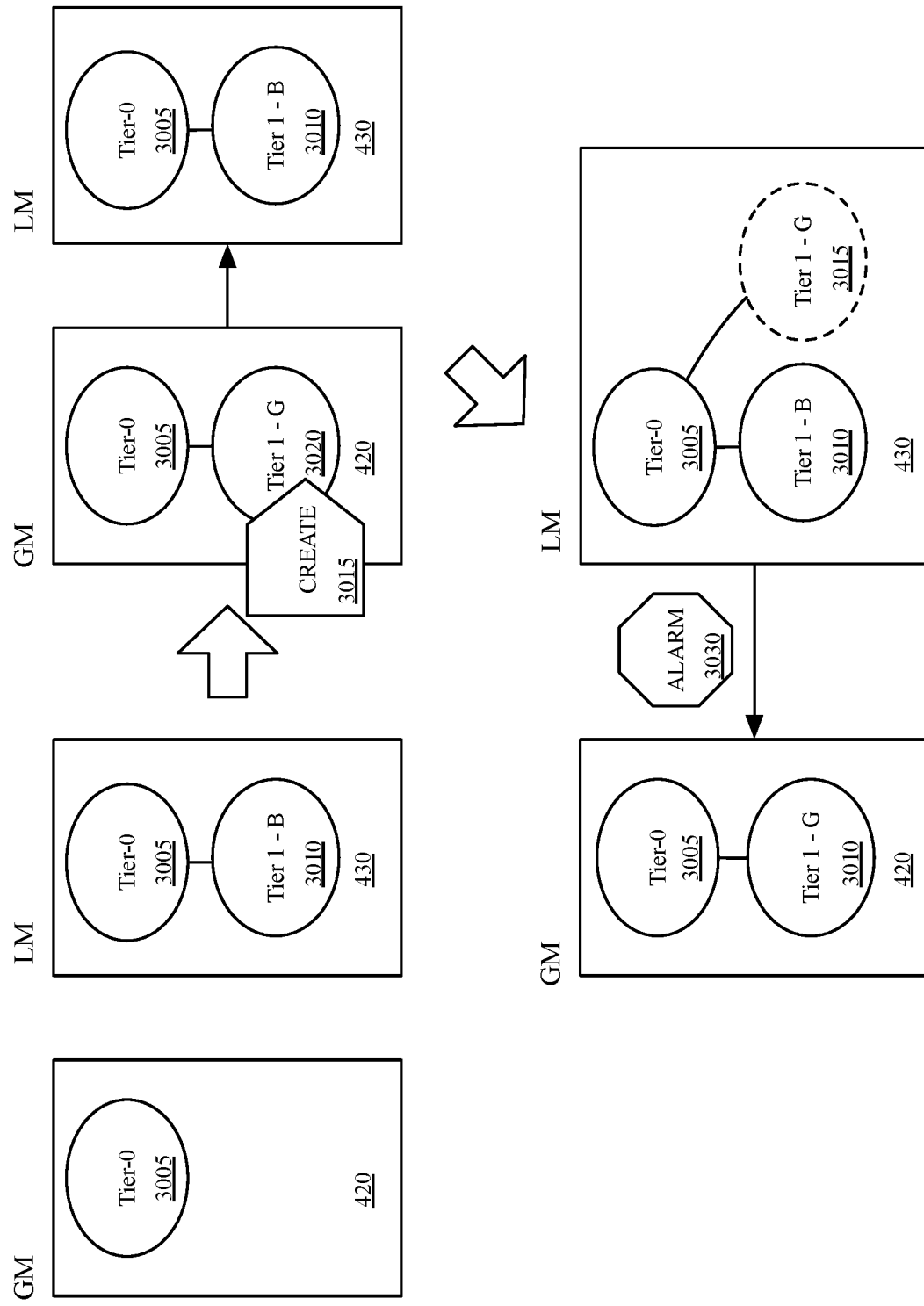
FIG. 30 conceptually illustrates an example of an alarm caused by a failure to create a requested logical network element at a local manager.

One type of notification in some embodiments is an alarm from a local manager that the implementation of a logical network element (e.g., a create event) has failed at the specific site. For example, the failure could be due to an IP address conflict with another network element defined locally at the local manager, of which the global manager was unaware. FIG. 30 conceptually illustrates an example of an alarm caused by a failure to create a requested logical network element at a local manager.

In the first stage (upper left left) of FIG. 30, the global manager 420 has a global policy tree 1700, and the local manager 430 at site B 410 has a site-specific version 2100 of the global policy tree. For clarity, only a portion of these trees are illustrated. Both trees have a Tier-0 router 3005 that was defined at the global manager 420 and successfully realized by the local manager 430. The tree at the local manager also has a Tier-1 router (T1-B) that was defined at the local manager, which references the globally-created T0 router 3005.

In the second stage (upper right) of FIG. 30, a command 3015 to create a Tier-1 router 3020 (T1-G) is received at the global manager 420. Router T1-G 3010 is created under the Tier-0 router 3005 in response to the create command 3015. The span of router T1-G 3020 includes site B 410, so the global manager 420 performs a span calculation (as described above) and instructs the local manager 430 at site B to create the same router. This instruction is provided to the local manager 430 in some embodiments using process 1300, which was described above.

The local manager 430 receives the instruction and attempts to fulfill the create command by creating router T1-G under the Tier-0 router. In some embodiments, the local manager attempts to create the router using process 1500, which was described above. In this example, however, the IP address range of router T1-G 3020 at least partially overlaps with the IP address range of the locally-created router T1-B 3010. Therefore, the local manager fails to create the requested router, since the requested IP range is invalid.

In the third stage (bottom) of FIG. 30, the local manager 430 sends an alarm 3030 to the global manager 420 informing of the failure to create the requested router T1-G 3020 at site B 410. The alarm 3030 in some embodiments also includes relevant detailed information to diagnose the reason of the failure (e.g., the IP address range of router T1-B 3010). The local manager 430 still creates the node for the requested router in some embodiments, but does not attempt to realize the router in the control plane. The unrealized status of the router T1-G 3020 at site B 410 is visually represented by a dashed outline in FIG. 30.

In some embodiments, an update command from the global manager 420 of an existing logical network element also may trigger a failure alarm. For example, the local managers 425-435 have in some embodiments emergency security policies that can override any other configuration in certain exceptional situations (e.g., a security exploit, a physical emergency or data loss, etc.). Emergency policies are not supported or recognized by the global manager in such embodiments, so any attempt to specify a change in policy that affects or contradicts the emergency policies at the local manager will also trigger an alarm in the same manner as described above with reference to FIG. 30.

Figure 31:
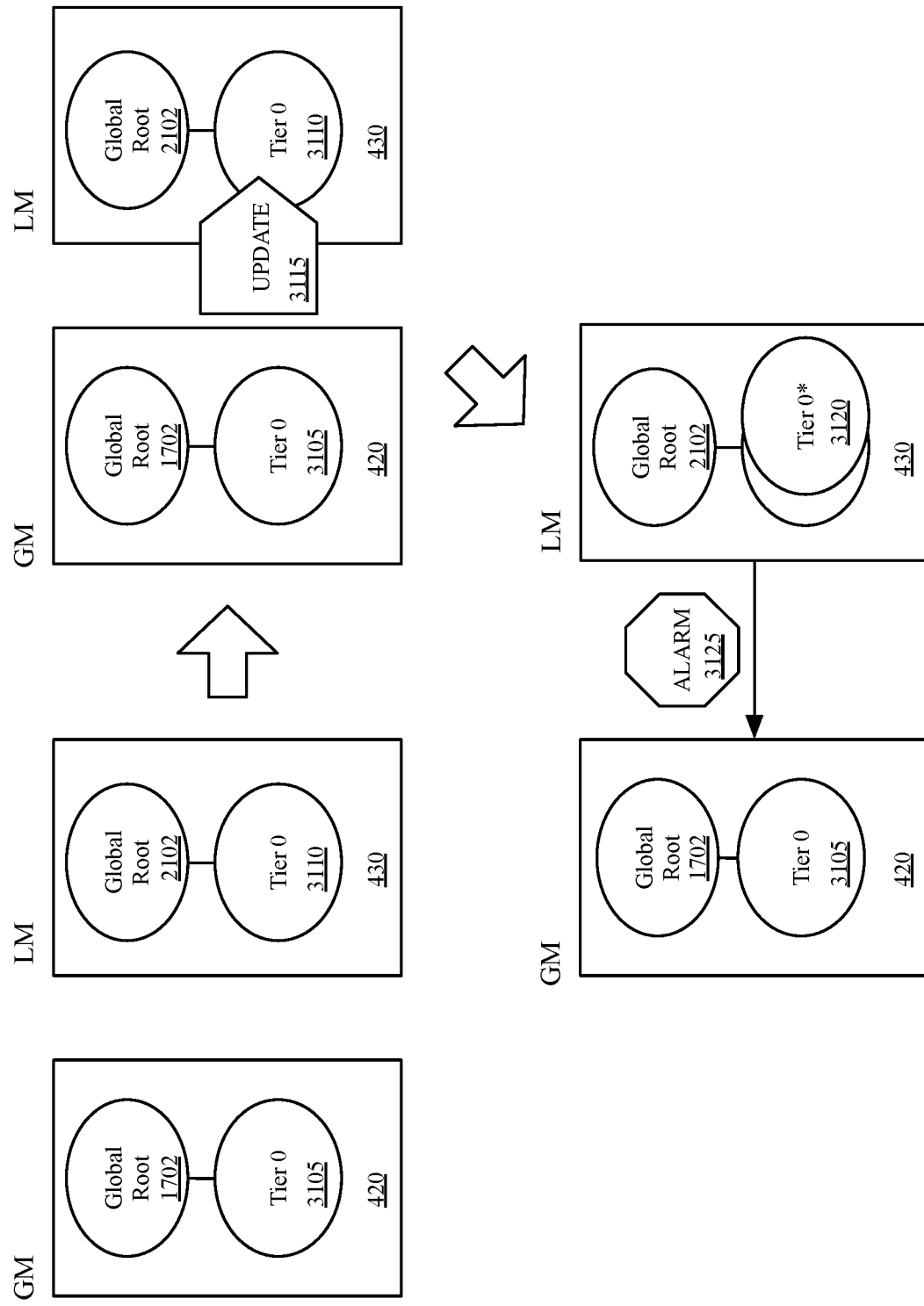
FIG. 31 conceptually illustrates an example of an alarm caused by an attempt to modify the global configuration.

Another type of notification in some embodiments is an alarm from the local manager that a local administrator of the network has attempted to override the desired state of a logical network element at that particular site. FIG. 31 conceptually illustrates an example of an alarm caused by an attempt to modify the global configuration.

In the first stage (upper left left) of FIG. 31, the global manager 420 has a global policy tree 1700, and the local manager 430 at site B 410 has a site-specific version 2100 of the global policy tree. A Tier-0 router 3105 is defined under the global policy root 1702, and a corresponding Tier-0 router 3110 is defined at the local manager 430 under the site-specific global policy root 2102. For clarity, both trees are simplified versions from the counterpart examples in FIG. 17 and FIG. 21.

In the second stage (upper right) of FIG. 31, a command 3115 to update the Tier-0 router 3110 is received at the local manager 430. This instruction is provided to the local manager 430 in some embodiments using process 1300, which was described above. This occurs in some embodiments by an administrator using the local manager 430 to modify the logical network rather than using the global manager 420. The same logical network element may be modified in some embodiments by different administrators, possibly located in a different geographical regions or even countries.

After receiving the update command, the local manager 430 in this example fails to implement the requested update to the Tier-0 router 3110. One example for why the update fails is because some embodiments restrict the types of configurations that can be overridden at the local manager 430. For example, the local manager 430 is only permitted to modify networking-related configuration in some embodiments. If the update is a security policy-related update, then the local manager is not permitted to override the global manager 420. Another example is when the update is to extend the router's span to a new site (i.e., stretching the span of the router) prior to stretching the security policies that govern the router. Security policies must be stretched before stretching logical network elements in some embodiments, to avoid creating a security loophole after the span is extended.

In the third stage (bottom) of FIG. 31, the local manager 430 creates a shadow copy 3120 of the Tier-0 router. This shadow copy (denoted with an asterisk as Tier-0*) is initially identical to the actual T0 router 3110, but since it was created by the local manager 430, it may be modified according to the received update command 3115. The original Tier-0 router 3110 from the global manager 420 is preserved as a read-only node. The local manager 430 uses the shadow copy 3120 of the router for further configuration of the network at the physical site B 410 instead of the original router 3110.

The local manager 430 sends an alarm 3125 to the global manager 420 in some embodiments, to notify it that an attempt was made to override the configuration of the Tier-0 router 3110, and that the shadow copy 3120 is in use instead. This is necessary because without this information, the global manager 420 would assume that the original copy of the Tier-0 router 3110 is in use, and any user intent based on that assumption would potentially fail or be inconsistent.

In embodiments where the attempt to modify the configuration of a logical network element succeeds (e.g., because the update is a networking-related update, not a security-related update), then the local manager in some embodiments sends a notification (not shown in FIG. 31) to the global manager of the update. This is necessary to inform the global manager 420 that the realized state of the logical network element at this physical site will not match the realized state of the element at other sites, due to the site-specific update.

Figure 32A:
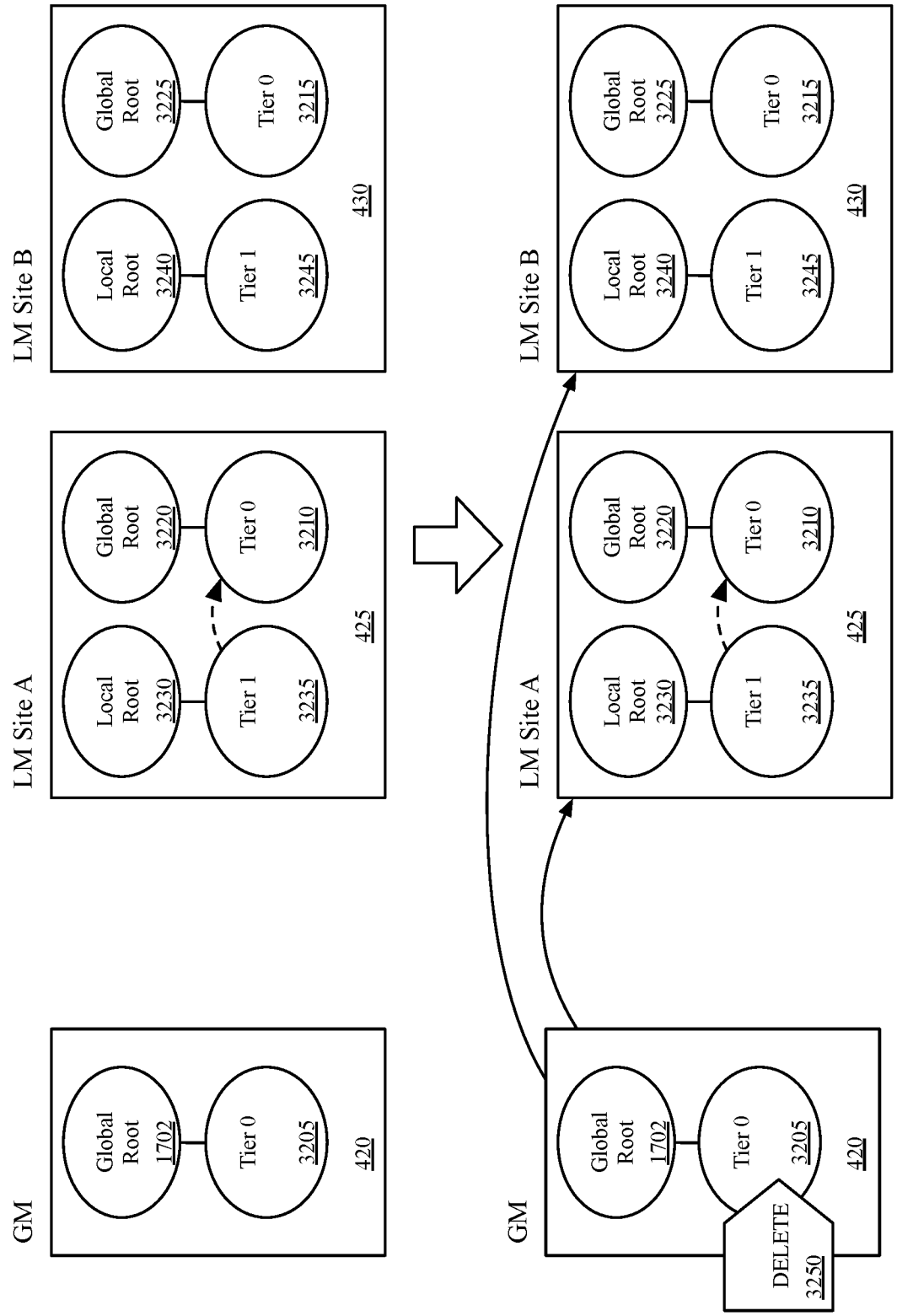
FIGS. 32A-B conceptually illustrate an example of an alarm caused by a failure to delete a logical network element.
Figure 32B:
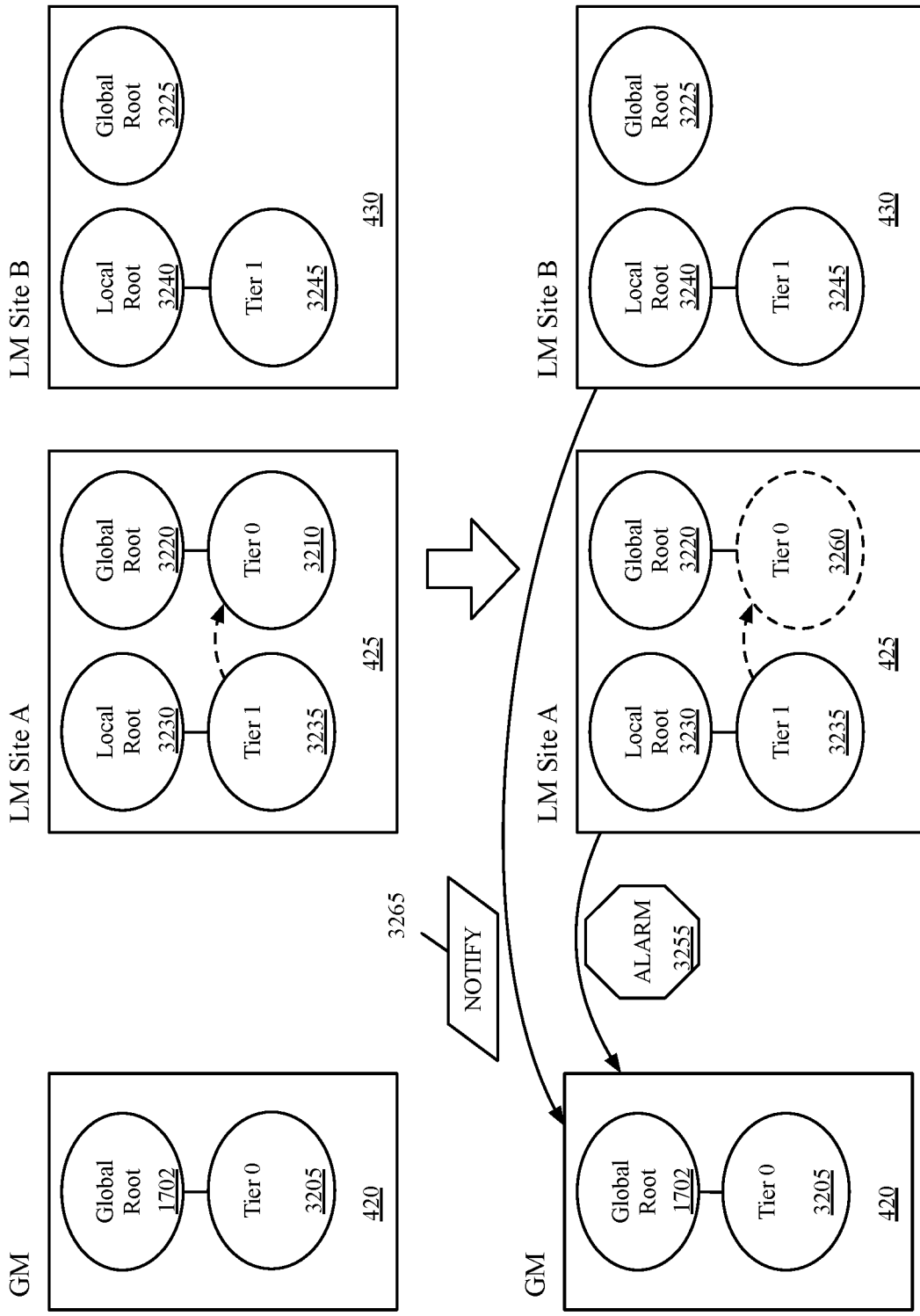

A third type of notification in some embodiments is a message from the local manager that the deletion of a logical network element has failed at the site. FIGS. 32A-32B conceptually illustrate an example of an alarm caused by a failure to delete a logical network element.

In the first stage of the example (upper portion of FIG. 32A), the global manager 420 has a global policy tree 1700, and local managers 425 and 430 at sites A 405 and B 410 respectively have a site-specific versions 2100 of the global policy tree. At the global manager 420, a Tier-0 router 3205 is defined under the global policy root 1702, and corresponding Tier-0 routers 3210 and 3215 are defined at the local managers 425 and 430 under the corresponding site-specific global policy roots 3220 and 3225. For clarity, all three trees are simplified versions from the counterpart examples in FIG. 17 and FIG. 21.

In the example, at site A 405 the local manager 425 also has a local policy tree with local root 3230 which was defined locally (e.g., by a local administrator, who may be different from a global administrator defining the global policy tree at the global manager 420). Beneath the local root 3230, a local Tier 1 router 3235 is also defined. This local Tier-1 router has a reference to the globally-defined Tier-0 router 3210 from the global manager (depicted as a dashed arrow from Tier-1 router 3235 to Tier-0 router 3210). The global manager 420 is completely unaware of the existence of Tier-1 router 3235 in some embodiments.

At site B 410, the local manager 430 also has a local policy tree with local root 3240 which was defined locally (e.g., by a local administrator, who may be different from a global administrator defining the global policy tree at the global manager 420). Beneath the local root 3240, a local Tier 1 router 3245 is also defined. This local Tier-1 router 3245 is a completely different router than the local Tier-1 router 3235 defined beneath the local root 3230 at the local manager 425 for site A 405. The local Tier-1 router 3245 does not have any reference to the globally-defined Tier-0 router 3210 from the global manager.

In the second stage of the example (bottom of FIG. 32A), a command 3250 to delete the Tier-0 router 3205 is received at the global manager 420. However, the Tier-0 router 3205 is not immediately deleted at the global manager in response to the command 3250, in some embodiments. The global manager 420 performs a span calculation to identify sites A and B as the span of the router 3205, and sends an instruction to the local managers 425 and 430, to delete the realized Tier-0 routers 3210 and 3215. This instruction is provided to the local manager 430 in some embodiments using process 1300, which was described above.

In the third stage of the example (top of FIG. 32B), the local manager 425 at site A 405 receives the instruction, but fails to delete the Tier-0 router 3210, since it is being referenced by the local Tier-1 router 3235. The local manager 430 at site B 410 also receives the instruction and successfully deletes the Tier-0 router 3215, since there are no local references to the router at this site.

In the fourth stage of the example (bottom of FIG. 32B), the local manager 425 sends an alarm 3255 to the global manager 420 informing of the failure to delete the requested Tier-0 router at site A 405. The alarm 3255 in some embodiments also includes detailed information to diagnose the reason of the failure. The Tier-0 router 3260 is not deleted, but is marked as pending deletion by the global manager in some embodiments, as illustrated by a dashed outline. In some embodiments an additional notification is generated for the local administrator of the local manager 425, so that they can resolve the issue (for example, by changing the reference of the T-1 router 3235 to a different T0 router, such as one created at the local manager 425).

The local manager 430 at site B 410 sends a notification 3265 to the global manager to inform that the Tier-0 router 3215 was successfully deleted from the local root 3225. The global manager 420 receives the notification 3265, but since there is an alarm 3255 instead of a corresponding success notification from local manager 425, in some embodiments the Tier-0 router 3205 is not deleted from the global root 1702.

An additional example of a type of notification in some embodiments is a message from the local manager that a logical network endpoint (e.g., a virtual machine) has been migrated from one site to another site. Such endpoints are typically attached to a logical port of a logical network element (e.g., a logical switch) that spans both sites. When the endpoint is migrated to a different site, it retains its association with that same logical port in some embodiments, and seamlessly inherits the same security policies that are associated with that port, even at the new site.

In some embodiments, a machine may be migrated from one physical site to another physical site, while preserving the state of network policies that apply to the machine. For example, for a logical segment (logical switch) that spans at least two physical sites, a machine attached to a logical port of the segment at one of the spanned sites is migrated in some embodiments to a new logical port of the same segment at another one of the spanned sites. Migrating a machine in some embodiments comprises creating a new machine at a new host computer (at the new site), transferring configuration data to the new machine from the original machine, and removing the original machine from its host computer. In some embodiments, the configuration data comprises physical state data and logical network policies.

The state of the machine (e.g., runtime data) is transferred in some embodiments from a computing device executing the original machine at the source site (i.e., the source host) to a computing device executing the new machine at the destination site (i.e., the destination host). In some embodiments, the state includes a local port identifier assigned by a local manager (e.g., local manager 425) at the source physical site, and a global port identifier assigned by the global manager 420. The global port identifier is associated with logical network policies defined through a user client 440 (e.g., by an administrator of the network) in some embodiments as part of the desired configuration of the logical network. Upon receiving the transferred state data, the destination host overwrites at least a portion of the state of the new machine with the received state of the old machine.

In some embodiments, the destination host extracts the global port identifier from the received state data and provides it to the destination site's local manager (e.g., local manager 430). The destination local manager 430 uses the global port identifier in some embodiments to retrieve logical network policies associated with the global port identifier from the global manager 420, and apply these policies to the new machine. In some embodiments, the local manager 430 generates configuration data from the policies and provides the configuration data to the control plane of the logical network at the destination site (e.g., a set of controllers 1420-1425) which then distributes the configuration data to the destination host.

Figure 33:
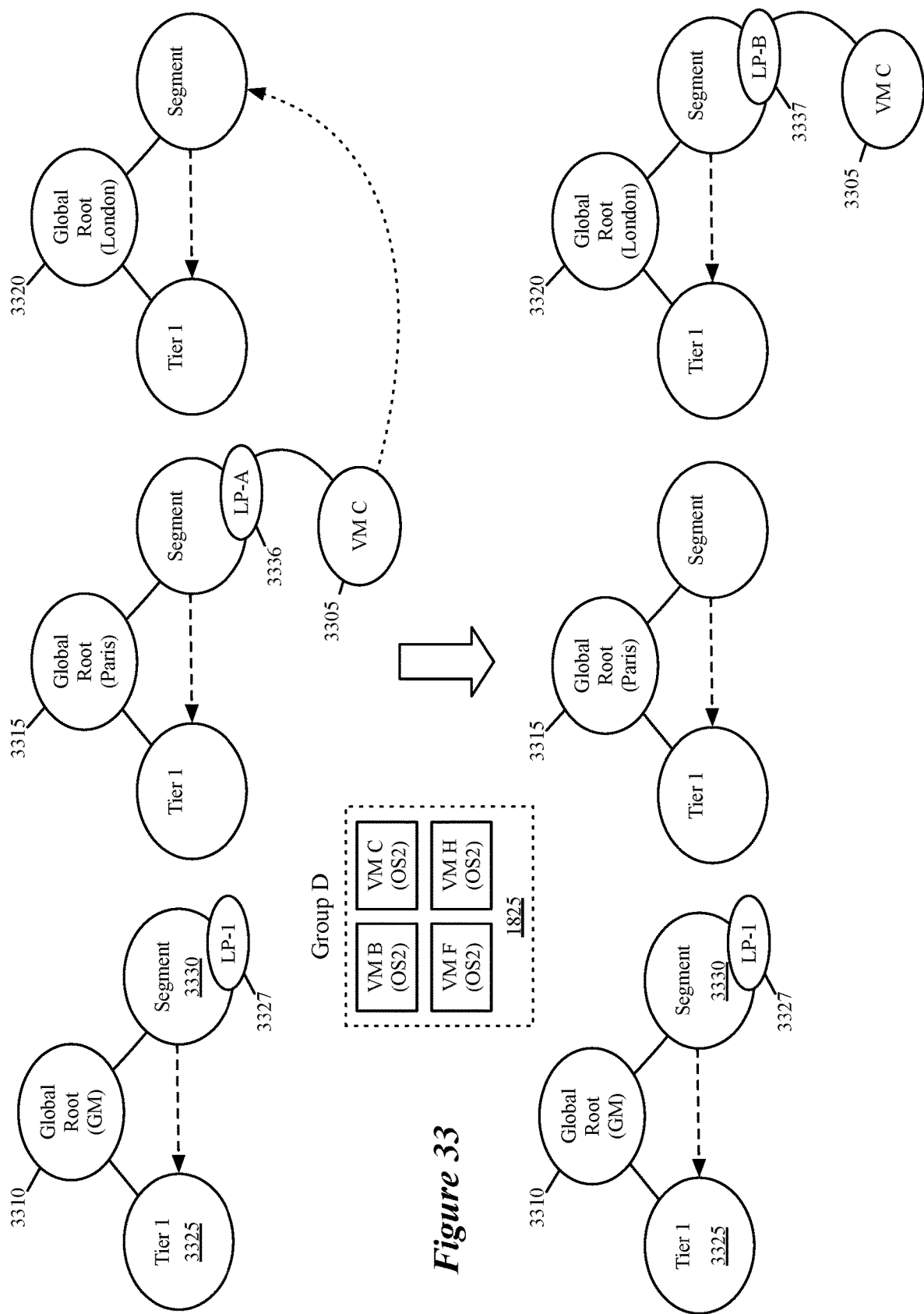
FIG. 33 illustrates an example of some embodiments for migrating a virtual machine between sites within a region while preserving the machine's group membership and associated policies.

FIG. 33 illustrates an example of some embodiments for migrating a virtual machine between sites within a region while preserving the machine's group membership and associated policies. The virtual machine (VM) 3305 in this example is a member of group D 1825 (e.g., machines running OS2 in the Europe domain) as described above with reference to FIG. 18. In this example, a simplified version of the global policy tree 3310 at the global manager 420 is shown, along with the corresponding (simplified) global policy trees 3315-3320 at the source and destination sites' local managers 425-430 (e.g., Paris and London, respectively). The policy tree has a Tier 1 router 3325 that spans both sites, and a network segment 3330 that references (dashed arrow) the T1 router 3325 as a parent and therefore inherits the same span. As a result, the router 3325 and the segment 3330 are defined in the policy trees at both sites. The segment 3330 also has a logical port 3327, which is assigned a global port identifier LP-1 at the global manager 420.

The initial stage of FIG. 33 (top half) illustrates the policy trees prior to the migration. Here, VM C 3305 has been created and attached to a logical port 3336 of segment 3330 at the first physical site A (e.g., Paris 405). VM C 3305 is a member of group D 1805, and executes on one of the host computers 1805 at site A. The port 3336 is assigned a local port identifier LP-A (e.g., by the local manager at site A) that in some embodiments is specific to the source site. A set of policies (not shown) are configured to apply to group D 1825, and are therefore applied to VM C 3305 at site A 405, since the domain 1770 under which group D is defined spans site A. A migration is then initiated (dotted line) to transfer VM C 3305 from a source server 1805 at site A (405) to a destination server 1810 at site B (410).

The second stage of FIG. 33 (bottom half) illustrates the policy trees after the migration. Here, VM C 3305 has been successfully transferred to the second physical site B (e.g., London 410). VM C 3305 is now attached to a logical port 3337 of segment 3330 at the second physical site B (e.g., London 410). VM C 3305 remains a member of group D 1805, and now executes on one of the host computers 1810 at site B. The port 3337 is assigned a local port identifier LP-B (e.g., by the local manager at site B) that in some embodiments is specific to the destination site. The set of policies remain applied to VM C 3305 at site B 410, since the domain 1770 under which group D is defined spans site B.

In this example, the global manager is not aware of the local port identifiers LP-A or LP-B. In some embodiments, each of the local managers 425-430 maintains a mapping of the global port identifier and the local port identifier for the logical port at the respective site. This mapping allows the local managers to retrieve from the global manager 420 the relevant policy information applicable to the machine, so that these policies are seamlessly applied before and after migration.

In the example of FIG. 33, the machine was transferred between sites in the same region, retained its group membership, and policies associated with that group membership were applied automatically. Some embodiments also permit migration of a machine from a site in one region to a site in another region. However, in some such embodiments, the same policies would not necessarily apply to the machine (e.g., if the policies applicable to the machine at the source site do not span the second site). In such cases, in some embodiments new security policies would need to be applied manually (e.g., by the administrator of the logical network). In addition, if the segment does not span the destination site, then in some embodiments the machine would lose connectivity to the rest of the logical network after migration.

Figure 34A:
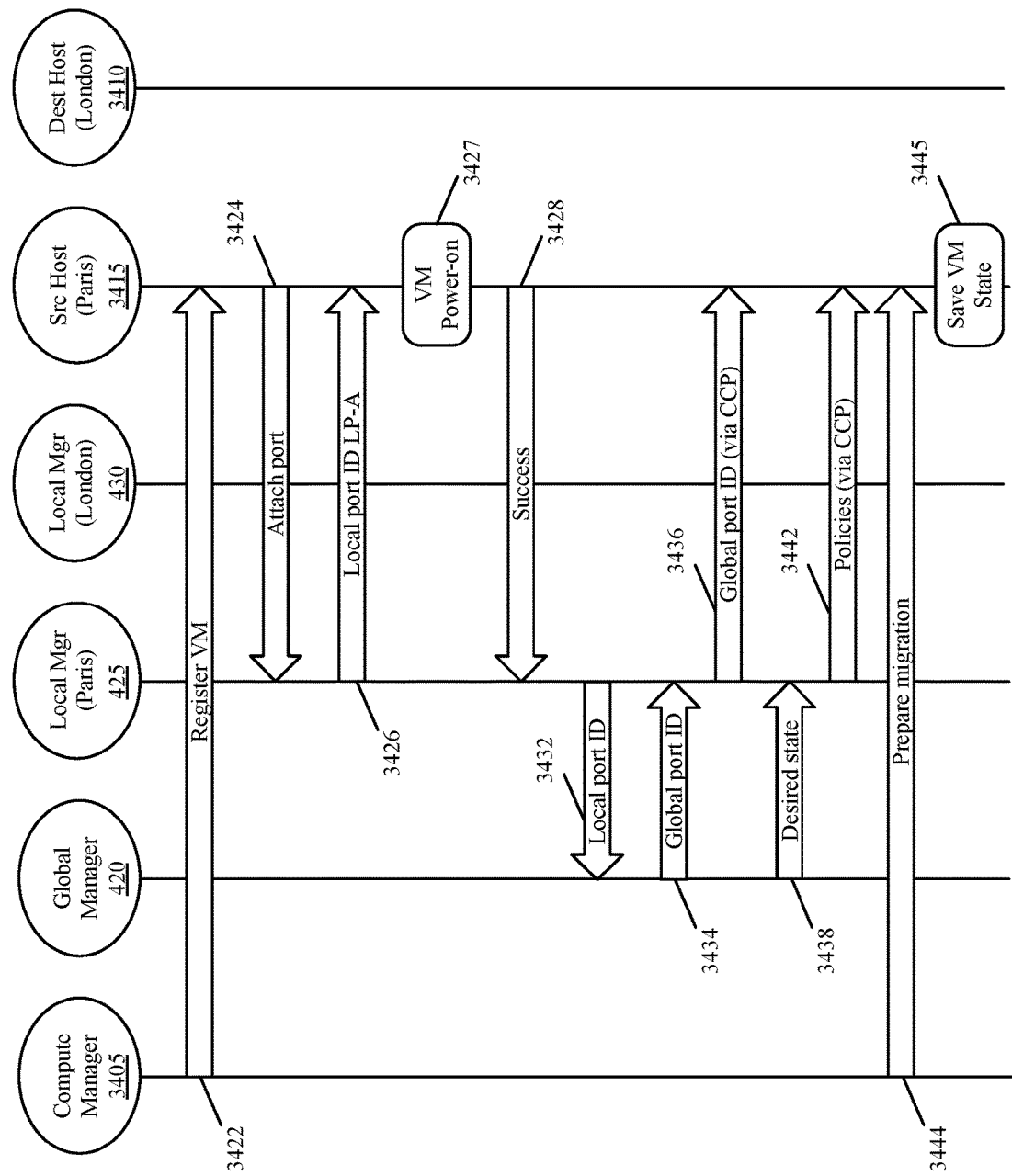
FIGS. 34A-C conceptually illustrate the exchange of information during creation and migration of a virtual machine between the global manager, the local managers, and the source and destination hosts.
Figure 34B:
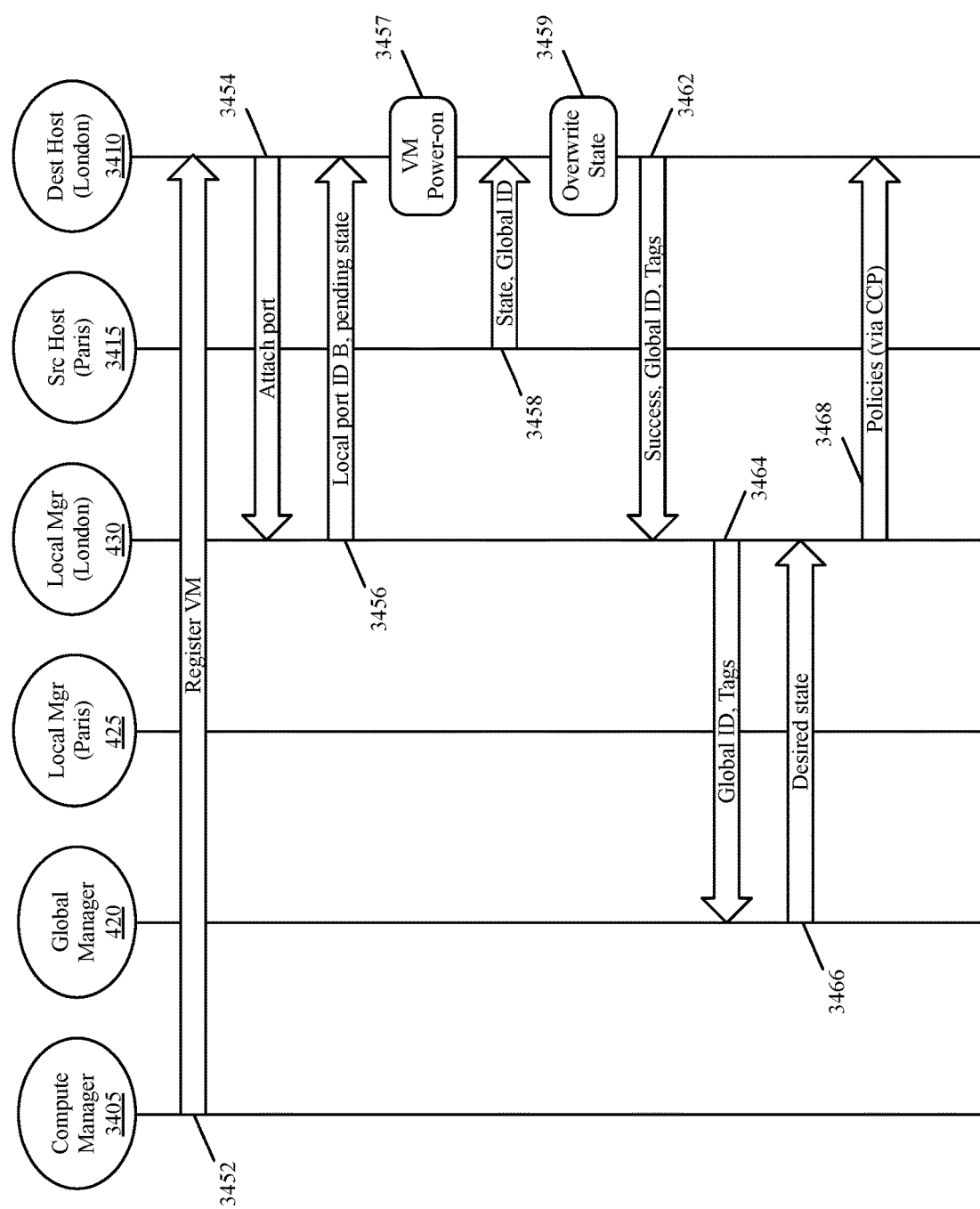
Figure 34C:
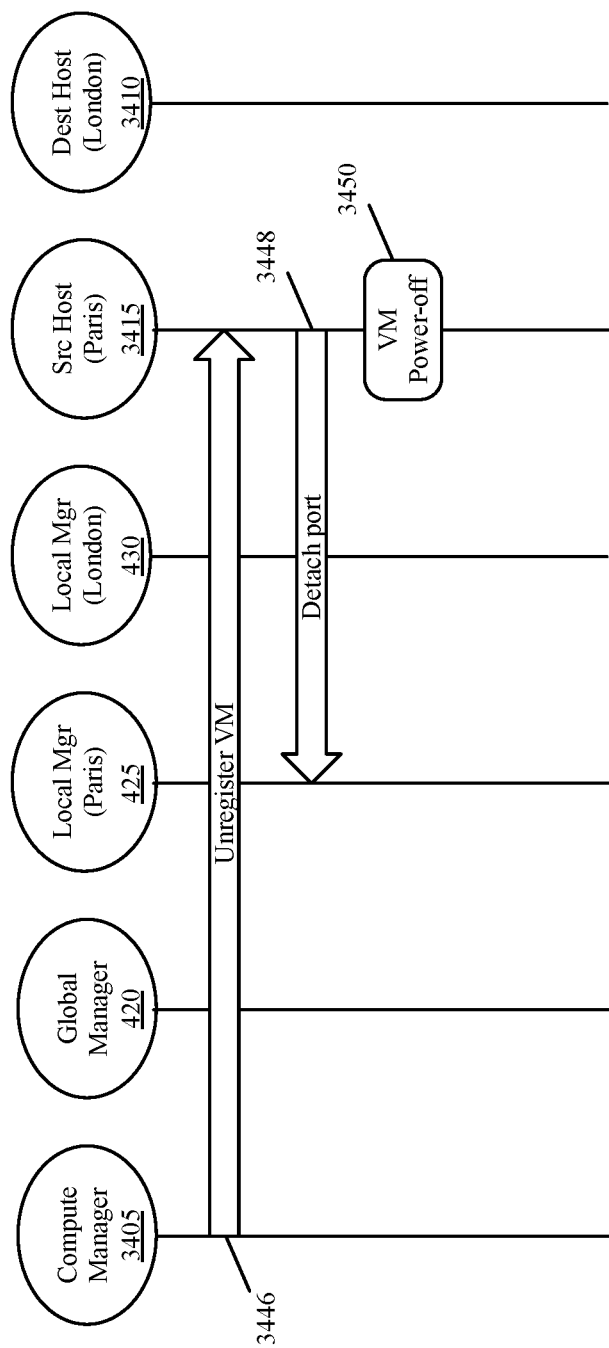
Figure 35:
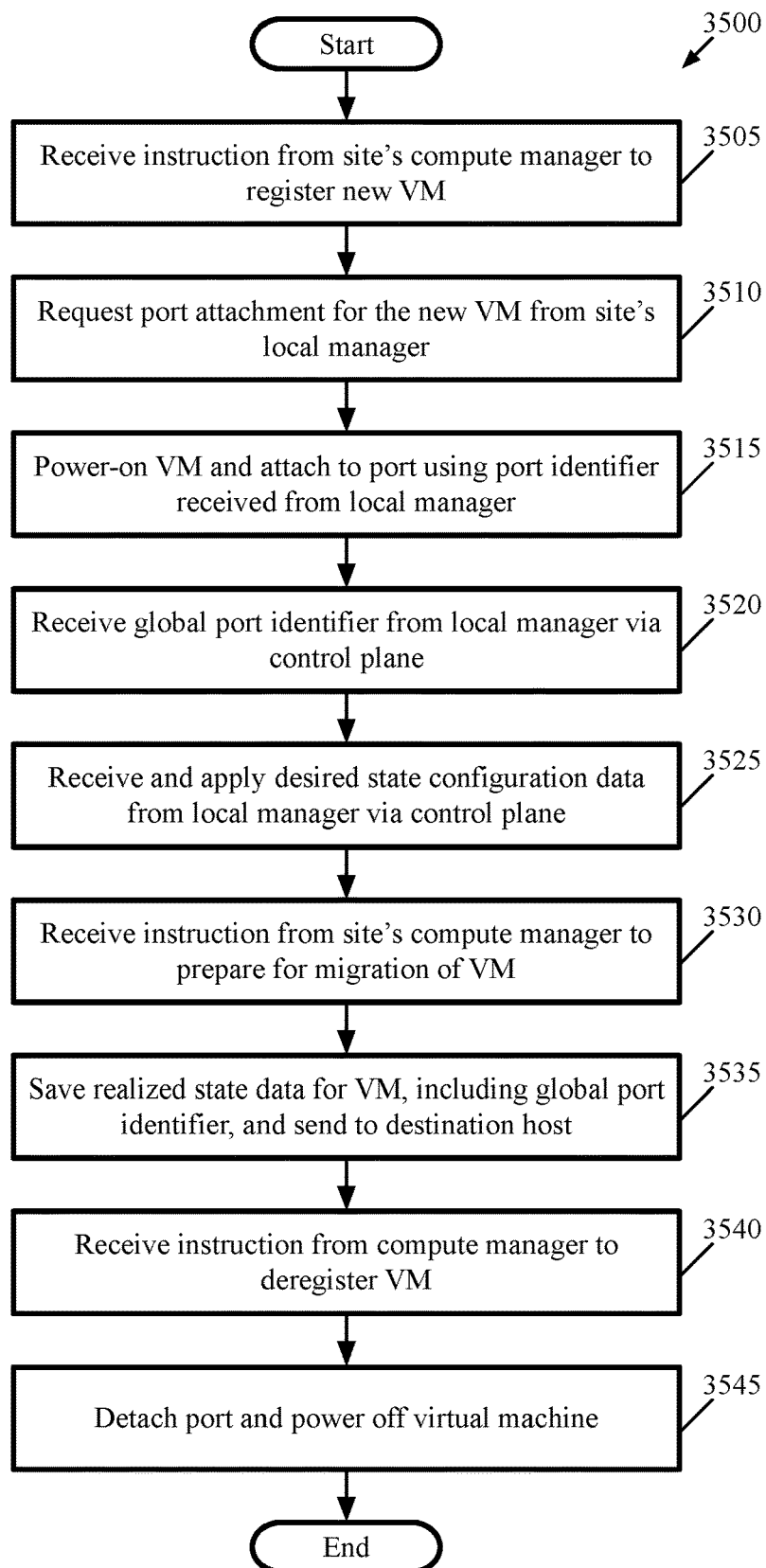
FIG. 35 conceptually illustrates a process performed in some embodiments by a source host during the creation and migration of a virtual machine.

FIGS. 34A-C conceptually illustrate the exchange of information during VM creation and migration in some embodiments between the global manager, the local managers, and source and destination hosts. FIG. 35 conceptually illustrates, with reference to FIG. 34, a process 3500 performed in some embodiments by a source host 3415 at the source site during creation and migration of a virtual machine (VM). In embodiments exemplified by this process, the VM is migrated from the source site by powering on a new VM at the destination site, and transferring the VM state from the source host to the destination host.

The process 3500 begins at 3505 by receiving an instruction from a compute manager 3405 to register a new VM, for attachment to a logical segment 3330 that spans the source site. The register command is illustrated in FIG. 34A as instruction 3422. The compute manager 3405 in some embodiments directs the allocation of computing resources at one or more of the physical sites spanned by the logical network. In some embodiments, an administrator of the logical network determines (e.g., through a user interface 440) where the new VM should be registered.

At 3510, the process 3500 requests a port attachment for the new VM, from the local manager 425 at the source site. The port attachment request is illustrated in FIG. 34A as instruction 3424. In response to the request, the local manager 425 creates a logical port 3336 for the logical segment 3330, and returns a local port identifier (e.g., LP-A) specific to the source site, as illustrated in FIG. 34A by instruction 3426. The local port identifier is a universal unique identifier (UUID) in some embodiments.

At 3515, the process 3500 powers on the requested VM, as indicated by event 3427. The process 3500 attaches the new VM to the port 3336 of the logical segment 3330, using the local port identifier (e.g., LP-A) received from the local manager 425. In some embodiments, the process 3500 sends a success message to the local manager 425 after attaching the port 3336. The success message is illustrated in FIG. 34A as instruction 3428.

Upon receiving the success message, in some embodiments the local manager 425 provides the local port identifier (as illustrated in FIG. 34A by instruction 3432) to the global manager 420 (e.g. discovered state, as described above). The global manager updates the segment 3330 to include a logical port 3327, and allocates a global port identifier (e.g., LP-1) to the logical port. In some embodiments, the global manager 420 uses the same local port identifier assigned by the source local manager 425. In other embodiments, the global manager generates a new port identifier, e.g. a path relative to the global root 1702 that indicates the location of the parent segment in the hierarchical policy tree. The global manager 3425 then provides the global port identifier back to the local manager 425, as illustrated in FIG. 34A by instruction 3434.

At 3520, the process 3500 receives the global port identifier from the local manager 425, as illustrated in FIG. 34A by instruction 3436. In some embodiments, the local manager 425 provides the global identifier to the central control plane of the logical network at the source site (e.g., a set of controllers 1420-1425). The controllers then distribute the global identifier to the process 3500, via an agent in some embodiments that executes on the same host (e.g., the source host 3415 that performs the process 3500) alongside the VM.

In some embodiments, a set of tags are also specified at the global manager 420 for attaching to the newly attached VM. These tags are used to define group membership for the VM in some embodiments. Security rules may also be defined dynamically using these tags. In some embodiments, these dynamic references to tags may include regular expressions. Thus, for example, a set of tags dev_paris could be defined to indicate a VM is in development mode, and security rules defined just for the Paris site by referencing the full tag, or security rules could be defined just using a portion of the tag (e.g., "dev_*") to apply to all VMs tagged as in development mode regardless of location. The tags are directly applied to the VM in some embodiments, and applied by the source host 3415 internally on the logical port.

In some embodiments, the global manager 420 receives configuration data (e.g., desired state, such as security policies) to apply to the logical port. The desired state is received in some embodiments through a user interface 440 (e.g., from an administrator of the logical network). The desired state is then provided from the global manager 420 to the local manager 425, as described above with reference to FIG. 13. The receipt of the desired state by the local manager 425 is illustrated in FIG. 34A as instruction 3438.

At 3525, the process 3500 receives and applies the desired configuration (e.g., security policies, of which some may reference the tags) to the logical port 3336, as illustrated in FIG. 34A by instruction 3442. In other words, the process 3500 realizes the desired state. In some embodiments, the local manager 425 generates configuration data from the received desired state, and provides the configuration data to the central control plane of the logical network at the source site (e.g., a set of controllers 1420-1425). The controllers then distribute the configuration data to the process 3500, via an agent in some embodiments that executes on the same host (e.g., the source host 3415 that performs the process 3500) alongside the VM.

At 3530, the process 3500 receives an instruction from the compute manager 3405 to prepare the VM for migration. The migration command is illustrated in FIG. 34A as instruction 3444. The instruction includes in some embodiments an address of the destination host 3410 to where the VM will migrate. In some embodiments, an administrator of the logical network determines (e.g., through a user interface 440) where the VM will migrate.

At 3535, the process 3500 saves the realized state data for the VM, as indicated by event 3445. In some embodiments, the saved state data includes the global port identifier, which was received as described above at 3520. The process 3500 sends the saved data to the destination host 3410, as described below with reference to process 3600 of FIG. 36, and as illustrated in FIG. 34B as instruction 3458.

At 3540, the process 3500 receives an instruction from the compute manager 3405 to de-register the VM. The deregistration command is illustrated in FIG. 34C as instruction 3446. In some embodiments, the compute manager 3405 sends this instruction based on one or more notifications (not shown) that the state data has been successfully saved (e.g., from the local manager 425) and/or that the VM at the destination site has been successfully updated with the saved state data, as described below with reference to process 3600 of FIG. 36.

At 3545, the process 3500 requests the local manager 425 to detach the logical port 3336, as illustrated in FIG. 34C by instruction 3448. After successfully detaching the port, the process 3500 powers off the VM, as indicated by event 3450. The process 3500 then ends.

Figure 36:
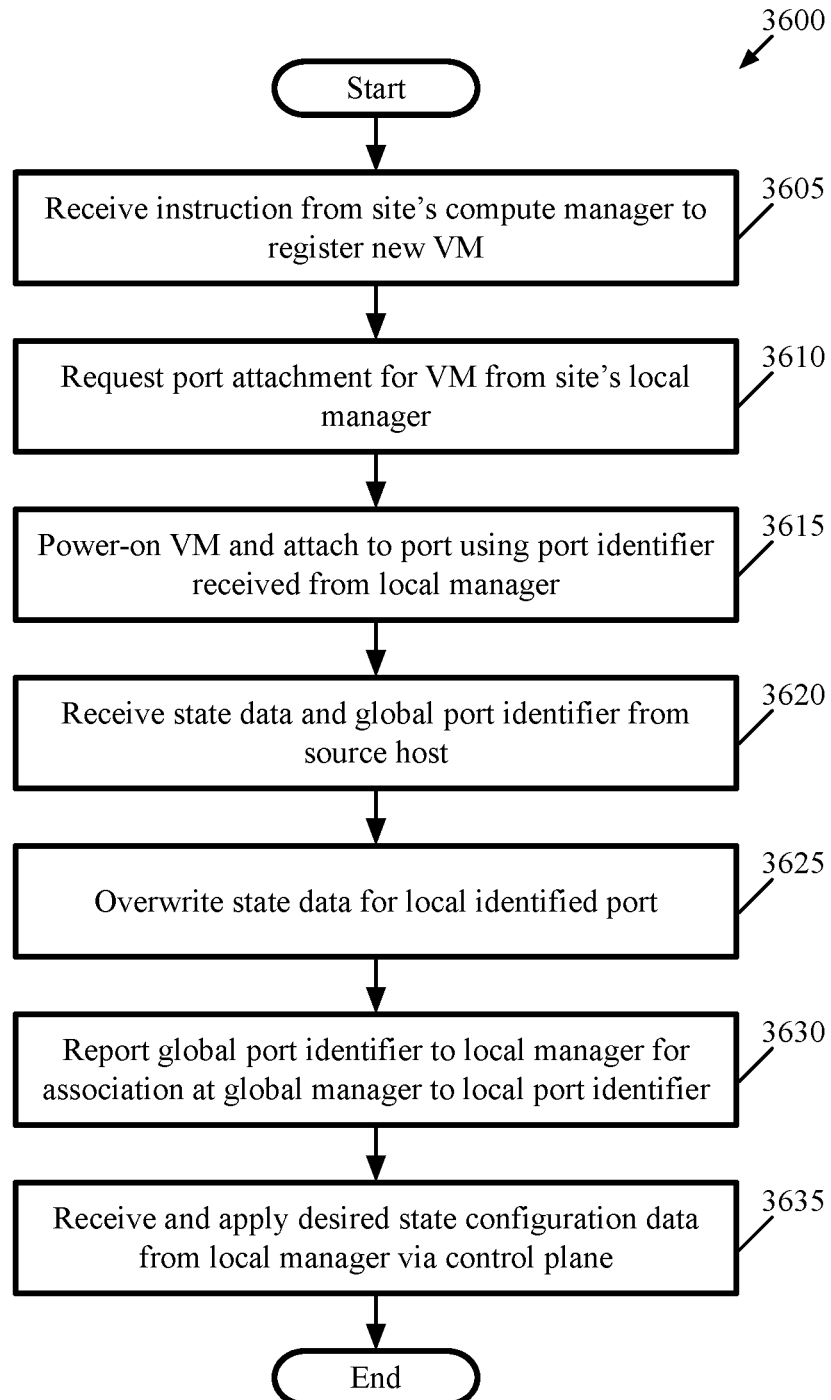
FIG. 36 conceptually illustrates a process performed in some embodiments by a destination host during the creation and migration of a virtual machine.

FIG. 36 conceptually illustrates, with reference to FIG. 34, a corresponding process 3600 performed in some embodiments by a destination host 3410 at the destination site during migration of the VM from the source host 3415. In embodiments exemplified by this process, the VM is migrated from the source site by powering on a new VM at the destination site, and transferring the VM state from the source host to the destination host.

The process 3600 begins at 3605 by receiving an instruction from the compute manager 3405 to register a new VM, for attachment to the logical segment 3330 that spans the source site and the destination site. The register command is illustrated in FIG. 34B as instruction 3452. As noted above, the compute manager 3405 in some embodiments directs the allocation of computing resources at one or more of the physical sites spanned by the logical network. In some embodiments, an administrator of the logical network determines (e.g., through a user interface 440) to which site the VM should be migrated.

At 3610, the process 3600 requests a port attachment for the new VM, from the local manager 430 at the destination site. The port attachment request is illustrated in FIG. 34B as instruction 3454. In response to the request, the local manager 430 creates a logical port 3337 for the logical segment 3330, and returns a local port identifier (e.g., LP-B) specific to the source site, as illustrated in FIG. 34B by instruction 3456. In some embodiments, the local manager 430 also includes flag for the created port 3337, to indicate that the port has a pending state.

At 3615, the process 3600 powers on the requested VM, as indicated in FIG. 34B by event 3457. The process 3600 attaches the new VM to the port 3337 of the logical segment 3330, using the local port identifier (e.g., LP-B) received from the local manager 430.

At 3620, the process 3600 receives saved state data from the source host 3415. The saved state data includes the global port identifier (e.g., LP-1) in some embodiments, which was saved by the original VM on the source host 3415, as described above with reference to process 3500 of FIG. 35. The receipt of the state data and global identifier is illustrated in FIG. 34B as instruction 3458.

In some embodiments, the transfer 3458 of state data from the source host 3415 is a lengthy process, including copying disks, memory, and other data. This process takes several hours in some embodiments, and the source VM is still active on the source host 3415 during this time. Packets received by the source host are also included in the state transfer, so even though there are no policies applied to the destination host during the state transfer, it does not matter, since the traffic is being correctly processed by the source VM. The destination VM does not receive any direct data traffic during the state transfer. Therefore, in some embodiments, the pending flag is used to ensure that the destination host does not send a success message to the local manager until the state transfer is complete. Otherwise, the local manager would report the success to the global manager and traffic would begin to arrive prematurely at the destination VM. The pending state is tracked in some embodiments by both the destination host 3410 and the destination local manager 430.

At 3625, the process 3600 overwrites the configuration of the logical port 3337 with the received state data, as indicated in FIG. 34B by event 3459. Specifically, the process 3600 restores the saved data from the original VM to the new VM. The state data also includes in some embodiments the local port identifier (e.g., LP-A) assigned to the original VM from the source local manager 430, as described above with reference to FIG. 35. In such embodiments, the process does not overwrite the local port identifier (e.g., LP-B) received from the local manager 430 with the local port identifier (e.g., LP-A) in the saved data. In some embodiments, the state data also includes metadata associated with the original VM, some of which is also overwritten onto the new VM. The state data also includes any tags that were assigned to the source VM.

In some embodiments, when the destination local manager 430 identifies that the full replication is complete (memory, disks, etc), it performs a fast suspend and resume (FSR) operation at the destination VM. This is coordinated with the source local manager 425 in some embodiments (e.g., via the compute manager 3405), to also perform the same FSR operation at the source VM. The FSR operation flips active status of the source VM off and enables active status for the destination VM, so that the destination VM may begin receiving traffic. The pending state of the destination port is also removed in some embodiments at this stage.

At 3630, the process 3600 sends a success message to the local manager 430 after attaching the port. In some embodiments, the process 3600 also reports the global port identifier (e.g., LP-1), and also any associated tags, to the local manager 430. The provision of the success message, global port identifier, and tags to the local manager 430 is illustrated in FIG. 34B as instruction 3462.

Upon receiving the global port identifier, in some embodiments the local manager 430 updates the segment 3330 to associate the global port identifier (e.g., LP-1) with the local port identifier (e.g., LP-B) for port 3337. The local manager 430 then uses the global port identifier and the tags to request the desired state for the port 3337, from the global manager 420, as illustrated in FIG. 34B by instruction 3464) to the global manager 420. The desired state is then provided from the global manager 420 to the local manager 430, as described above with reference to FIG. 13. The receipt of the desired state by the local manager is illustrated in FIG. 34B as instruction 3466.

At 3635, the process 3600 receives and applies the desired state to the logical port 3337, as illustrated in FIG. 34B by instruction 3468. In other words, at 3635 the process 3600 realizes the desired state. In some embodiments, the local manager 430 generates configuration data from the received desired state, and provides the configuration data to the central control plane of the logical network at the source site (e.g., a set of controllers 1420-1425). The controllers then distribute the configuration data to the process 3600. The process 3600 then ends.

Many of the above-described features and applications are implemented as software processes that are specified as a set of instructions recorded on a computer readable storage medium (also referred to as computer readable medium). When these instructions are executed by one or more processing unit(s) (e.g., one or more processors, cores of processors, or other processing units), they cause the processing unit(s) to perform the actions indicated in the instructions. Examples of computer readable media include, but are not limited to, CD-ROMs, flash drives, RAM chips, hard drives, EPROMs, etc. The computer readable media does not include carrier waves and electronic signals passing wirelessly or over wired connections.

In this specification, the term "software" is meant to include firmware residing in read-only memory or applications stored in magnetic storage, which can be read into memory for processing by a processor. Also, in some embodiments, multiple software inventions can be implemented as sub-parts of a larger program while remaining distinct software inventions. In some embodiments, multiple software inventions can also be implemented as separate programs. Finally, any combination of separate programs that together implement a software invention described here is within the scope of the invention. In some embodiments, the software programs, when installed to operate on one or more electronic systems, define one or more specific machine implementations that execute and perform the operations of the software programs.

Figure 37:
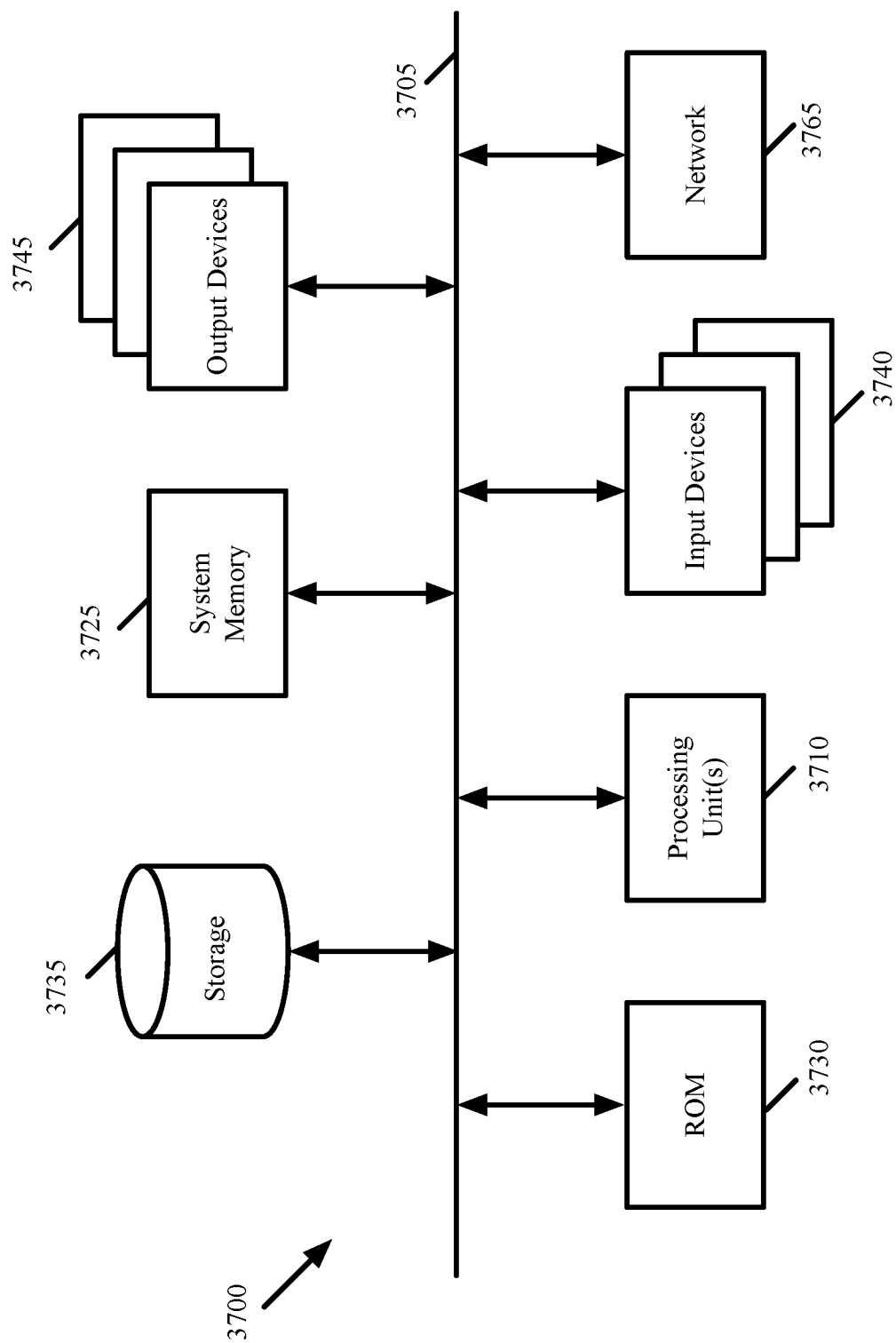
FIG. 37 conceptually illustrates an electronic system with which some embodiments of the invention are implemented.

FIG. 37 conceptually illustrates an electronic system 3700 with which some embodiments of the invention are implemented. The electronic system 3700 may be a computer (e.g., a desktop computer, personal computer, tablet computer, server computer, mainframe, a blade computer etc.), phone, PDA, or any other sort of electronic device. Such an electronic system includes various types of computer readable media and interfaces for various other types of computer readable media. Electronic system 3700 includes a bus 3705, processing unit(s) 3710, a system memory 3725, a read-only memory 3730, a permanent storage device 3735, input devices 3740, and output devices 3745.

The bus 3705 collectively represents all system, peripheral, and chipset buses that communicatively connect the numerous internal devices of the electronic system 3700. For instance, the bus 3705 communicatively connects the processing unit(s) 3710 with the read-only memory 3730, the system memory 3725, and the permanent storage device 3735.

From these various memory units, the processing unit(s) 3710 retrieve instructions to execute and data to process in order to execute the processes of the invention. The processing unit(s) may be a single processor or a multi-core processor in different embodiments.

The read-only-memory (ROM) 3730 stores static data and instructions that are needed by the processing unit(s) 3710 and other modules of the electronic system. The permanent storage device 3735, on the other hand, is a read-and-write memory device. This device is a non-volatile memory unit that stores instructions and data even when the electronic system 3700 is off. Some embodiments of the invention use a mass-storage device (such as a magnetic or optical disk and its corresponding disk drive) as the permanent storage device 3735.

Other embodiments use a removable storage device (such as a floppy disk, flash drive, etc.) as the permanent storage device. Like the permanent storage device 3735, the system memory 3725 is a read-and-write memory device. However, unlike storage device 3735, the system memory is a volatile read-and-write memory, such a random-access memory. The system memory stores some of the instructions and data that the processor needs at runtime. In some embodiments, the invention's processes are stored in the system memory 3725, the permanent storage device 3735, and/or the read-only memory 3730. From these various memory units, the processing unit(s) 3710 retrieve instructions to execute and data to process in order to execute the processes of some embodiments.

The bus 3705 also connects to the input and output devices 3740 and 3745. The input devices enable the user to communicate information and select commands to the electronic system. The input devices 3740 include alphanumeric keyboards and pointing devices (also called "cursor control devices"). The output devices 3745 display images generated by the electronic system. The output devices include printers and display devices, such as cathode ray tubes (CRT) or liquid crystal displays (LCD). Some embodiments include devices such as a touchscreen that function as both input and output devices.

Finally, as shown in FIG. 37, bus 3705 also couples electronic system 3700 to a network 3765 through a network adapter (not shown). In this manner, the computer can be a part of a network of computers (such as a local area network ("LAN"), a wide area network ("WAN"), or an Intranet, or a network of networks, such as the Internet. Any or all components of electronic system 3700 may be used in conjunction with the invention.

Some embodiments include electronic components, such as microprocessors, storage and memory that store computer program instructions in a machine-readable or computer-readable medium (alternatively referred to as computer-readable storage media, machine-readable media, or machine-readable storage media). Some examples of such computer-readable media include RAM, ROM, read-only compact discs (CD-ROM), recordable compact discs (CD-R), rewritable compact discs (CD-RW), read-only digital versatile discs (e.g., DVD-ROM, dual-layer DVD-ROM), a variety of recordable/rewritable DVDs (e.g., DVD-RAM, DVD-RW, DVD+RW, etc.), flash memory (e.g., SD cards, mini-SD cards, micro-SD cards, etc.), magnetic and/or solid state hard drives, read-only and recordable Blu-Ray® discs, ultra-density optical discs, any other optical or magnetic media, and floppy disks. The computer-readable media may store a computer program that is executable by at least one processing unit and includes sets of instructions for performing various operations. Examples of computer programs or computer code include machine code, such as is produced by a compiler, and files including higher-level code that are executed by a computer, an electronic component, or a microprocessor using an interpreter.

While the above discussion primarily refers to microprocessor or multi-core processors that execute software, some embodiments are performed by one or more integrated circuits, such as application specific integrated circuits (ASICs) or field programmable gate arrays (FPGAs). In some embodiments, such integrated circuits execute instructions that are stored on the circuit itself.

As used in this specification, the terms "computer", "server", "processor", and "memory" all refer to electronic or other technological devices. These terms exclude people or groups of people. For the purposes of the specification, the terms display or displaying means displaying on an electronic device. As used in this specification, the terms "computer readable medium," "computer readable media," and "machine readable medium" are entirely restricted to tangible, physical objects that store information in a form that is readable by a computer. These terms exclude any wireless signals, wired download signals, and any other ephemeral signals.

This specification refers throughout to computational and network environments that include virtual machines (VMs).

However, virtual machines are merely one example of data compute nodes (DCNs) or data compute end nodes, also referred to as addressable nodes. DCNs may include non-virtualized physical hosts, virtual machines, containers that run on top of a host operating system without the need for a hypervisor or separate operating system, and hypervisor kernel network interface modules.

VMs, in some embodiments, operate with their own guest operating systems on a host using resources of the host virtualized by virtualization software (e.g., a hypervisor, virtual machine monitor, etc.). The tenant (i.e., the owner of the VM) can choose which applications to operate on top of the guest operating system. Some containers, on the other hand, are constructs that run on top of a host operating system without the need for a hypervisor or separate guest operating system. In some embodiments, the host operating system uses name spaces to isolate the containers from each other and therefore provides operating-system level segregation of the different groups of applications that operate within different containers. This segregation is akin to the VM segregation that is offered in hypervisor-virtualized environments that virtualize system hardware, and thus can be viewed as a form of virtualization that isolates different groups of applications that operate in different containers. Such containers are more lightweight than VMs.

Hypervisor kernel network interface modules, in some embodiments, is a non-VM DCN that includes a network stack with a hypervisor kernel network interface and receive/transmit threads. One example of a hypervisor kernel network interface module is the vmknic module that is part of the ESXi™ hypervisor of VMware, Inc.

It should be understood that while the specification refers to VMs, the examples given could be any type of DCNs, including physical hosts, VMs, non-VM containers, and hypervisor kernel network interface modules. In fact, the example networks could include combinations of different types of DCNs in some embodiments.

While the invention has been described with reference to numerous specific details, one of ordinary skill in the art will recognize that the invention can be embodied in other specific forms without departing from the spirit of the invention. In addition, a number of the figures (including FIGS. 10, 12, 13, 15, 16, 19, 20, 24, 26, 35, and 36) conceptually illustrate processes. The specific operations of these processes may not be performed in the exact order shown and described. The specific operations may not be performed in one continuous series of operations, and different specific operations may be performed in different embodiments. Furthermore, the process could be implemented using several sub-processes, or as part of a larger macro process. Thus, one of ordinary skill in the art would understand that the invention is not to be limited by the foregoing illustrative details, but rather is to be defined by the appended claims.

We claim:

1. A method for configuring a data compute node (DCN) migrated from a first host computer at a first site of a plurality of sites spanned by a logical network to a second host computer at a second site of the plurality of sites, the method comprising:
at the second host computer:
from the first host computer, receiving data for configuring the DCN and implementing the logical network on the second site, the data comprising (i) data particular to the first site and (ii) a global identifier for a logical port to which the DCN attaches;
providing the global identifier to a local logical network manager for the second site, wherein the local logical network manager uses the global identifier to retrieve data regarding the logical port from a global network manager that manages the logical network across the plurality of sites; and
based on data retrieved from the global network manager, modifying the data particular to the first site into data particular to the second site.

2. The method of claim 1 further comprising, prior to receiving the data from the first host computer, requesting from the local logical network manager a logical port for attaching a virtual interface of the DCN.

3. The method of claim 2 further comprising, prior to requesting the logical port, receiving a command from a compute manager at the second site to (i) create the DCN and (ii) register the created DCN with the local logical network manager.

4. The method of claim 2, wherein in response to the request for a logical port, the local logical network manager creates (i) the logical port and (ii) a local identifier for the logical port that is different from the global identifier for the logical port.

5. The method of claim 4, wherein the global identifier for the logical port is a first port identifier, wherein the local identifier for the logical port is a second port identifier, wherein the second port identifier is also different from a third port identifier for the logical port used by the first host computer.

6. The method of claim 4, wherein the local logical network manager creates the logical port at the second host computer.

7. The method of claim 1, wherein the data received from the first host computer comprises data for configuring a managed forwarding element executing on the second host computer to implement the logical network for sending data messages to and from the DCN.

8. The method of claim 7, wherein the data for configuring the managed forwarding element comprises a set of rules for configuring at least one of a firewall, a load balancer, network address translation (NAT), and dynamic host configuration protocol (DHCP).

9. The method of claim 7, wherein the data particular to the first site comprises port identifiers, IP addresses, and tags associated with the DCN at the first site, wherein modifying the data comprises replacing a port identifier for the DCN at the first site with a port identifier for the DCN at the second site.

10. The method of claim 1, wherein the local logical network manager (i) uses the data regarding the logical port to generate configuration data for the second host computer and (ii) provides the generated configuration data to a set of controllers at the second site for distribution to a set of managed forwarding elements that implement the logical network at the second site and which execute on a set of host computers, said set of host computers comprising the second host computer.

11. The method of claim 1, wherein the data received from the first host computer further comprises a set of tags associated with the DCN.

12. The method of claim 11, wherein the retrieved data regarding the logical port comprises a set of security group definitions that reference a plurality of tags, wherein the DCN is automatically assigned to one or more of the defined groups based on the received set of tags.

13. The method of claim 12, wherein at least one particular tag is applied to a set of DCNs at two or more of the sites, wherein at least one particular security group references the particular tag and automatically comprises the set of DCNs based on the particular tag.

14. The method of claim 13, wherein:
after the particular tag is removed from a first DCN at a first site, the first DCN is automatically removed from the particular security group, and
after the particular tag is applied to a second DCN at a second, different site, the second DCN is automatically added to the particular security group.

15. The method of claim 11, wherein the retrieved data regarding the logical port comprises a set of security rule definitions that reference a plurality of tags, wherein one or more of the defined security rules are applied to the DCN based on the received set of tags.

16. The method of claim 15, wherein at least one particular tag is applied to a set of DCNs at two or more of the sites, wherein at least one particular security rule references the particular tag and is automatically applied to the set of DCNs.

17. The method of claim 16, wherein:
after the particular tag is removed from a first DCN at the first site, the particular security rule is automatically no longer applied to the first DCN, and
after the particular tag is applied to a second DCN at the second site, the particular security rule is automatically applied to the second DCN.

18. A non-transitory machine readable medium storing a program which when executed by at least one processing unit of a first host computer at a first site of a plurality of sites spanned by a logical network configures a data compute node (DCN) migrated from a second host computer at a second site of the plurality of sites, the program comprising sets of instructions for:
from the second host computer, receiving data for configuring the DCN and implementing the logical network on the first site, the data comprising (i) data particular to the second site and (ii) a global identifier for a logical port to which the DCN attaches;
providing the global identifier to a local logical network manager for the first site, wherein the local logical network manager uses the global identifier to retrieve data regarding the logical port from a global network manager that manages the logical network across the plurality of sites; and
based on data retrieved from the global network manager, modifying the data particular to the second site into data particular to the first site.

19. The non-transitory machine readable medium of claim 18, wherein the program further comprises sets of instructions for:
prior to receiving the data from the second host computer, requesting from the local logical network manager a logical port for attaching a virtual interface of the DCN; and
receiving a command from a compute manager at the first site to (i) create the DCN and (ii) register the created DCN with the local logical network manager,
wherein in response to the request for a logical port, the local logical network manager creates (i) the logical port and (ii) a local identifier for the logical port that is different from the global identifier for the logical port.

20. The non-transitory machine readable medium of claim 19, wherein the global identifier for the logical port is a first port identifier, wherein the local identifier for the logical port is a second port identifier, wherein the second port identifier is also different from a third port identifier for the logical port used by the second host computer.

21. The non-transitory machine readable medium of claim 18, wherein:
the data received from the second host computer comprises data for configuring a managed forwarding element executing on the first host computer to implement the logical network for sending data messages to and from the DCN;
wherein the data particular to the second site comprises port identifiers, IP addresses, and tags associated with the DCN at the second site; and
the set of instructions for modifying the data comprises a set of instructions for replacing a port identifier for the DCN at the second site with a port identifier for the DCN at the first site.

22. The non-transitory machine readable medium of claim 18, wherein the local logical network manager (i) uses the data regarding the logical port to generate configuration data for the first host computer and (ii) provides the generated configuration data to a set of controllers at the first site for distribution to a set of managed forwarding elements that implement the logical network at the first site and which execute on a set of host computers, said set of host computers comprising the first host computer.

23. The non-transitory machine readable medium of claim 18, wherein:
the data received from the second host computer further comprises a set of tags associated with the DCN;
the retrieved data regarding the logical port comprises a set of security group definitions that reference a plurality of tags; and
the DCN is automatically assigned to one or more of the defined groups based on the received set of tags.

24. The non-transitory machine readable medium of claim 23, wherein:
at least one particular tag is applied to a set of DCNs at two or more of the physical sites;
at least one particular security group references the particular tag and automatically comprises the set of DCNs based on the particular tag.

25. The non-transitory machine readable medium of claim 23, wherein:
the retrieved data regarding the logical port comprises a set of security rule definitions that reference a plurality of tags;
one or more of the defined security rules are applied to the DCN based on the received set of tags;
at least one particular tag is applied to a set of DCNs at two or more of the sites; and
at least one particular security rule references the particular tag and is automatically applied to the set of DCNs.

* * * * *